(12) United States Patent
Mabry et al.

(10) Patent No.: US 12,465,731 B2
(45) Date of Patent: Nov. 11, 2025

(54) METHODS OF MANUFACTURING NESTED BALLOONS UTILIZING PRESSURIZED CONSTRAINED ANNEALING

(71) Applicant: Confluent Medical Technologies, Inc., Fremont, CA (US)

(72) Inventors: Eric Mabry, Trabuco Canyon, CA (US); Matthew F. Tonge, Costa Mesa, CA (US); Don Ngo-Chu, Milpitas, CA (US); Kevin Justin Herrera, Sherman Oaks, CA (US)

(73) Assignee: Confluent Medical Technologies, Inc., Fremont, CA (US)

( * ) Notice: Subject to any disclaimer, the term of this patent is extended or adjusted under 35 U.S.C. 154(b) by 305 days.

(21) Appl. No.: 17/544,204

(22) Filed: Dec. 7, 2021

(65) Prior Publication Data
US 2022/0161008 A1    May 26, 2022

Related U.S. Application Data

(63) Continuation of application No. 17/018,884, filed on Sep. 11, 2020, now abandoned, which is a
(Continued)

(51) Int. Cl.
*A61M 25/10* (2013.01)
*B29C 49/00* (2006.01)
(Continued)

(52) U.S. Cl.
CPC .... *A61M 25/1029* (2013.01); *A61M 25/1011* (2013.01); *B29C 49/00* (2013.01);
(Continued)

(58) Field of Classification Search
None
See application file for complete search history.

(56) References Cited

U.S. PATENT DOCUMENTS

| 1,051,777 A | 1/1913 | Mars |
| 1,210,895 A | 1/1917 | Brinkman |

(Continued)

FOREIGN PATENT DOCUMENTS

| BE | 863490 | 2/1978 |
| CA | 2043346 | 11/1992 |

(Continued)

OTHER PUBLICATIONS

Webster's Online Dictionary definition of "constrained."*
(Continued)

*Primary Examiner* — Christopher T Schatz
(74) *Attorney, Agent, or Firm* — Knobbe, Martens, Olson & Bear, LLP

(57) ABSTRACT

A nested balloon is provided where each balloon is formed from tubing that optimizes the inner wall stretch thus providing maximum balloon strength. The high pressure, nested balloon is provided with layers that allow for slipping, such that the balloon has a very high pressure rating and toughness, yet excellent folding characteristics. Methods for producing such nested balloons using existing balloon forming equipment are also provided. The nested balloons can have layers with low-friction surfaces. The nested balloons are preferably manufactured using a variety of methods, including pressurized constrained annealing.

18 Claims, 36 Drawing Sheets

Related U.S. Application Data continuation of application No. 14/924,278, filed on Oct. 27, 2015, now abandoned.

(60) Provisional application No. 62/069,303, filed on Oct. 27, 2014.

(51) Int. Cl.
  *B29C 65/02* (2006.01)
  *B29L 31/00* (2006.01)

(52) U.S. Cl.
  CPC ... *B29C 65/022* (2013.01); *A61M 2025/1013* (2013.01); *A61M 2025/1031* (2013.01); *A61M 2025/1075* (2013.01); *B29L 2031/7543* (2013.01)

(56) References Cited

U.S. PATENT DOCUMENTS

| | | |
|---|---|---|
| 1,894,800 A | 1/1933 | Stowe |
| 2,030,803 A | 2/1936 | Temple |
| 2,617,319 A | 11/1952 | Richards |
| 3,044,326 A | 7/1962 | Erich |
| 3,273,367 A | 9/1966 | Hallden |
| 3,374,651 A | 3/1968 | Haug |
| 3,587,287 A | 6/1971 | Vacca |
| 3,645,126 A | 2/1972 | Kralowetz et al. |
| 3,648,501 A | 3/1972 | Kralowetz |
| 3,668,915 A | 6/1972 | Ribback |
| 3,845,650 A | 11/1974 | Romanov |
| 4,047,420 A | 9/1977 | Edwards |
| 4,327,736 A | 5/1982 | Inoue |
| 4,384,470 A | 5/1983 | Fiore |
| 4,418,458 A | 12/1983 | Hunter |
| 4,637,396 A | 1/1987 | Cook |
| 4,651,721 A | 3/1987 | Mikulich et al. |
| 4,651,738 A | 3/1987 | Demer |
| 4,685,447 A | 8/1987 | Iversen et al. |
| 4,696,085 A | 9/1987 | Sauder |
| 4,702,252 A | 10/1987 | Brooks et al. |
| 4,781,192 A | 11/1988 | Demer |
| 4,801,427 A * | 1/1989 | Jacob ............... A61L 2/14 422/23 |
| 4,891,877 A | 1/1990 | Talavera |
| 4,932,956 A | 6/1990 | Reddy et al. |
| 4,932,958 A | 6/1990 | Reddy et al. |
| 5,105,091 A | 4/1992 | Igarashi |
| 5,142,160 A | 8/1992 | Storbeck |
| 5,171,299 A | 12/1992 | Heitzmann et al. |
| 5,184,733 A | 2/1993 | Armarson et al. |
| 5,195,969 A | 3/1993 | Wang et al. |
| 5,201,706 A | 4/1993 | Noguchi et al. |
| 5,207,700 A | 5/1993 | Euteneuer |
| 5,270,086 A | 12/1993 | Hamlin |
| 5,290,306 A | 3/1994 | Trotta et al. |
| 5,304,340 A | 4/1994 | Downey |
| 5,342,305 A | 8/1994 | Shonk |
| 5,344,400 A | 9/1994 | Kaneko et al. |
| 5,344,401 A | 9/1994 | Radisch et al. |
| 5,350,361 A | 9/1994 | Tsukashima et al. |
| 5,358,486 A | 10/1994 | Saab |
| 5,358,487 A | 10/1994 | Miller |
| 5,366,442 A | 11/1994 | Wang et al. |
| 5,445,646 A | 8/1995 | Euteneuer et al. |
| 5,447,497 A | 9/1995 | Sogard et al. |
| 5,478,320 A | 12/1995 | Trotta |
| 5,499,980 A | 3/1996 | Euteneuer |
| 5,500,180 A | 3/1996 | Bard |
| 5,512,051 A | 4/1996 | Wang et al. |
| 5,514,092 A | 5/1996 | Forman et al. |
| 5,538,510 A | 7/1996 | Fontirroche et al. |
| 5,587,125 A | 12/1996 | Roychowdhury |
| 5,609,056 A | 3/1997 | Seeber |
| 5,613,979 A | 3/1997 | Trotta et al. |
| 5,620,649 A | 4/1997 | Trotta |
| 5,647,848 A | 7/1997 | Jorgensen |
| 5,681,522 A | 10/1997 | Roychowdhury |
| 5,693,014 A | 12/1997 | Abele et al. |
| 5,746,745 A | 5/1998 | Abele et al. |
| 5,752,934 A | 5/1998 | Campbell et al. |
| 5,755,690 A | 5/1998 | Saab |
| 5,797,877 A | 8/1998 | Hamilton et al. |
| 5,807,327 A | 9/1998 | Green et al. |
| 5,820,594 A | 10/1998 | Fontirroche et al. |
| 5,833,657 A | 11/1998 | Reinhardt et al. |
| 5,841,541 A | 11/1998 | Dlugos |
| 5,843,027 A | 12/1998 | Stone et al. |
| 5,865,721 A | 2/1999 | Andrews et al. |
| 5,868,704 A | 2/1999 | Campbell et al. |
| 5,868,776 A | 2/1999 | Wright |
| 5,879,282 A | 3/1999 | Fischell et al. |
| 5,879,369 A | 3/1999 | Ishida |
| 5,908,406 A | 6/1999 | Ostapchenko et al. |
| 5,947,993 A | 9/1999 | Morales |
| 5,960,379 A | 9/1999 | Shimizu et al. |
| 6,004,289 A | 12/1999 | Saab |
| 6,010,480 A | 1/2000 | Abele et al. |
| 6,024,722 A | 2/2000 | Rau et al. |
| 6,024,752 A | 2/2000 | Horn et al. |
| 6,036,697 A | 3/2000 | DiCaprio |
| 6,059,751 A | 5/2000 | Ostapchenko et al. |
| 6,070,446 A | 6/2000 | Blaimschein |
| 6,086,556 A | 7/2000 | Hamilton et al. |
| 6,120,477 A | 9/2000 | Campbell et al. |
| 6,124,007 A | 9/2000 | Wang et al. |
| 6,132,824 A | 10/2000 | Hamlin |
| 6,136,011 A | 10/2000 | Stambaugh |
| 6,136,258 A | 10/2000 | Wang et al. |
| 6,141,106 A | 10/2000 | Blum |
| 6,242,063 B1 | 6/2001 | Ferrera et al. |
| 6,293,959 B1 | 9/2001 | Miller et al. |
| 6,296,633 B1 | 10/2001 | Helgerson |
| 6,308,546 B1 | 10/2001 | Blaimschein et al. |
| 6,319,228 B1 | 11/2001 | Kastenhofer |
| 6,328,925 B1 | 12/2001 | Wang et al. |
| 6,358,227 B1 | 3/2002 | Ferrera et al. |
| 6,360,577 B2 | 3/2002 | Austin |
| 6,395,208 B1 | 5/2002 | Herweck et al. |
| 6,419,685 B2 | 7/2002 | Di Caprio et al. |
| 6,453,729 B1 | 9/2002 | Muto et al. |
| 6,461,326 B1 | 10/2002 | Yang et al. |
| 6,481,262 B2 | 11/2002 | Ching et al. |
| 6,482,348 B1 | 11/2002 | Wang et al. |
| 6,506,202 B1 | 1/2003 | Dutta et al. |
| 6,517,547 B1 | 2/2003 | Feeser et al. |
| 6,547,768 B2 | 4/2003 | Trotta |
| 6,585,688 B2 | 7/2003 | Ferrera et al. |
| 6,645,422 B2 * | 11/2003 | Jung, Jr. ............ A61M 25/1029 264/573 |
| 6,695,809 B1 | 2/2004 | Lee |
| 6,701,633 B2 | 3/2004 | Ohtsuka |
| 6,756,094 B1 | 6/2004 | Wang et al. |
| 6,773,447 B2 | 8/2004 | Laguna |
| 6,787,095 B2 | 9/2004 | Wang et al. |
| 6,866,649 B2 | 3/2005 | Ferrera et al. |
| 6,872,215 B2 | 3/2005 | Crocker et al. |
| 6,881,216 B2 | 4/2005 | Di Caprio et al. |
| 6,896,842 B1 | 5/2005 | Hamilton et al. |
| 6,902,571 B2 | 6/2005 | Owens et al. |
| 6,911,017 B2 | 6/2005 | Lee et al. |
| 6,923,787 B2 | 8/2005 | Wang |
| 6,946,173 B2 | 9/2005 | Lim et al. |
| 6,951,675 B2 | 10/2005 | Chin et al. |
| 6,955,661 B1 | 10/2005 | Herweck et al. |
| 6,972,024 B1 | 12/2005 | Kilpatrick et al. |
| 6,988,881 B2 | 1/2006 | Motsenbocker et al. |
| 6,993,953 B2 | 2/2006 | Stupecky |
| 7,010,953 B2 | 3/2006 | Stupecky |
| 7,025,745 B2 | 4/2006 | Lim et al. |
| 7,026,026 B2 | 4/2006 | Ferrera et al. |
| 7,037,562 B2 | 5/2006 | Jimenez |
| 7,105,013 B2 | 9/2006 | Durcan |
| 7,108,684 B2 | 9/2006 | Farnan |
| 7,126,694 B1 | 10/2006 | Bachalo |

(56) References Cited

U.S. PATENT DOCUMENTS

| | | |
|---|---|---|
| 7,147,905 B2 | 12/2006 | Fukuda et al. |
| 7,172,796 B2 | 2/2007 | Kinoshita et al. |
| 7,290,352 B2 | 11/2007 | Defarme et al. |
| 7,314,461 B2 | 1/2008 | Carter et al. |
| 7,314,480 B2 | 1/2008 | Eidenschink et al. |
| 7,335,184 B2 | 2/2008 | Laguna |
| 7,367,989 B2 | 5/2008 | Eidenschink |
| 7,389,670 B1 | 6/2008 | Kokish et al. |
| 7,418,851 B2 | 9/2008 | Labro |
| 7,448,243 B1 | 11/2008 | Motsenbocker |
| 7,449,010 B1 | 11/2008 | Hayase et al. |
| 7,553,292 B2 | 6/2009 | Kilpatrick et al. |
| 7,578,165 B1 | 8/2009 | Stupecky |
| 7,637,886 B2 | 12/2009 | Herweck et al. |
| 7,641,688 B2 | 1/2010 | Lesh |
| 7,659,000 B2 | 2/2010 | Burgmeier et al. |
| 7,670,364 B2 | 3/2010 | Dusbabek et al. |
| 7,682,335 B2 | 3/2010 | Pepper et al. |
| 7,682,553 B2 | 3/2010 | Wang et al. |
| 7,713,233 B2 | 5/2010 | Burgmeier et al. |
| 7,713,281 B2 | 5/2010 | Leeflang et al. |
| 7,731,685 B2 | 6/2010 | Ragheb et al. |
| 7,758,572 B2 | 7/2010 | Weber et al. |
| 7,762,804 B1 | 7/2010 | Stupecky |
| 7,762,984 B2 | 7/2010 | Kumoyama et al. |
| 7,781,038 B2 | 8/2010 | Hamilton et al. |
| 7,828,766 B2 | 11/2010 | Durcan |
| 7,914,486 B2 | 3/2011 | Chen et al. |
| 7,942,847 B2 | 5/2011 | Stupecky et al. |
| 7,947,059 B2 | 5/2011 | Chin et al. |
| 7,951,110 B2 | 5/2011 | Bishop et al. |
| 7,976,497 B2 | 7/2011 | Shah et al. |
| 7,985,228 B2 | 7/2011 | Phan et al. |
| 7,985,234 B2 | 7/2011 | Wang et al. |
| 8,002,744 B2 | 8/2011 | Pepper et al. |
| 8,025,943 B2 | 9/2011 | Hamilton et al. |
| 8,034,066 B2 | 10/2011 | Goeken et al. |
| 8,043,296 B2 | 10/2011 | Chasmawala et al. |
| 8,043,362 B2 | 10/2011 | Gong et al. |
| 8,048,028 B2 | 11/2011 | Horn et al. |
| 8,052,638 B2 | 11/2011 | Lee et al. |
| 8,066,780 B2 | 11/2011 | Chen et al. |
| 8,070,719 B2 | 12/2011 | Lee |
| 8,122,809 B2 | 2/2012 | Simpson |
| 8,162,969 B2 | 4/2012 | Brister et al. |
| 8,257,074 B1 | 9/2012 | Stupecky |
| 8,388,575 B2 | 3/2013 | Durcan |
| 8,394,055 B2 | 3/2013 | Durcan |
| 8,440,090 B2 | 5/2013 | Haslinger et al. |
| 8,444,608 B2 | 5/2013 | Haslinger et al. |
| 8,535,596 B2 | 9/2013 | Durcan |
| 8,568,648 B2 | 10/2013 | Stupecky et al. |
| 8,684,963 B2 | 4/2014 | Qiu et al. |
| 8,752,261 B2 | 6/2014 | Van Sciver |
| 8,864,786 B2 | 10/2014 | Deshmukh |
| 9,089,669 B2 | 7/2015 | Haslinger et al. |
| 9,095,689 B2 | 8/2015 | Durcan |
| 9,211,392 B2 | 12/2015 | Durcan |
| 9,265,918 B2 | 2/2016 | Chen et al. |
| 9,381,325 B2 | 7/2016 | Haslinger et al. |
| 9,625,069 B2 | 4/2017 | Schwager |
| 9,833,600 B2 | 12/2017 | Stupecky |
| 10,835,720 B2 | 11/2020 | Stupecky et al. |
| 11,311,702 B2 | 4/2022 | Stupecky et al. |
| 2001/0001890 A1 | 5/2001 | Austin |
| 2002/0018866 A1 | 2/2002 | Lee et al. |
| 2002/0090476 A1 | 7/2002 | Ling et al. |
| 2002/0122903 A1 | 9/2002 | Ferrera et al. |
| 2002/0163104 A1 | 11/2002 | Motsenbocker et al. |
| 2002/0165523 A1 | 11/2002 | Chin et al. |
| 2002/0177866 A1 | 11/2002 | Weikel et al. |
| 2002/0187289 A1 | 12/2002 | Chang et al. |
| 2003/0093107 A1 | 5/2003 | Parsonage et al. |
| 2003/0149468 A1 | 8/2003 | Wallsten |
| 2004/0006359 A1 | 1/2004 | Laguna |
| 2004/0019362 A1 | 1/2004 | Ferrera et al. |
| 2004/0078052 A1 | 4/2004 | St. Pierre et al. |
| 2004/0096538 A1 | 5/2004 | Goff et al. |
| 2004/0098021 A1 | 5/2004 | Laguna |
| 2004/0181252 A1 | 9/2004 | Boyle et al. |
| 2004/0191443 A1 | 9/2004 | Hamlin |
| 2004/0207127 A1 | 10/2004 | Hamlin |
| 2005/0008560 A1 | 1/2005 | Kataoka et al. |
| 2005/0015047 A1 | 1/2005 | Shah |
| 2005/0015105 A1 | 1/2005 | Tang et al. |
| 2005/0027248 A1 | 2/2005 | Suzuki et al. |
| 2005/0043679 A1 | 2/2005 | Devens et al. |
| 2005/0075711 A1 | 4/2005 | Neary |
| 2005/0113856 A1 | 5/2005 | Epstein et al. |
| 2005/0137619 A1 | 6/2005 | Schewe et al. |
| 2005/0209629 A1 | 9/2005 | Kerr et al. |
| 2005/0228429 A1 | 10/2005 | Brugmeier et al. |
| 2005/0231721 A1 | 10/2005 | Inenaga et al. |
| 2005/0238833 A1 | 10/2005 | Wang et al. |
| 2005/0251107 A1 | 11/2005 | Olson |
| 2005/0261721 A1 | 11/2005 | Radish, Jr. et al. |
| 2005/0261760 A1 | 11/2005 | Weber |
| 2005/0266109 A1 | 12/2005 | Chin et al. |
| 2005/0267596 A1 | 12/2005 | Chen et al. |
| 2005/0288630 A1 | 12/2005 | Conway |
| 2006/0079918 A1 | 4/2006 | Creston |
| 2006/0079922 A1 | 4/2006 | Creston |
| 2006/0085023 A1 | 4/2006 | Davies, Jr. et al. |
| 2006/0165926 A1 | 7/2006 | Weber |
| 2006/0182873 A1 | 8/2006 | Klisch et al. |
| 2007/0055301 A1 | 3/2007 | Campbell et al. |
| 2007/0142772 A1 | 6/2007 | Deshmukh et al. |
| 2007/0167973 A1 | 7/2007 | Stupecky et al. |
| 2008/0051760 A1 | 2/2008 | Schoenle et al. |
| 2008/0065188 A1 | 3/2008 | Pallazza |
| 2008/0086083 A1 | 4/2008 | Towler |
| 2008/0097301 A1 | 4/2008 | Alpini et al. |
| 2008/0125711 A1 | 5/2008 | Alpini et al. |
| 2008/0157444 A1 | 7/2008 | Melsheimer |
| 2008/0228138 A1 | 9/2008 | Van Sloten et al. |
| 2009/0048684 A1 | 2/2009 | Lesh |
| 2009/0089079 A1 | 4/2009 | Goldhaber et al. |
| 2009/0299401 A1 | 12/2009 | Tilson |
| 2009/0299450 A1 | 12/2009 | Johnson et al. |
| 2009/0312806 A1 | 12/2009 | Sherman et al. |
| 2010/0042199 A1 | 2/2010 | Burton |
| 2010/0049123 A1 | 2/2010 | Alpini et al. |
| 2010/0100107 A1 | 4/2010 | Duggal et al. |
| 2010/0145266 A1 | 6/2010 | Orlowski |
| 2010/0174235 A1 | 7/2010 | Yamaguchi |
| 2010/0191089 A1 | 7/2010 | Stebler et al. |
| 2010/0234875 A1 | 9/2010 | Allex et al. |
| 2010/0241152 A1 | 9/2010 | Tilson et al. |
| 2010/0252965 A1 | 10/2010 | Wang et al. |
| 2010/0262218 A1 | 10/2010 | Deshmukh |
| 2010/0331965 A1 | 12/2010 | Dugas et al. |
| 2011/0022150 A1 | 1/2011 | Durcan |
| 2011/0022152 A1 | 1/2011 | Grandt |
| 2011/0046724 A1 | 2/2011 | Heilmann et al. |
| 2011/0160661 A1 | 6/2011 | Elton |
| 2011/0214802 A1 | 9/2011 | Stupecky et al. |
| 2011/0295203 A1 | 12/2011 | Hayes et al. |
| 2012/0016405 A1 | 1/2012 | Hamilton et al. |
| 2012/0065718 A1 | 3/2012 | Simpson et al. |
| 2013/0184643 A1 | 7/2013 | Warnack |
| 2013/0253425 A1 | 9/2013 | Haslinger et al. |
| 2014/0116606 A1 | 5/2014 | Stupecky et al. |
| 2014/0155823 A1 | 6/2014 | Qiu et al. |
| 2014/0276401 A1 | 9/2014 | Lee et al. |
| 2014/0319750 A1 | 10/2014 | Stupecky et al. |
| 2015/0073468 A1 | 3/2015 | Yang |
| 2015/0105815 A1 | 4/2015 | Horn et al. |
| 2015/0320969 A1 | 11/2015 | Haslinger et al. |
| 2015/0367109 A1 | 12/2015 | Maeda et al. |
| 2016/0008589 A1 | 1/2016 | Stupecky et al. |
| 2016/0058981 A1 | 3/2016 | Durcan |
| 2016/0114141 A1 | 4/2016 | Mabry et al. |
| 2016/0129158 A1 | 5/2016 | Chen et al. |
| 2018/0064917 A1 | 3/2018 | Stupecky et al. |

(56) References Cited

U.S. PATENT DOCUMENTS

| | | |
|---|---|---|
| 2021/0128892 A1 | 5/2021 | Stupecky et al. |
| 2021/0154447 A1 | 5/2021 | Mabry et al. |
| 2022/0134064 A1 | 5/2022 | Stover et al. |
| 2022/0161008 A1 | 5/2022 | Mabry et al. |

FOREIGN PATENT DOCUMENTS

| | | |
|---|---|---|
| CA | 2199333 | 10/2000 |
| CA | 2633578 | 7/2007 |
| CA | 2775946 | 4/2011 |
| DE | 10125998 | 11/2002 |
| EP | 0421031 | 4/1991 |
| EP | 1611917 | 1/2006 |
| EP | 1948286 | 8/2017 |
| EP | 2783722 | 1/2019 |
| EP | 2029215 | 3/2019 |
| EP | 2988049 | 4/2019 |
| EP | 2214768 | 12/2019 |
| EP | 2482910 | 7/2020 |
| EP | 3701995 | 9/2020 |
| EP | 3701996 | 9/2020 |
| EP | 2401020 | 12/2020 |
| EP | 2796161 | 10/2022 |
| JP | 02119874 | 5/1990 |
| JP | H09-507141 | 7/1997 |
| JP | H10-314311 | 12/1998 |
| JP | 2004-512980 | 4/2004 |
| JP | 2009-519770 | 5/2009 |
| JP | 2012-504018 | 2/2012 |
| JP | 2012-526622 | 11/2012 |
| JP | 6486297 | 3/2019 |
| WO | WO 95/17920 | 7/1995 |
| WO | WO 96/40350 | 12/1996 |
| WO | WO 97/32624 | 9/1997 |
| WO | WO 99/13924 | 3/1999 |
| WO | WO 2001/064278 | 9/2001 |
| WO | WO 2001/089619 | 11/2001 |
| WO | WO 2002/036196 | 5/2002 |
| WO | WO 2003/004248 | 1/2003 |
| WO | WO 2005/115496 | 12/2005 |
| WO | WO 2007/075585 | 7/2007 |
| WO | WO 2009/006748 | 1/2009 |
| WO | WO 2013/145479 | 3/2013 |
| WO | WO 2014/179505 | 11/2014 |
| WO | WO 2016/007928 | 1/2016 |
| WO | WO 2016/069640 | 5/2016 |
| WO | WO 2020/173676 | 9/2020 |

OTHER PUBLICATIONS

Burst Pressure Calculator. https://www.zeusinc.com/resources/calculators/burst-pressure/ Online Reference.*
International Search Report with Written Opinion of the International Searching Authority dated Jul. 2, 2008, for corresponding International Application No. PCT/US06/48268, filing date Dec. 15, 2006.
Japanese Office Action mailed Dec. 21, 2012 in Japanese Application No. 2008-545887 referencing a Japanese Office Action mailed Dec. 6, 2011 (total of 4 pages).
Canadian Office Action mailed Jan. 9, 2013 in Canadian Application No. 2,633,578 in 3 pages.
European Office Action for European Application No. 06845731.6-1526, dated Jun. 6, 2012 in 5 pages.
Japanese Office Action for Japanese Application No. 2008-545887, mailed Dec. 6, 2011 in 6 pages.
Sample Measurement Testing, in U.S. Appl. No. 11/303,545, filed Nov. 17, 2008.
European Office Action for European Application No. 06845731.6-1526, dated Feb. 16, 2016 in 5 pages.
International Search Report and Written Opinion in PCT/US2014/036259 mailed Sep. 11, 2014 in 8 pages.
International Search Report and Written Opinion in PCT/US2015/0040056 mailed Dec. 3, 2015 in 10 pages.
International Search Report and Written Opinion in PCT/US2015/057642 mailed Oct. 27, 2015 in 10 pages.
OPN NC 35 atm High Pressure Balloon, 4 pages, dated 2012.
Extended European Search Report for European Application No. 15854288, dated Jun. 15, 2018 in 6 pages.
Intention to Grant for European Application No. 06845731.6-1526, dated Jul. 19, 2018 in 7 pages.
Office Action for Japanese Application No. 2017-522970, dated Aug. 9, 2019 in 4 pages.
Office Action for Japanese Application No. 2017-522970, dated Apr. 24, 2020 in 4 pages.
Office Action for Japanese Application No. 2017-522970, dated Sep. 7, 2020 in 5 pages.
Notice of Allowance for Japanese Application No. 2017-522970, dated May 18, 2021 in 3 pages.
Canadian Office Action mailed Dec. 17, 2021 in Canadian Application No. 2,968,508 in 6 pages.
Mexican Office Action mailed Jun. 15, 2022 in Mexican Application No. MX/a/2017/005408 in 4 pages.
Office Action for EP Application No. 15 854 288.6 dated May 30, 2025; 3 pages.

* cited by examiner

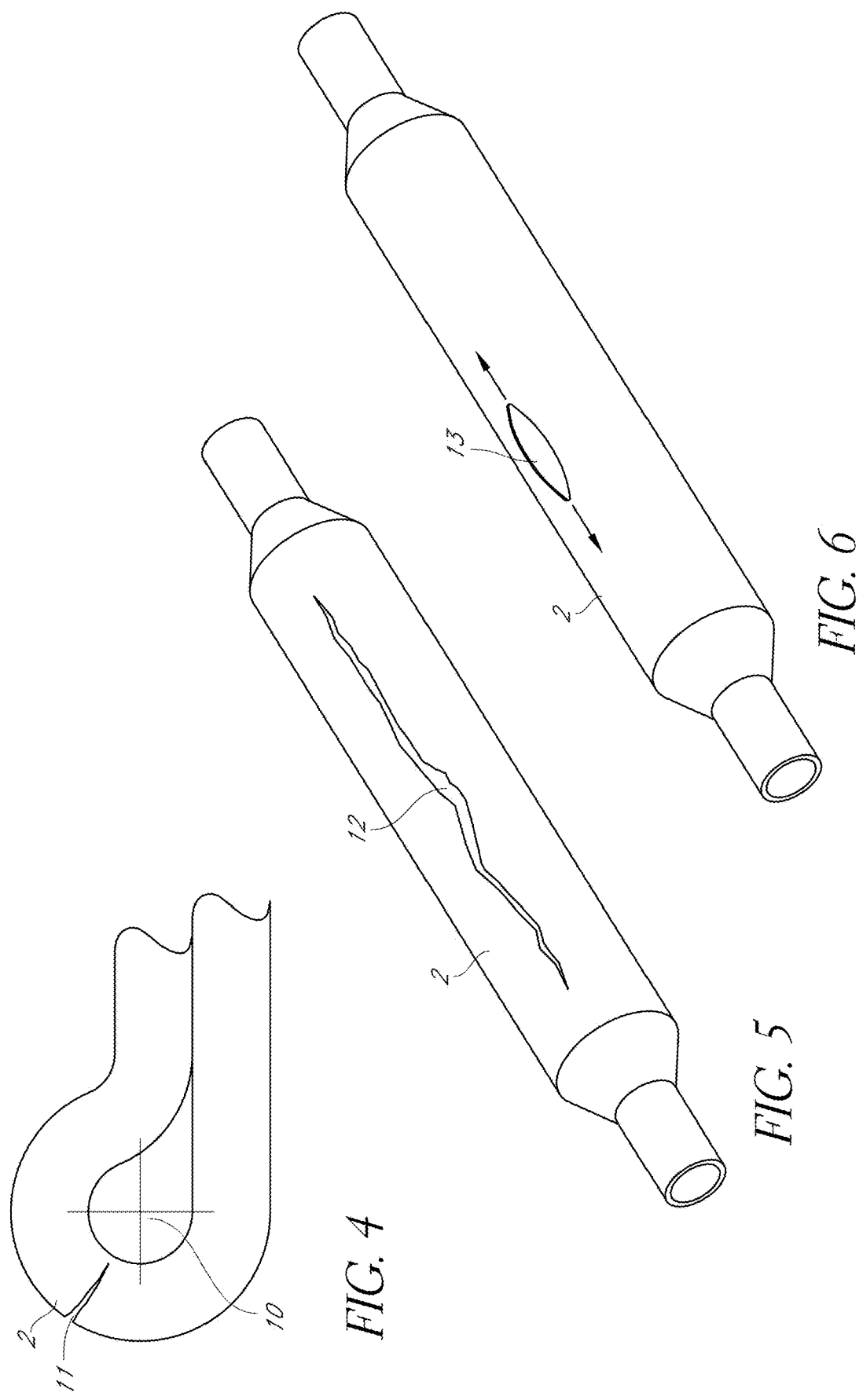

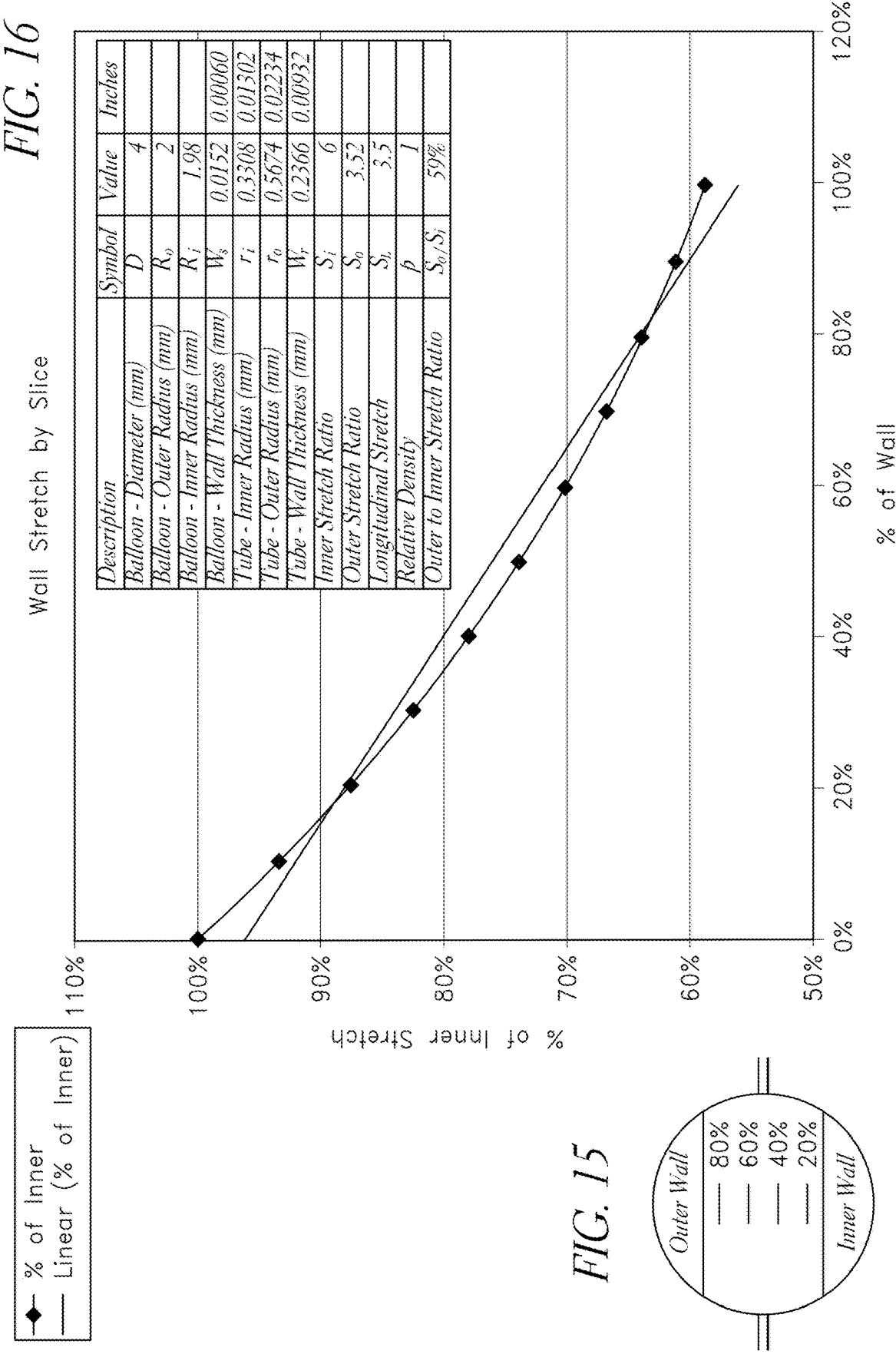

6 mm Nylon 12 Balloons

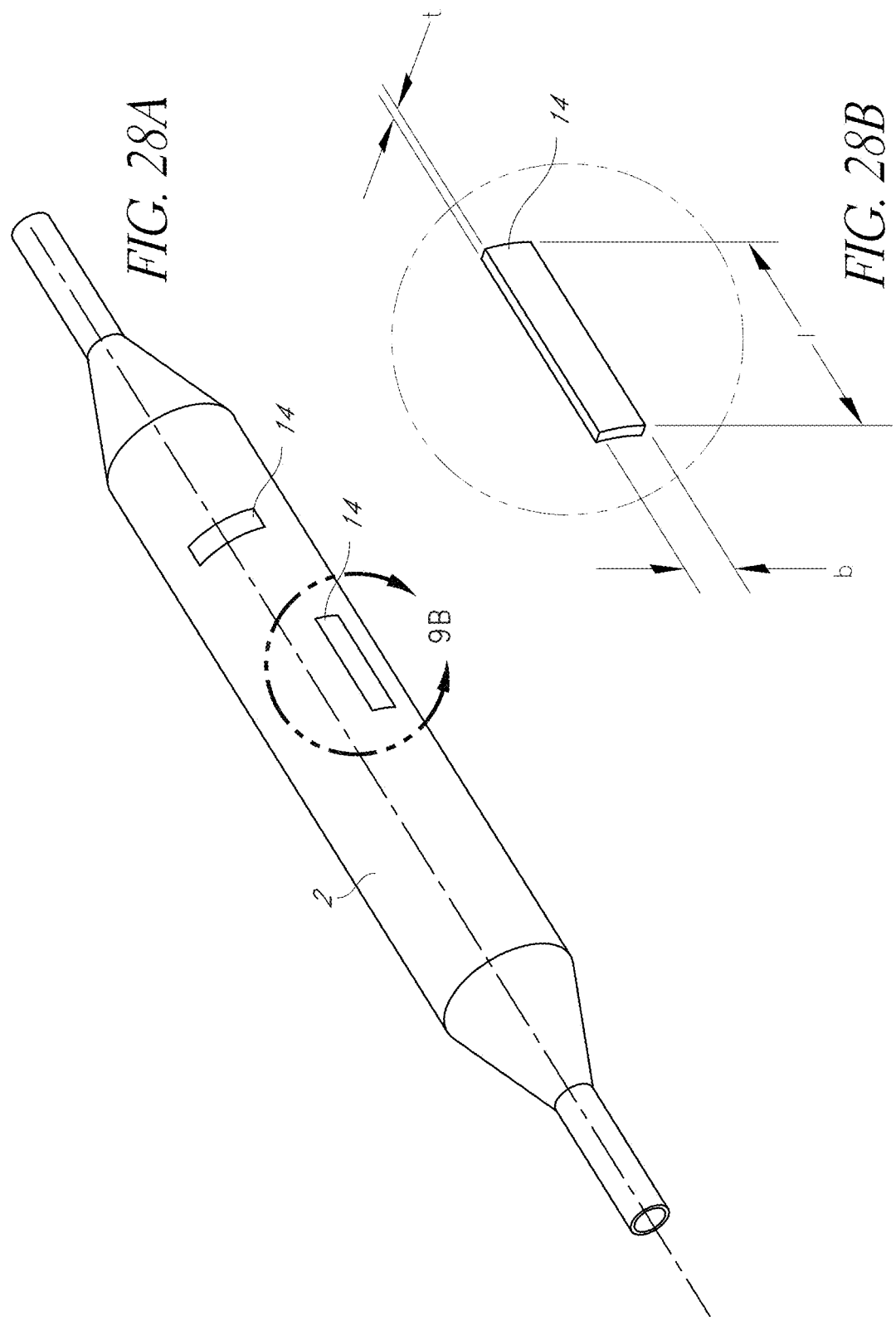

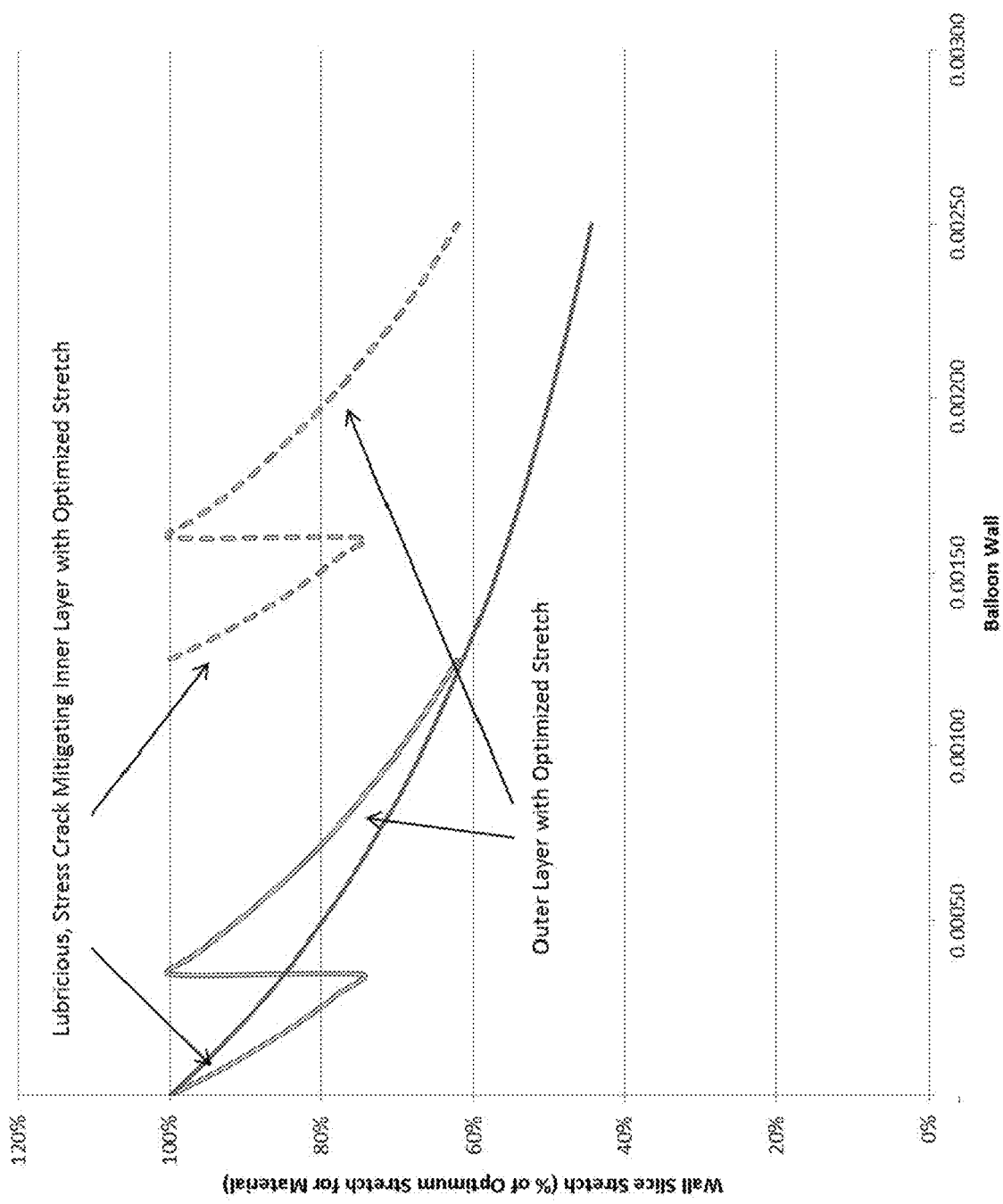

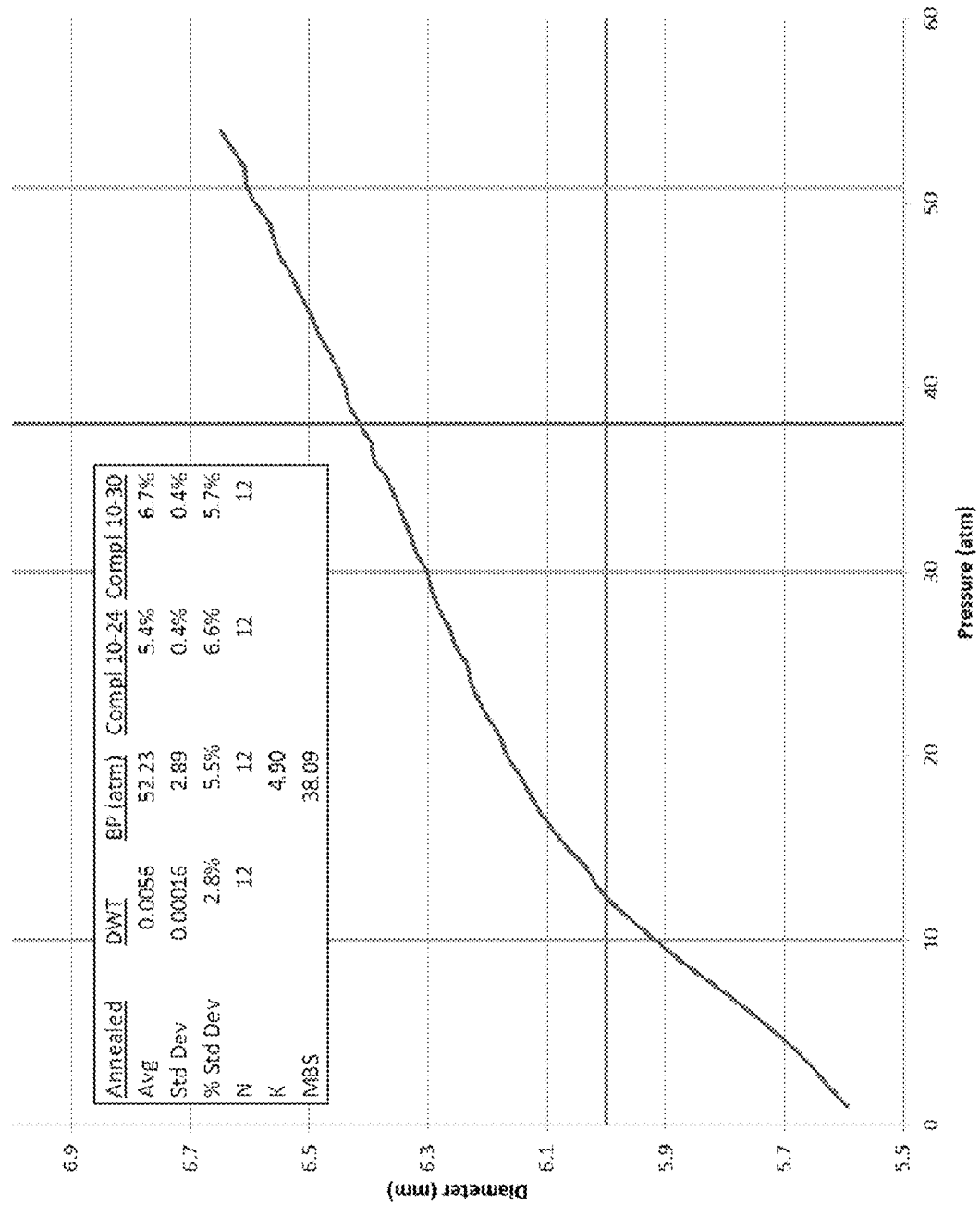

METHODS OF MANUFACTURING NESTED BALLOONS UTILIZING PRESSURIZED CONSTRAINED ANNEALING

RELATED APPLICATIONS

This application is a continuation of U.S. patent application Ser. No. 17/018,884 filed Sep. 11, 2020, which is a continuation of U.S. patent application Ser. No. 14/924,278 filed Oct. 27, 2015, which claims priority under 35 U.S.C. § 119(e) as a nonprovisional of U.S. Prov. Patent Application No. 62/069,303 filed Oct. 27, 2014, the entire disclosure of the foregoing priority applications are hereby incorporated by reference herein for all purposes in their entirety.

The entire disclosure of U.S. patent application Ser. No. 11/611,748 filed Dec. 15, 2006, (now U.S. Pat. No. 7,942,847 issued May 17, 2011), is also incorporated by reference its entirety.

BACKGROUND

Field

Embodiments relate generally to balloon catheters and methods for making balloon catheters for medical applications. In particular, embodiments relate to a nested balloon having at least two balloons having different properties. The balloons may have multiple layers such as a layer comprising a low coefficient of friction.

Description of the Related Art

An increasing number of surgical procedures involve percutaneously inserted devices that employ an inflatable thin wall polymer balloon attached to the distal end of a small diameter hollow shaft called a catheter. The device can be advanced to the treatment site via an artery, vein, urethra, or other available passage beneath the skin. The shaft usually exceeds 130 cm in length so that the balloon can be positioned deep within the patient's body. The opposite (proximal) end of the shaft, typically having an inflation connector, remains external to the patient.

When a balloon is advanced to a treatment site, the balloon is deflated and tightly wrapped around the shaft to minimize its cross-section and facilitate easy insertion and navigation through the passage. After reaching the desired location, the balloon is slowly inflated with a high pressure saline solution. The balloon walls unfold and expand radially. During this process a substantial radial force can be exerted by or on the balloon walls. This hydraulically generated radial force can be utilized for a number of different medical procedures such as, for example, vessel dilation, stent deployment, passage occlusion, and bone compression or distraction (such as distraction of vertebrae in the spinal column).

Several factors can limit the force a balloon can exert while within a patient. For example, for a particular cross-sectional balloon size, the design of a balloon, the material used to construct the balloon, and the structural integrity of a balloon can limit the force a balloon can exert without failing (e.g., bursting). Minimizing the risk of balloon bursting can be important in many medical procedures because, upon bursting, balloon debris may become lodged within a patient causing potentially severe trauma. Additional, higher pressures may be needed to affect the treatment.

The hydraulically generated pressure, as noted above, typically exerts two types of stress on the balloon. Radial stress (or hoop stress) pushes a cylindrically-shaped balloon radially outward. Radial stress can lead to axial bursting of the balloon parallel to its longitudinal axis. Axial stress, on the other hand, pushes a cylindrically-shaped balloon axially outward. Axial stress can lead to radial bursting of the balloon somewhere along the balloon's circumference (e.g., complete fracture of the balloon).

Both radial stress and axial stress have a linear relationship in pressure to the balloon's wall thickness and the ratio of the balloon's diameter to the balloon's wall thickness. As a result, any increase in pressure or diameter size requires an equally proportional increase in the balloon's thickness to avoid a critical pressure level (i.e., burst pressure) that will cause the balloon to burst. Generally, radial stress is twice as large as axial stress, so balloons will frequently burst axially absent some deformity or preprocessing. However, in the presence of balloon deformities, a balloon may burst radially. Such a radial bursting could disadvantageously leave separated sections of the balloon inside the patient after the catheter is removed.

Increasing balloon wall thickness also increases the cross-section of the balloon when deflated and wrapped for insertion. Consequently, a balloon having an increased balloon wall thickness might have limited access to certain areas in a patient due to the balloon's increased size. Typically, the balloon's stiffness varies as a cube of the balloon's thickness. For example, doubling the balloon's wall thickness to increase the burst pressure will increase the stiffness by a factor of eight. This added wall stiffness impairs one's ability to tightly wrap the balloon around the catheter shaft, which is necessary to limit the size of the balloon's cross-sectional area. If the balloon is bent too much beyond its stiffness, undesirable deformities may result. Usually, a balloon having a wall thickness of less than 0.0030 inches must be used to avoid the above-mentioned problems.

A number of techniques are being used to modify balloon properties in order to improve balloon functionality. These techniques include blending different types of polymers, adding plasticizers to balloons, and modifying parameters of the balloon forming process. These methods are often not entirely successful in creating a more desirable balloon with improved mechanical characteristics. Typically, these known techniques improve one balloon performance parameter while deteriorating another parameter.

Some have attempted to resolve this problem by using multi-layer balloons. For the reasons described below, these prior art multi-layer balloons also have serious deficiencies.

SUMMARY

Disclosed in some embodiments are commercially viable, high pressure, nested balloon catheters. One aspect of embodiments involves creating nested balloons. The nested balloon comprises at least two balloons, wherein each may have stretch properties that optimize the inner wall stretch thus providing maximum balloon strength. The nested balloons have, in some cases, very high pressure ratings and toughness, yet excellent folding characteristics. Methods for producing such nested balloons using existing balloon forming equipment are also provided.

In some embodiments, a method of manufacturing a nested balloon is provided. The method can include the step of providing a first balloon layer. The method can include the step of providing a second balloon layer. The method can include the step of inserting the first balloon layer into the second balloon layer. The method can include the step of annealing the first balloon layer and the second balloon layer in a mold at a temperature of between about 200° F. and about 270° F. for a time period of between about 10 minutes and about 60 minutes. In some embodiments, annealing comprises pressurizing the nested balloon at a pressure of between about 5 atm and about 30 atm and stretching the balloon with a stretch force of between about 1 pound and about 5 pounds.

In some embodiments, the first balloon layer comprises nylon. In some embodiments, the second balloon layer comprises nylon. In some embodiments, the annealing temperature is between about 215° F. and about 255° F. In some embodiments, the annealing temperature is about 235° F. In some embodiments, the pressure is between about 15 atm and about 25 atm. In some embodiments, the pressure is between about 15 atm and about 25 atm. In some embodiments, the stretch force is between about 1 pound and about 2 pounds. In some embodiments, the time period is between about 15 minutes and about 45 minutes. In some embodiments, the time period is between about 30 minutes. The method can include the step of sterilizing the nested balloon after the annealing step at a temperature of between about 40° C. and about 60° C. for a time period of between about 1 hour and about 3 hours. The method can include the step of blow-molding the first balloon layer and the second balloon layer prior to the annealing step, wherein the blow molding occurs no more than about 48 hours prior to the annealing step. The method can include the step of blow-molding the first balloon layer and the second balloon layer prior to the annealing step, wherein the blow molding occurs no more than about 24 hours prior to the annealing step. The method can include the step of welding the nested balloon to a catheter shaft to form a balloon catheter. In some embodiments, the first balloon layer is a co-extruded balloon layer. In some embodiments, the second balloon layer is a co-extruded balloon layer. In some embodiments, a nested balloon having a plurality of layers (e.g., 2, 3, or more layers) that may be either co-extruded or non co-extruded layers can be formed via methods as disclosed herein, including annealing the nested balloon under a relatively high pressure.

In some embodiments, a nested balloon is provided. The nested balloon can include a first balloon having an inner layer and an outer layer. In some embodiments, each balloon layer of the first balloon has a first biaxial molecular orientation at its inner wall. The nested balloon can include a second balloon configured to be disposed within the first balloon. The nested balloon can include a second balloon having an inner layer and an outer layer. In some embodiments, each balloon layer of the second balloon has a second biaxial molecular orientation at its inner wall. In some embodiments, the expansion ratio of at least one of the inner wall of the inner layer and the outer layer of the first balloon are optimized such that the inner layer and the outer layer of the first balloon resist further stretching. In some embodiments, the expansion ratio of at least one of the inner wall of the inner layer and the outer layer of the second balloon are optimized when disposed within the first balloon such that the inner layer and the outer layer of the second balloon resist further stretching. In some embodiments, the inner and outer layers of the first balloon and/or the second balloon are formed from co-extruded tubing. In some embodiments, the first balloon and the second balloon are formed from co-extruded tubing. In some embodiments, the average burst pressure is substantially greater than that of a single balloon having the double wall thickness equal to combined thickness of the first balloon and the second balloon.

In some embodiments, the expansion ratio of both of the inner walls of the inner layers and the outer layer of the first balloon are optimized such that the inner layers and the outer layer of the first balloon resist further stretching. In some embodiments, the expansion ratio of both of the inner walls of the inner layers and the outer layer of the second balloon are optimized such that the inner layers and the outer layer of the first balloon resist further stretching. In some embodiments, the first balloon and the second balloon are each formed from co-extruded tubing with at least two different materials having different stretch properties.

In some embodiments, the average burst pressure is at least about 10% greater than that of a single balloon having the double wall thickness equal to combined thickness of the first balloon and the second balloon. In some embodiments, the average burst pressure is at least about 25% greater than that of a single balloon having the double wall thickness equal to combined thickness of the first balloon and the second balloon. In some embodiments, the average burst pressure is at least about 60% greater than for a single balloon having the double wall thickness equal to the combined thickness of the first balloon and the second balloon. In some embodiments, the average burst pressure is between about 25% and about 75% greater than that of a single balloon having the double wall thickness equal to combined thickness of the first balloon and the second balloon.

In some embodiments, the average burst pressure is about or at least about 5%, 10%, 15%, 20%, 25%, 30%, 35%, 40%, 45%, 50%, 55%, 60%, 65%, 70%, 75%, 80%, 85%, 90%, 95% or 100%, greater than that of a single balloon having the double wall thickness equal to combined thickness of the first balloon and the second balloon. In some embodiments, the average burst pressure is between about 10%-20%, 15%-25%, 20%-30%, 25%-35%, 30%-40%, 35%-45%, 40%-50%, 45%-55%, 50%-60%, 55%-65%, 60%-70%, 65%-85%, 70%-80%, 75%-85%, 80%-90%, 85%-95%, or 90%-100%, greater than that of a single balloon having the double wall thickness equal to combined thickness of the first balloon and the second balloon. In some embodiments, the average burst pressure is between about 10%-30%, 15%-35%, 20%-40%, 25%-45%, 30%-50%, 35%-55%, 40%-60%, 45%-65%, 50%-70%, 55%-75%, 60%-80%, 65%-85%, 70%-90%, 75%-95%, or 80%-100%, greater than that of a single balloon having the double wall thickness equal to combined thickness of the first balloon and the second balloon. In some embodiments, the average burst pressure is between about 10%-40%, 15%-45%, 20%-50%, 25%-55%, 30%-60%, 35%-65%, 40%-70%, 45%-75%, 50%-80%, 55%-85%, 60%-90%, 65%-95%, or 70%-100%, greater than that of a single balloon having the double wall thickness equal to combined thickness of the first balloon and the second balloon. In some embodiments, the average burst pressure is between about 10%-50%, 15%-55%, 20%-60%, 25%-65%, 30%-70%, 35%-75%, 40%-80%, 45%-85%, 50%-90%, 55%-95%, or 60%-100%, greater than that of a single balloon having the double wall thickness equal to combined thickness of the first balloon and the second balloon. In some embodiments, the average burst pressure is between about 10%-40%, 15%-45%, 20%-50%, 25%-55%, 30%-60%, 35%-65%, 40%-70%, 45%-75%, 50%-80%, 55%-85%, 60%-90%, 65%-95%, or 70%-100%, greater than that of a single balloon having the double wall thickness equal to combined thickness of the first balloon and the second balloon. In some embodiments, the average burst pressure is between about 10%-100%, 15%-95%, 20%-90%, 25%-85%, 30%-80%, 35%-75%, 40%-70%, 45%-55%, greater than that of a single balloon having the double wall thickness equal to combined thickness of the first balloon and the second balloon.

In some embodiments, the maximum hoop stress of the nested balloon is substantially greater than that of a single balloon having the double wall thickness equal to combined thickness of the first balloon and the second balloon. In some embodiments, the maximum hoop stress is approximately 30% greater than for a single balloon having the double wall thickness equal to combined thickness of the first balloon and the second balloon. In some embodiments, the maximum hoop stress is approximately 40% greater than for a single balloon having the double wall thickness equal to combined thickness of the first balloon and the second balloon. In some embodiments, the maximum hoop stress is approximately 50% greater than for a single balloon having the double wall thickness equal to combined thickness of the first balloon and the second balloon. In some embodiments, the maximum hoop stress is between about 25% and about 55% greater than that of a single balloon having the double wall thickness equal to combined thickness of the first balloon and the second balloon.

In some embodiments, the maximum hoop stress is about or at least about 5%, 10%, 15%, 20%, 25%, 30%, 35%, 40%, 45%, 50%, 55%, 60%, 65%, 70%, 75%, 80%, 85%, 90%, 95%, or 100%, greater than that of a single balloon having the double wall thickness equal to combined thickness of the first balloon and the second balloon. In some embodiments, the maximum hoop stress is between about 10%-20%, 15%-25%, 20%-30%, 25%-35%, 30%-40%, 35%-45%, 40%-50%, 45%-55%, 50%-60%, 55%-65%, 60%-70%, 65%-85%, 70%-80%, 75%-85%, 80%-90%, 85%-95%, or 90%-100%, greater than that of a single balloon having the double wall thickness equal to combined thickness of the first balloon and the second balloon. In some embodiments, the maximum hoop stress is between about 10%-30%, 15%-35%, 20%-40%, 25%-45%, 30%-50%, 35%-55%, 40%-60%, 45%-65%, 50%-70%, 55%-75%, 60%-80%, 65%-85%, 70%-90%, 75%-95%, or 80%-100%, greater than that of a single balloon having the double wall thickness equal to combined thickness of the first balloon and the second balloon. In some embodiments, the maximum hoop stress is between about 10%-40%, 15%-45%, 20%-50%, 25%-55%, 30%-60%, 35%-65%, 40%-70%, 45%-75%, 50%-80%, 55%-85%, 60%-90%, 65%-95%, or 70%-100%, greater than that of a single balloon having the double wall thickness equal to combined thickness of the first balloon and the second balloon. In some embodiments, the maximum hoop stress is between about 10%-50%, 15%-55%, 20%-60%, 25%-65%, 30%-70%, 35%-75%, 40%-80%, 45%-85%, 50%-90%, 55%-95%, or 60%-100%, greater than that of a single balloon having the double wall thickness equal to combined thickness of the first balloon and the second balloon. In some embodiments, the average burst pressure is between about 10%-40%, 15%-45%, 20%-50%, 25%-55%, 30%-60%, 35%-65%, 40%-70%, 45%-75%, 50%-80%, 55%-85%, 60%-90%, 65%-95%, or 70%-100%, greater than that of a single balloon having the double wall thickness equal to combined thickness of the first balloon and the second balloon. In some embodiments, the maximum hoop stress is between about 10%-100%, 15%-95%, 20%-90%, 25%-85%, 30%-80%, 35%-75%, 40%-70%, 45%-55%, greater than that of a single balloon having the double wall thickness equal to combined thickness of the first balloon and the second balloon.

Additionally, the nested balloon can have greater flexibility than that of a single balloon having the double wall thickness equal to combined thickness of the first balloon and the second balloon. In some embodiments, the flexibility is approximately 25% greater than for a single balloon having the double wall thickness equal to combined thickness of the first balloon and the second balloon. In some embodiments, the flexibility is approximately 50% greater than for a single balloon having the double wall thickness equal to combined thickness of the first balloon and the second balloon. In some embodiments, the flexibility is approximately 75% greater than for a single balloon having the double wall thickness equal to combined thickness of the first balloon and the second balloon. In some embodiments, the flexibility is between about 25% and about 75% greater than that of a single balloon having the double wall thickness equal to combined thickness of the first balloon and the second balloon.

In some embodiments, the flexibility is about or at least about 5%, 10%, 15%, 20%, 25%, 30%, 35%, 40%, 45%, 50%, 55%, 60%, 65%, 70%, 75%, 80%, 85%, 90%, 95%, or 100%, greater than that of a single balloon having the double wall thickness equal to combined thickness of the first balloon and the second balloon. In some embodiments, the flexibility is between about 10%-20%, 15%-25%, 20%-30%, 25%-35%, 30%-40%, 35%-45%, 40%-50%, 45%-55%, 50%-60%, 55%-65%, 60%-70%, 65%-85%, 70%-80%, 75%-85%, 80%-90%, 85%-95%, or 90%-100%, greater than that of a single balloon having the double wall thickness equal to combined thickness of the first balloon and the second balloon. In some embodiments, the flexibility is between about 10%-30%, 15%-35%, 20%-40%, 25%-45%, 30%-50%, 35%-55%, 40%-60%, 45%-65%, 50%-70%, 55%-75%, 60%-80%, 65%-85%, 70%-90%, 75%-95%, or 80%-100%, greater than that of a single balloon having the double wall thickness equal to combined thickness of the first balloon and the second balloon. In some embodiments, the flexibility is between about 10%-40%, 15%-45%, 20%-50%, 25%-55%, 30%-60%, 35%-65%, 40%-70%, 45%-75%, 50%-80%, 55%-85%, 60%-90%, 65%-95%, or 70%-100%, greater than that of a single balloon having the double wall thickness equal to combined thickness of the first balloon and the second balloon. In some embodiments, the flexibility is between about 10%-50%, 15%-55%, 20%-60%, 25%-65%, 30%-70%, 35%-75%, 40%-80%, 45%-85%, 50%-90%, 55%-95%, or 60%-100%, greater than that of a single balloon having the double wall thickness equal to combined thickness of the first balloon and the second balloon. In some embodiments, the flexibility is between about 10%-100%, 15%-95%, 20%-90%, 25%-85%, 30%-80%, 35%-75%, 40%-70%, 45%-55%, greater than that of a single balloon having the double wall thickness equal to combined thickness of the first balloon and the second balloon.

The outer layer of the first balloon can be configured to slide relative to the inner layer of the second balloon. At least one of the inner layers and the outer wall of the first balloon can include a stress crack mitigating layer for the outer layer of the first balloon. In some embodiments, the inner layer comprises Pebax. The stress crack mitigating layer can have a lower coefficient of friction relative to nested balloons of the same material to permit sliding of the balloons relative to each other. The inner layer of the second balloon can include a stress crack mitigating layer. In some embodiments, the outer layer of the first and the second balloon comprises Nylon and the inner layer of the first and the second balloon comprises Pebax. In some embodiments, the ratio of Nylon to Pebax is about 70:30. In some embodiments, the outer layer of the first and the second balloon comprises Nylon and the inner layer of the first and the second balloon comprises Pebax. In some embodiments, the ratio of Nylon to Pebax is about 60:40. In some embodiments, the outer layer of the first and the second balloon comprises Nylon and the inner layer of the first and the second balloon comprises Pebax. In some embodiments, the ratio of Nylon to Pebax is about 50:50. In some embodiments, the ratio of Nylon to Pebax is between about 90:10-80:20, 80:20-70:30; 70:30-60:40 or 60:40-50:50. In some embodiments, the ratio of Nylon to Pebax is between about 90:10-70:30; 80:20-60:40, or 70:30-50:50. In some embodiments, the ratio of Nylon to Pebax is between about 90:10-60:40 or 80:20-50:50.

In some embodiments, the neck of the first balloon is fused to a neck of the second balloon at a location spaced from the proximal end of a catheter. In some embodiments, at least one end of a neck of the first balloon is staggered from the corresponding end of a neck of the second balloon. In some embodiments, at least one end of a neck of the first balloon is axially offset from the corresponding end of a neck of the second balloon.

In some embodiments, a method for creating a nested balloons for medical applications is provided. The method can include the step of providing a first balloon having a first proximal neck and a first distal neck and a second balloon having a second proximal neck and a second distal neck. The method can include the step of inserting the second balloon into the first balloon. The method can include the step of heating and stretching the first balloon to optimize the stretch of an inner wall of the first balloon. The method can include the step of heating and stretching the second balloon to optimize the stretch of an inner wall of the second balloon. In some embodiments, the second balloon has different stretch properties than the first balloon.

In some embodiments, a method of making a nested balloon is provided. The method can include the step of selecting a first co-extruded tubular section comprising a first inner layer and a first outer layer, the first inner layer and the first outer layer having either the same or different materials with the same or different stretch properties. The method can include the step of selecting a second co-extruded tubular section comprising a second inner layer and a second outer layer, the second inner layer and the second outer layer having the same or different materials with the same or different stretch properties. The method can include the step of stretching each layer of the first and second co-extruded tubular sections to within approximately 15% of its optimal radial stretch, the optimal radial stretch for each layer determined based upon the inner surface of the layer. The method can include the step of positioning the first co-extruded tubular section within the second co-extruded tubular section to form a nested balloon.

In some embodiments, the stretching step is accomplished before the positioning step. In some embodiments, the stretching step is accomplished after the positioning step. The method can include the step of fluting the first co-extruded tubular section. The method can include the step of wrapping the first co-extruded tubular section. In some embodiments, the fluting and wrapping steps are accomplished before the positioning step. In some embodiments, a radially inwardly facing surface of the second inner layer is provided with a slip layer. In some embodiments, the slip layer comprises carbon nanoparticles. In some embodiments, at least one layer comprises nylon. In some embodiments, the second outer layer comprises nylon. In some embodiments, the stretching step comprises stretching each layer to within approximately 10% of its optimal radial stretch. In some embodiments, the stretching step comprises stretching each layer to within approximately 5% of its optimal radial stretch. In some embodiments, the first co-extruded tubular section and second co-extruded tubular section fail at approximately the same pressure when a pressure is applied to the nested balloon. In some embodiments, the first and second co-extruded tubular sections are configured to withstand at least about 40 atmospheres of applied pressure. In some embodiments, the first and second co-extruded tubular sections are configured to withstand at least about 50 atmospheres of applied pressure. In some embodiments, the first and second co-extruded tubular sections have substantially the same inner diameter and substantially the same outer diameter.

In some embodiments, the average burst pressure is at least 30% greater than that of a single balloon having the double wall thickness equal to combined thickness of the nested balloon. In some embodiments, the average burst pressure is at least 40% greater than that of a single balloon having the double wall thickness equal to combined thickness of the nested balloon. In some embodiments, the average burst pressure is at least 50% greater than that of a single balloon having the double wall thickness equal to combined thickness of the nested balloon. In some embodiments, the average burst pressure is at least 60% greater than that of a single balloon having the double wall thickness equal to combined thickness of the nested balloon. In some embodiments, the maximum hoop stress is at least 30% greater than that of a single balloon having the double wall thickness equal to combined thickness of the nested balloon. In some embodiments, the maximum hoop stress is at least 40% greater than that of a single balloon having the double wall thickness equal to combined thickness of the nested balloon. In some embodiments, the maximum hoop stress is at least 50% greater than that of a single balloon having the double wall thickness equal to combined thickness of the nested balloon. In some embodiments, the maximum hoop stress is at least 60% greater than that of a single balloon having the double wall thickness equal to combined thickness of the nested balloon.

In some embodiments, a method of making a nested balloon is provided. The method can include the step of selecting a first co-extruded balloon comprising a first inner layer and a first outer layer, the first inner layer and the first outer layer having different materials with different stretch properties. The method can include the step of selecting a second co-extruded balloon. The method can include the step of expanding the first balloon to within approximately 15% of the optimal radial stretch of an inner surface of the first inner layer. The method can include the step of expanding the second balloon to within approximately 15% of the optimal radial stretch of an inner surface of the second balloon. The method can include the step of nesting the first co-extruded balloon within the second co-extruded balloon. In some embodiments, the first inner layer comprises a lower strength and lower hardness material than nylon.

In some embodiments, a method of making a nested balloon is provided. The method can include the step of selecting a first co-extruded balloon comprising a first inner layer and a first outer layer. The method can include the step of selecting a second co-extruded balloon comprising a second inner layer and a second outer layer, the second inner layer and the second outer layer having different material with different stretch properties. The method can include the step of expanding the first balloon to within approximately 15% of the optimal radial stretch of an inner surface of the first inner layer. The method can include the step of expanding the second balloon to within approximately 15% of the optimal radial stretch of an inner surface of the second inner layer. The method can include the step of nesting the first co-extruded balloon within the second co-extruded balloon. In some embodiments, the second outer layer comprises nylon.

In some embodiments, a nested balloon is provided. The nested balloon can include a first balloon having an inner layer and an outer layer, each balloon layer of the first balloon having a first biaxial molecular orientation at its inner wall. The nested balloon can include a second balloon configured to be disposed within the first balloon, the second balloon having an inner layer and an outer layer, each balloon layer of the second balloon having a second biaxial molecular orientation at its inner wall. In some embodiments, the expansion ratio of the inner wall of at least one of the inner layers is substantially optimized such that the inner layer resists further stretching. In some embodiments, at least one end of a neck of the first balloon is axially offset from the corresponding end of a neck of the second balloon.

In some embodiments, the expansion ratio of both of the inner walls of the inner layers is optimized such that the inner layers a resist further stretching. In some embodiments, the first balloon and the second balloon are each formed from co-extruded tubing with at least two different materials having different stretch properties. In some embodiments, the outer layer of the first balloon is configured to slide relative to the inner layer of the second balloon. In some embodiments, at least one of the inner layers comprises a stress crack mitigating layer. In some embodiments, a neck of the first balloon is fused to a neck of the second balloon at a location spaced from the proximal end of a catheter. In some embodiments, at least one end of a neck of the first balloon is staggered from the corresponding end of a neck of the second balloon. In some embodiments, the neck of the second balloon has a small diameter than the neck of the first balloon. In some embodiments, the neck of the second balloon has a longer length than the neck of the first balloon. In some embodiments, the neck of the second balloon is configured to be welded to a catheter. In some embodiments, the neck of the first balloon is configured to be welded to the neck of the second balloon at a location along the neck of the second balloon.

In some embodiments, a method of making a nested balloon is provided. The method can include the step of selecting a first co-extruded tubular section comprising a first inner layer and a first outer layer, the first inner layer and the first outer layer having different materials with different stretch properties. The method can include the step of selecting a second co-extruded tubular section comprising a second inner layer and a second outer layer, the second inner layer and the second outer layer having different materials with different stretch properties. The method can include the step of positioning the first co-extruded tubular section within the second co-extruded tubular section to form a nested balloon. In some embodiments, at least one end of a neck of the first balloon is axially offset from the corresponding end of a neck of the second balloon.

The method can include the step of stretching each layer of the first and second co-extruded tubular sections to within approximately 15% of its optimal radial stretch, the optimal radial stretch for each layer determined based upon the inner surface of the layer. The method can include the step of fluting the first co-extruded tubular section. The method can include the step of wrapping the first co-extruded tubular section. In some embodiments, a radially inwardly facing surface of the second inner layer is provided with a slip layer. In some embodiments, at least one layer comprises nylon. In some embodiments, the second outer layer comprises nylon. In some embodiments, the first co-extruded tubular section and second co-extruded tubular section fail at approximately the same pressure when a pressure is applied to the nested balloon. The method can include the step of welding the neck of the second balloon to a catheter. The method can include the step of welding the neck of the first balloon to the neck of the second balloon at a location along the neck of the second balloon.

Another aspect comprises a nested balloon with two balloons having the same or different material properties. In some embodiments, the outer layer of at least one of the balloons can comprise a material of high strength and hardness. In yet another aspect, the outer layer can be polyamides, polyesters, polyethylenes, polyurethanes and their co-polymers. One suitable material is polyamide (nylon). It will be apparent that further variations are possible involving structural layers of other material or chemical composition.

In some embodiments, the inner layer of at least one of the balloons can comprise a material of lower strength and hardness. One suitable material is Pebax (Arkema polyether block amide). Another aspect comprises a balloon, wherein at least one layer of at least one of the balloons has at least one low friction surface. The inner layer of one of the balloons can have a low coefficient of friction to advantageously allow sliding between adjacent balloons. As a result, flexibility of the nested balloon is increased over single balloons having an equal wall thickness. Other aspects involve a different number of structural layers for each individual balloon, such as, for example, three structural layers, four structural layers, and five structural layers.

Another aspect involves a nested balloon where each balloon has a different size (e.g., diameter and/or wall thickness). In some embodiments, each balloon is comprised of the same material or materials having substantially identical mechanical properties. In some embodiments, each balloon has the same degree of molecular orientation in the body portion of the balloon.

Another aspect involves a method for creating balloons with low friction interfaces by nesting multiple balloons. It will be apparent that these methods can be combined with each other and other balloon forming methods to produce stronger balloons.

In one aspect, the bodies of the balloons can be formed separately on the different molds to ensure that they have the proper size. The necks may be specifically designed to ensure optimal welding and/or attachment to the catheter. It will be apparent that other methods can be used. It will also be apparent that similar results can be achieved by making the outer balloon wider than the inner balloon.

In another aspect, separately formed balloons can be nested after altering the orientation of one balloon to make it thinner, facilitating insertion.

Balloons need not be formed and processed identically to obtain equivalent burst strengths, and/or molecular orientations. This is especially true for balloons of different materials. Other suitable methods can also be used to achieve uniform molecular alignment among the balloons.

In another aspect of some embodiments, already nested balloons can be treated as a single balloon. As a result, one can manufacture nested balloons with a greater numbers of balloons (about or at least about 2, 3, 4, 5, 6, or more balloons) than those specifically disclosed herein.

Some important parameters for performance assessment of high pressure balloon catheters include the rated burst pressure, the balloon compliance, the size of the introducer, the flexibility of the folded balloon section of the catheter and the production cost. In some embodiments, the rated burst pressure is about or greater than about 20, 25, 30, 35, or more atmospheres. In some embodiments, the balloon compliance is less than about five percent as measured between nominal pressure and rated burst pressure.

BRIEF DESCRIPTION OF THE DRAWINGS

These and other features, aspects, and advantages of the present invention will now be described in connection with preferred embodiments of the invention shown in the accompanying drawings. The illustrated embodiments, however, are merely an example and are not intended to limit the invention. The drawings are briefly described as follows:

FIG. 4 is an enlarged cross-sectional view of a fluted balloon catheter that has developed a crack deformity upon wrapping.

FIG. 5 is a perspective view of a balloon catheter that has developed an axial tear.

FIG. 6 is a perspective view of a balloon catheter that has developed a fish-eye deformity.

FIG. 10 shows that once optimal stretch is achieved, a balloon material will have its greatest strength and will resist further growth.

FIG. 15 is a schematic showing the wall profile of a single balloon catheter that is represented in the graph of FIG. 16.

FIG. 16 is a graph of a single balloon catheter showing the relative stretch ratio as a function of wall slice with wall position on the x-axis and percentage of inner balloon stretch on the y-axis.

FIG. 20 shows optimal stretch is only achieved for the inner wall of the inner balloon.

FIG. 27 shows the inner stretch of wall slices of each layer of the dual-layer balloon relative to the inner stretch of corresponding wall slices of the single balloon.

FIG. 28A is a perspective view of a balloon catheter having an element shown aligned in a longitudinal direction and in a lateral direction.

FIG. 28B is an enlarged perspective view of the longitudinally-aligned element of the balloon catheter as shown in FIG. 28A.

FIGS. 33A-33B are graphs of a single balloon catheter and nested balloon catheter illustrating and comparing the superior and unexpected wall stretch properties of a nested balloon comprising a co-extruded inner layer and a co-extruded outer layer at a given wall thickness with respect to a single layer balloon having the same wall thickness. As noted, each balloon in the nested balloon catheter is dual-layer balloon manufactured from co-extruded tubing. Both the single balloon and nested balloon have the same overall wall thickness. FIG. 33A shows an embodiment where the stress crack mitigating inner layer is not optimized. FIG. 33B shows an embodiment where the stress crack mitigating inner layer is optimized.

FIG. 38 is a graph of the change in diameter due to a change in pressure for annealed nested balloons, according to some embodiments.

DETAILED DESCRIPTION

Embodiments of the present invention will now be described more fully hereinafter with reference to accompanying drawings, in which preferred embodiments are shown. This invention may, however, be embodied in many different forms and should not be construed as limited to the embodiments set forth herein; rather, these embodiments are provided so that this disclosure will be thorough and exemplary of the scope of the invention to those skilled in the art.

Figures 1A, 1B:
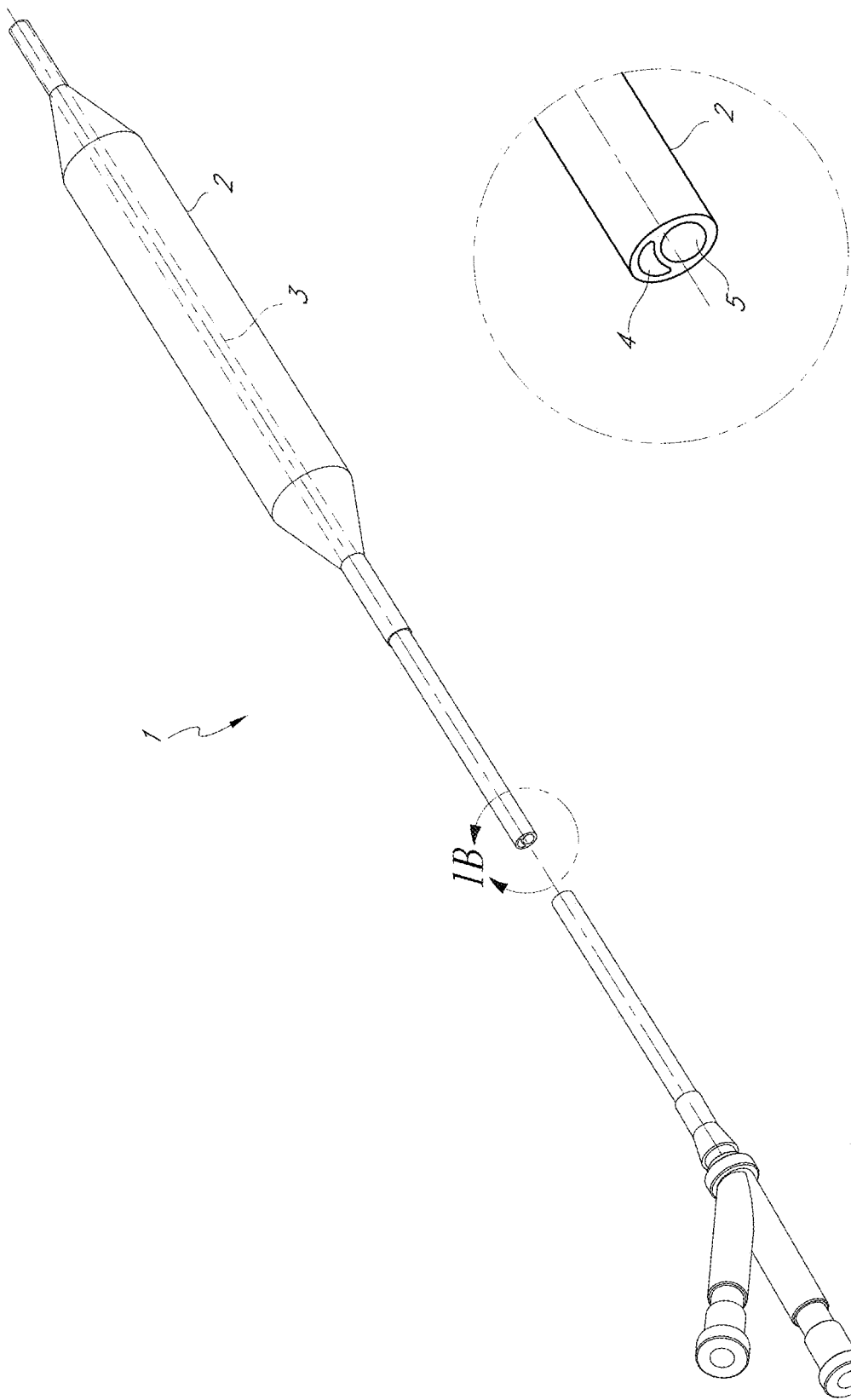
FIG. 1A is a perspective view of an exemplary prior art balloon catheter.
FIG. 1B is an enlarged perspective view of a cross-section of a prior art balloon catheter shaft.

FIGS. 1A and 1B show an exemplary embodiment of a prior art balloon catheter system 1. A balloon 2 is attached to the distal end of a catheter shaft 3 and is inflated through an inflation lumen 4. A guide wire lumen 5 is provided on the catheter system 1, which allows for external control of the balloon 2 and the catheter 3 when the system 1 is disposed within a patient. It should be noted that further variations (e.g., rapid exchange, concentric lumen, etc.) are possible for this structure.

Figure 2:
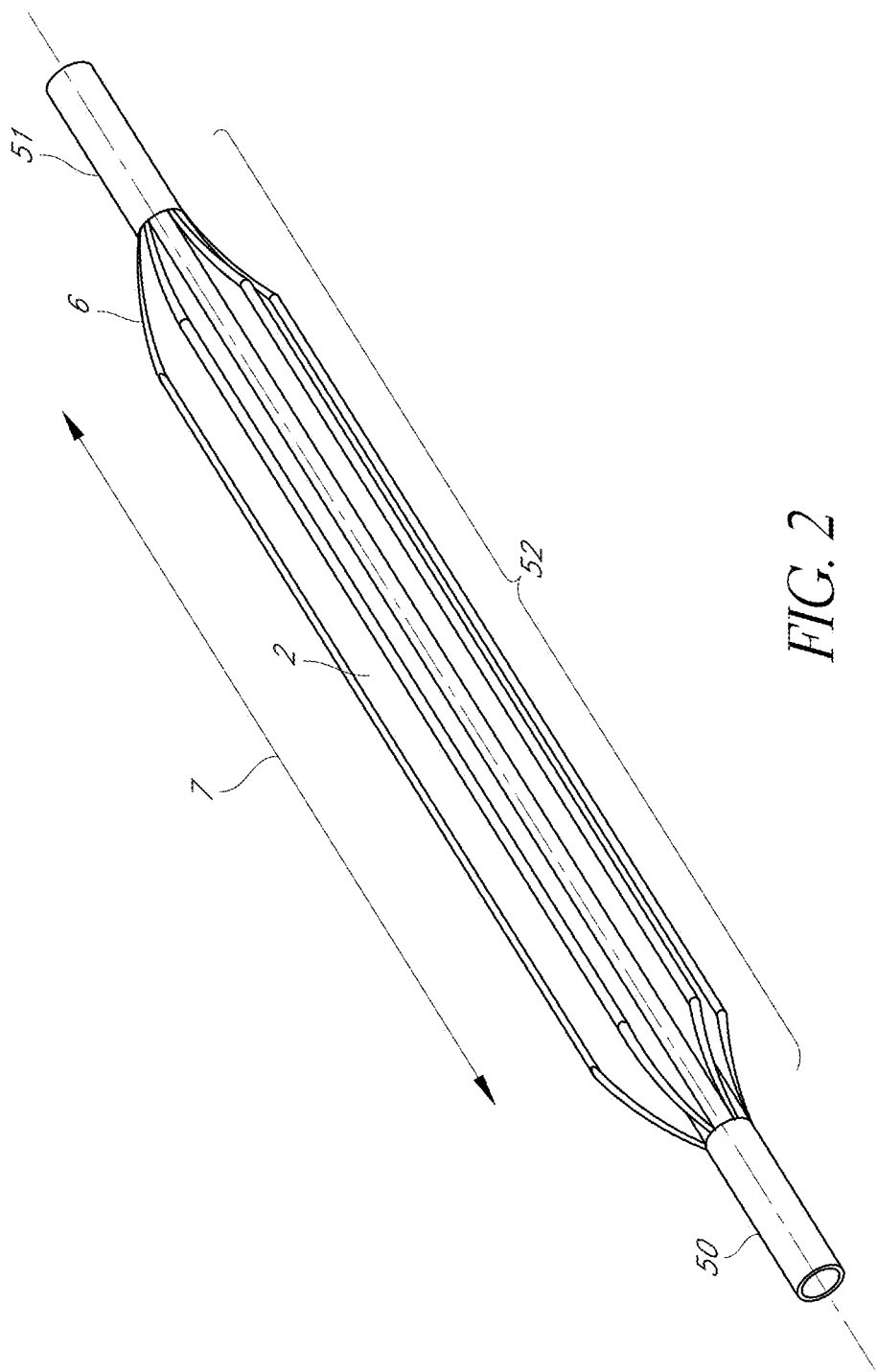
FIG. 2 is a perspective view of a balloon catheter having a plurality of flutes.

FIG. 2 illustrates a perspective view of an embodiment of a prior art catheter balloon 2 in an unwrapped and deflated configuration. The balloon 2 is folded into a plurality of flutes 6, typically ranging from three to eight flutes. The plurality of flutes 6 are formed in a direction substantially parallel to a longitudinal direction of the balloon 7. The plurality of flutes 6 are folded with a slight curvature in order to facilitate subsequently wrapping the fluted balloon 2 around the catheter shaft 3 (as shown in FIG. 1A). The balloon 2 attaches to the catheter shaft 3 both at a proximal neck of the balloon 50 and at a distal neck of the balloon 51. The balloon 2 also includes a body portion 52, which can be inflated and deflated when the balloon 2 is disposed within the body of a patient during a particular medical procedure.

Figure 3B:
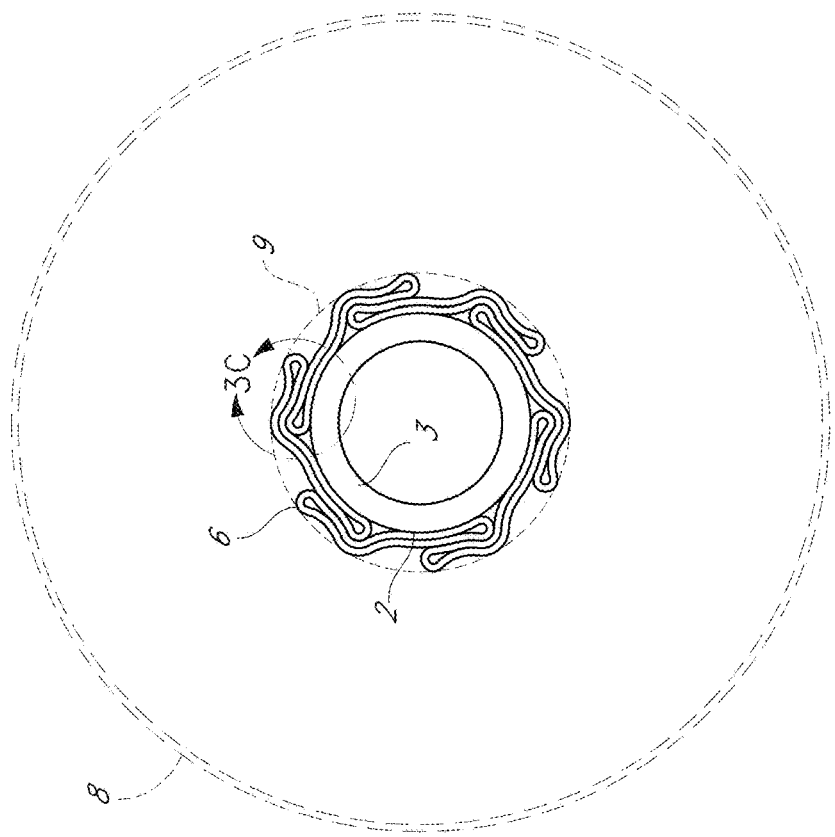
FIG. 3B is a cross-sectional view of a fluted balloon catheter after wrapping.
Figure 3A:
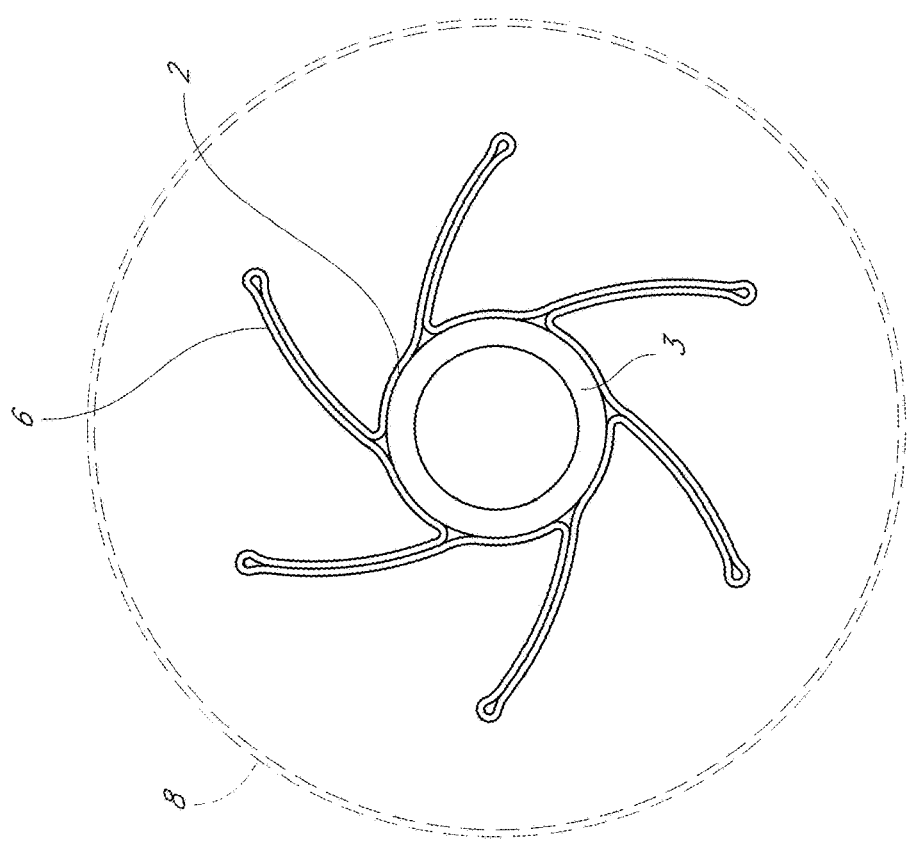
FIG. 3A is a cross-sectional view of a fluted balloon catheter before wrapping has been performed.

FIG. 3A shows a cross-section of an embodiment of a prior art fluted balloon 2 on a catheter shaft 3. The fluted balloon 2 has a plurality of flutes 6. In the illustrated embodiment, the plurality of flutes 6 comprises six flutes. The deflated fluted balloon 2 has a relatively small cross-sectional area, but can have a relatively wide diameter because the thin flutes 6 stretch radially outward from the catheter shaft 3. Upon inflation, the balloon 2 can expand to have a much larger diameter and cross-sectional area 8, as shown in the circular phantom lines in FIG. 3A.

FIG. 3B shows a cross-section of an embodiment of a prior art fluted balloon 2 after it has been wrapped. The plurality of flutes 6 are folded down and about the catheter shaft 3 such that they are in close contact with each other and the catheter shaft 3. Once the balloon 2 is wrapped, the deflated balloon's diameter and cross-sectional area 9 (sometimes referred to as the crossing profile) is much smaller than the inflated balloon's diameter and cross-sectional area 8 (as seen in the circular phantom lines in FIG. 3B). Having a balloon 2 with a small diameter and cross-sectional area 9 allows the catheter 2 to be guided through smaller passageways within a patient's body. Inflating the balloon 2 to have a larger diameter and cross-sectional area 8 advantageously allows for the placement of a larger stent, occlusion of a larger passageway, and generally greater versatility once the catheter 2 has reached a particular treatment site within a patient's body.

Figure 3E:
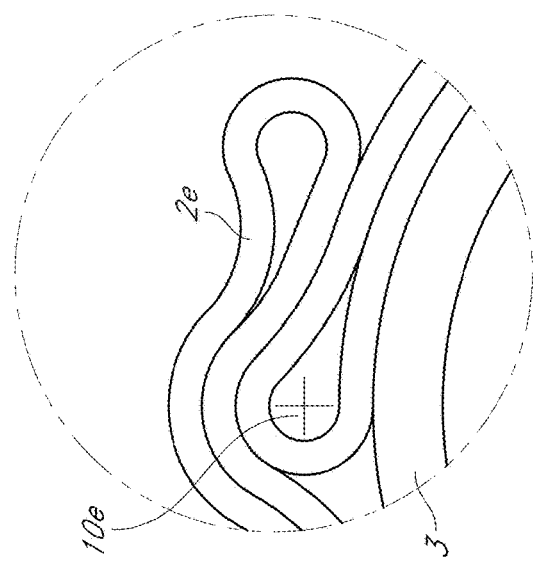
FIGS. 3C through 3E are enlarged cross-sectional views of three different fluted balloon catheters after wrapping.
Figure 3D:
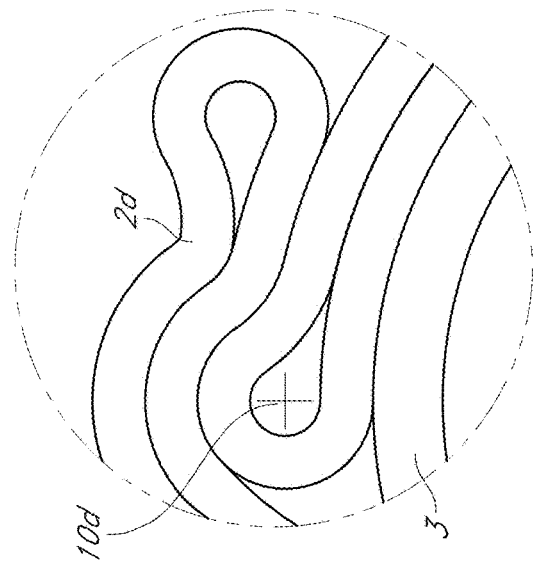
Figure 3F:
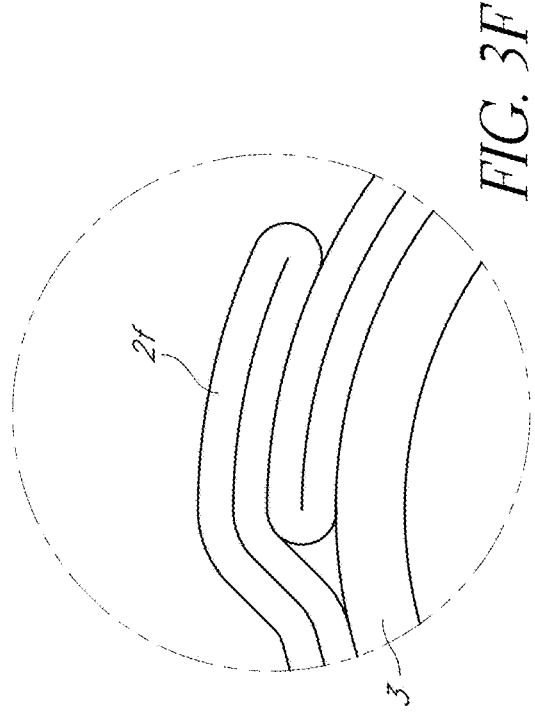
FIG. 3F is an enlarged cross-sectional view of a fluted balloon catheter after wrapping and compression.
Figure 3C:
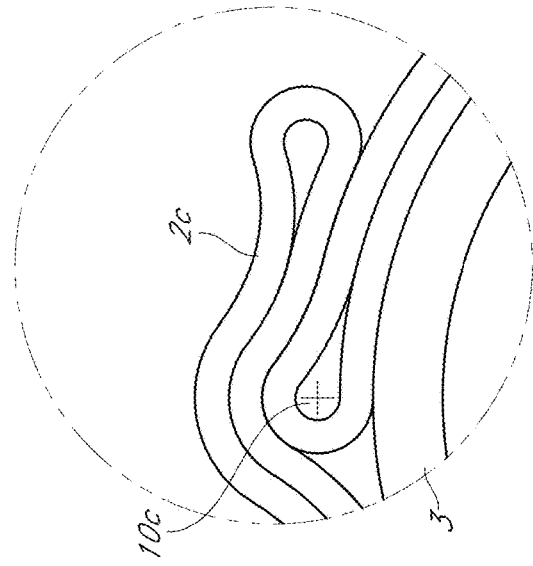

FIGS. 3C through 3E generally illustrate enlarged views of several configurations of balloon folding patterns. FIG. 3C illustrates an enlarged side elevational view of a cross-section of a prior art fluted balloon 2c after wrapping. As shown in FIG. 3C, the reduction in size of the wrapped balloon 2c about the catheter shaft 3 is limited by the balloon's bend radius 10c. In general, a balloon's bend radius increases with the thickness and toughness of the balloon, as can be seen by comparing FIG. 3C with FIGS. 3D and 3E. FIG. 3D shows a balloon 2d that is thicker than the balloon 2c shown in FIG. 3C. As can be seen in FIG. 3D, the bend radius 10d for the thicker balloon 2d is larger than the bend radius of the balloon 2c in FIG. 3C. FIG. 3E shows a balloon 2e having the same thickness as the balloon 2c of FIG. 3C, but being composed of a tougher or less flexible material than that of the balloon in FIG. 3C. As can be seen in FIG. 3E, the bend radius 10e for the tougher balloon 2e is also larger than the bend radius of the balloon 2c in FIG. 3C. Accordingly, both a thicker balloon 2d and a tougher balloon 2e typically cannot be folded into as small a cross-section as the balloon 2c of FIG. 3C. The bend radius of a balloon is important because bending a balloon beyond its bend radius can cause deformities which will lower the balloon's resistance to bursting when inflated.

FIG. 3F shows a balloon 2f wrapped about a catheter shaft 3. The balloon 2f has a negligible bend radius and can, therefore, be tightly wrapped about the catheter shaft 3 without any protrusions developing on the outer surface of the folded and wrapped balloon 2f. Advantageously, this configuration permits the diameter and the cross-section of the balloon 2f to be minimized prior to, and during, insertion of the balloon catheter system into a patient's body. In addition, as discussed in further detail below, this configuration minimizes failure of the balloon 2f during a medical application due to a deformity developing on the balloon's outer surface.

FIGS. 4 through 6 generally show deformities that can develop on a balloon's outer surface. As shown in FIG. 4, a wrapped balloon 2 is folded and compressed beyond its bend radius 10 creating a crack 11 in the outer surface of the wrapped balloon 2 near the site of a fold. Such cracking is more likely for less compliant materials, which also generally have higher burst strengths. Thus, there is a general tradeoff between burst strength and flexibility. Once the crack 11 has formed, stress will concentrate near the crack 11 when the balloon 2 is inflated, causing the crack 11 to expand and ultimately causing failure of the balloon 2 (e.g., by bursting).

FIG. 5 shows another deformity that occurs in balloons. When a medical device such as a stent is applied over a balloon 2, it can create a scratch or axial tear 12. The scratch or axial tear 12 generally extends in the longitudinal direction of the balloon 2. Again, the likelihood of scratching can be minimized by using a more compliant material, which also has a lower burst strength. Once the scratch 12 has formed, stress will concentrate near the scratch 12 when the balloon 2 is inflated, causing the scratch 12 to expand and ultimately causing failure of the balloon 2 (e.g., by bursting).

FIG. 6 illustrates yet another type of deformity. When a balloon is formed, there may be regions of low molecular density or imperfections in the molecular lattice. As a result, a small hole 13 can form upon stretching the balloon 2. The hole 13 can grow as the balloon 2 is stretched further, often resembling a "fish-eye." Stress concentrates near the edges of the fish-eye deformity 13. Since the balloon 2 is stretched during inflation, this can also lead to failure of the balloon 2 (e.g., by bursting).

Figure 7B:
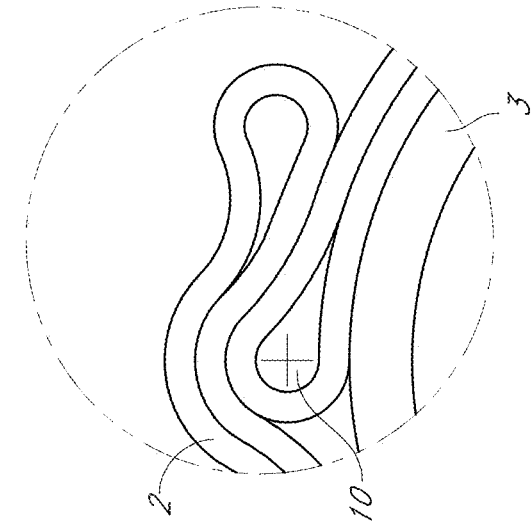
FIG. 7B is an enlarged cross-sectional view of a fluted single balloon catheter after wrapping.
Figure 7A:
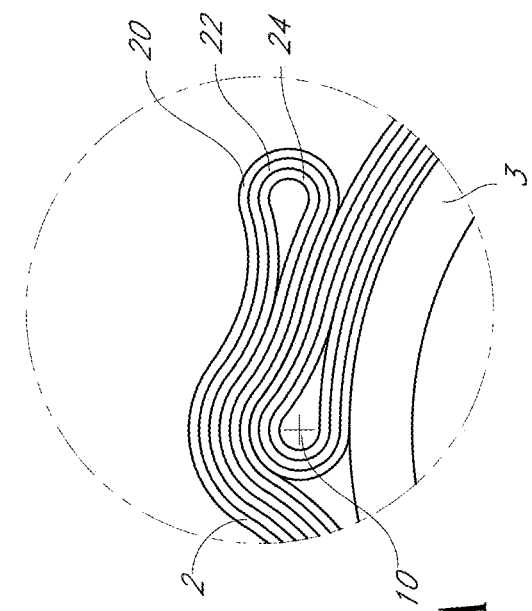
FIG. 7A is an enlarged cross-sectional view of a fluted nested balloon catheter after wrapping.
Figure 8B:
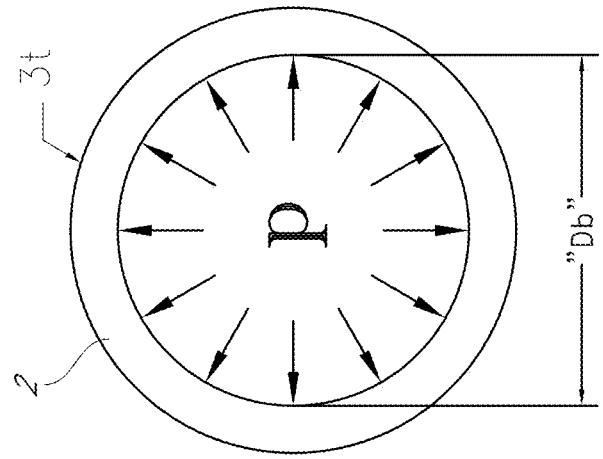
FIG. 8B is a cross-sectional view of a single balloon catheter after inflation.
Figure 8A:
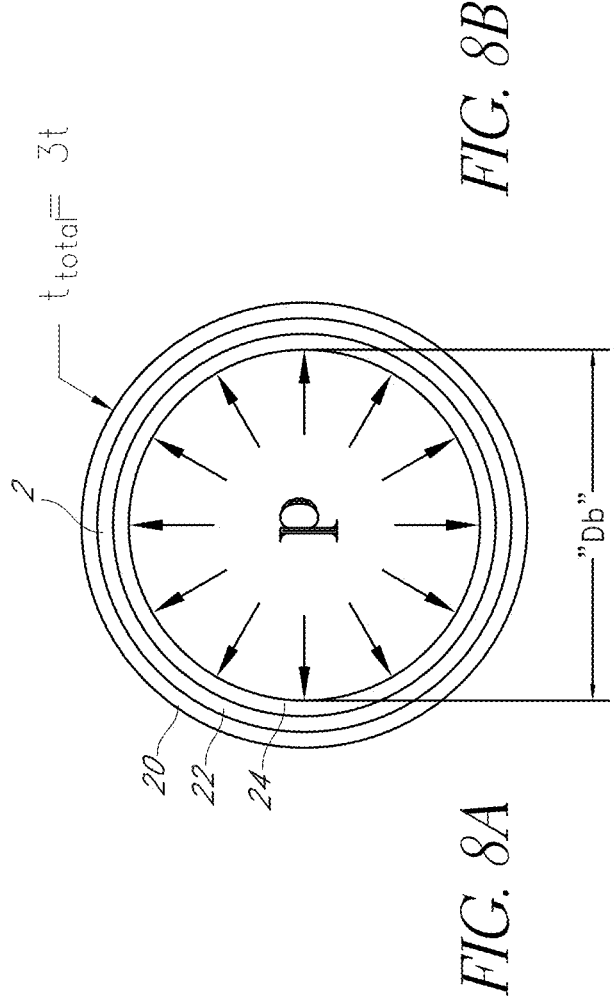
FIG. 8A is a cross-sectional view of a nested balloon catheter after inflation.

FIGS. 7A and 8A show an enlarged cross-section of an embodiment of a nested balloon 2 having a first balloon 20, a second balloon 22, and a third balloon 24. Each balloon can be formed by the same process or a different process. In some embodiments, one or more of the first balloon 20, the second balloon 22, and the third balloon 24 are formed from parisons or co-extrusion. While the nested balloon 2 is shown with three balloons, 20, 22, 24, other configurations are contemplated (e.g., two balloons, four balloons, five balloons, six balloons, etc.)

In some embodiments, in which the nested balloon 2 comprises multiple balloons, one or more of the balloons can comprise one, two, or more layers, as described herein. In some embodiments, each balloon in a nested balloon can comprise one or more layers. In some embodiments, each balloon in a nested balloon can comprise two or more layers. In some embodiments, two or more layers of the same balloon have different properties. In some embodiments, two or more layers of the same balloon have the same properties. In some embodiments, two or more layers of a single balloon are bonded together. In some embodiments, two or more layers of a single balloon are integrally formed.

The properties of the layer can depend on the location of the layer within the nested balloon. For instance, the first balloon 20 can comprise an outer layer, such as a material of high strength and hardness. The first balloon 20 can comprise an inner layer, such as a material having a low coefficient of friction. The outer layer and the inner layer can be bonded together. Other layers can be disposed between the outer layer and the inner layer of the first balloon 20. Each layer can have an inner wall. The properties of the inner wall can be optimized, as disclosed herein. The material selection of the layers of the first balloon 20, the second balloon 22, and the third balloon 24 are described in greater detail herein.

The nested balloon 2 is shown in the wrapped position in FIG. 7A. The wrapped position is described with respect to FIGS. 3A and 3B. In comparison, a single balloon 2' is also shown in the wrapped position in FIG. 7B. The cumulative thickness of the balloons 2, 2' shown in FIGS. 7A and 7B are equal.

In some embodiments with three balloons, the first balloon 20 of the nested balloon 2 has a thickness that is approximately one-third the thickness of the single balloon 2' shown in FIG. 7B. The second balloon 22 and the third balloon 24 also each have a thickness that is approximately one-third the thickness of the single balloon 2' shown in FIG. 7B. In other embodiments, the balloons 20, 22, 24 have unequal thicknesses that equal the cumulative thickness of the single balloon 2'. While three balloons 20, 22, 24 are shown in FIG. 7A, other configurations are possible, such as two balloons or four balloons. In some embodiments, each balloon of a two balloon nested balloon 2 has one-half the thickness of the single balloon 2'. In some embodiments, each balloon of a four balloon nested balloon 2 has one-fourth the thickness of the single balloon 2'. Because each balloon 20, 22, 24 of the nested balloon 2 is thinner than the single balloon 2' of FIG. 7B, the bend radius 10 is smaller. Because the cumulative thickness of the nested balloon 2 of FIG. 7A is substantially the same as the thickness of the single balloon 2' of FIG. 7B, the burst pressure P could in some cases be the substantially the same as long as adjacent balloons 20, 22, 24 of the nested balloon 2 can slide relative to each other. However, in some embodiments, depending on the materials and other parameters and the desired clinical result the burst pressure of a nested balloon can be greater than the single balloon having the same cumulative thickness.

In some embodiments, a nested balloon 2 comprises a first balloon 20 and a second balloon 22 but not the third balloon 24. In some embodiment, the first balloon 20 has one-half the thickness of the single balloon 2' and the second balloon 22 has one-half the thickness of the single balloon 2'. Because each balloon 20, 22 is thinner than the single balloon 2' of FIG. 7B, the bend radius 10 is smaller.

As shown in FIGS. 7B and 8B, the single balloon 2' has a total thickness 3t that is equivalent the thickness of the nested balloon 2 shown in FIGS. 7A and 8A. In this example, each balloon 20, 22, 24 has a thickness t. As shown in FIG. 7B, the single balloon 2' has a larger bend radius 10', and thus cannot be folded as closely to the catheter shaft 3. In FIG. 7A, adjacent balloons 20, 22, 24 of the nested balloon 2 can slide relative to each other. The nested balloon has a smaller bend radius, and thus can be folded closer to the catheter shaft 3.

Because the nested design is more flexible, as discussed below, deformities as shown in FIGS. 4-6 are less likely to occur. Further, the material of the balloon or the material of the layers of the nested balloon 2 can be selected to reduce the risk of deformities. In some embodiments, the first balloon 20 or the outer layer of the first balloon 20 can resist scratches.

Meanwhile, the burst pressure P for a nested balloon 2 is substantially greater as will be shown as that for an equivalent thickness single balloon 2', as described herein. It will be apparent that similar effects can be achieved by varying the material in each balloon layer, varying the number of balloons, and varying other aspects of this embodiment.

In some embodiments, the first balloon 20 of the nested balloon 2 has an outer layer which is preferably scratch and puncture resistant. When a device such as a stent is applied to the catheter system, it is typically crimped onto the nested balloon 2. The applied crimping force should be such as to provide a sufficiently strong attachment force, yet it should also not scratch, pierce, or otherwise damage the nested balloon 2. By selecting the material of the first balloon 20 or the outer layer of the first balloon 20, (which can comprise an outer surface of the nested balloon 2), the risk of failure due to scratching can be decreased.

The second balloon 22 and the third balloon 24 (which comprise inner balloons of the nested balloon 2) can be made of the same material as the first balloon 20 or a different material than the first balloon 20. In some embodiments, the second 22 and the third balloon 24 comprise the same material. These balloons 22, 24 can be protected from scratching by the first balloon 20, and can provide additional strength to the nested balloon 2. It should be noted that the above-described effects need not always be achieved simultaneously, and they are not necessarily sensitive to the number of balloon, composition of other balloon, form of device carried by the catheter, or other aspects of this embodiment.

As is discussed in greater detail below, each balloon 20, 22, 24 may be differently sized and shaped in the body portion, in order to optimize the burst characteristics of the balloon. As the nested balloon 2 is inflated, each balloon 20, 22, 24 is stretched, causing the thickness of each balloon 20, 22, 24 to shrink. The nested balloon 2 can be designed such that the inner wall of each balloon 20, 22, 24 reaches the point of optimal stretch, as described herein. When the inner wall of each balloon 20, 22, 24 reaches the point of optimal stretch, the stretch of the outer wall of each balloon 20, 22, 24 is more optimal than the outer wall of the single balloon 2'. Referring back to FIGS. 7A and 7B, each balloon 20, 22, 24 is has a thickness t and the single balloon 2' has a thickness 3t. There is a smaller gradient of stretch from the inner wall to the outer wall of each balloon 20, 22, 24 than the gradient of stretch from the inner wall to the outer wall of the single balloon 2'.

In some embodiments, incorporating different material for each of the balloons 20, 22, 24 can allow the nested balloon 2 reach the optimal stretch of each inner wall at the required diameter. In some embodiments, incorporating different sizes for each of the balloons 20, 22, 24 can allow the nested balloon 2 reach the optimal stretch of each inner wall at the required diameter. In some embodiments, the design of each layer of each balloon 20, 22, 24 can allow the nested balloon 2 reach the optimal stretch of each inner wall at the required diameter.

In the nested configuration, the inner wall of the first balloon 20 needs to stretch to a distance between the diameter of the tube (deflated) and the required diameter (inflated). The inner wall of the second balloon 22, disposed inside the first balloon 20, needs to stretch to a larger distance than the first balloon 20 between the diameter of the tube (deflated) and the required diameter (inflated). The inner wall of the third balloon, if present, disposed inside the second balloon 22, needs to stretch to a larger distance than the first balloon 20 and the second balloon between the diameter of the tube (deflated) and the required diameter (inflated). The inner wall of the third balloon 24, if present, needs to stretch the greatest distance. The configuration is shown in FIG. 8A. The balloons 20, 22, 24 can be formed from the same, or different diameter tubing to allow tailoring of the stretch of the inner wall of each balloon. The balloons 20, 22, 24 can be formed from the same, or different materials to allow tailoring of the stretch of the inner wall of each balloon.

Figure 9:
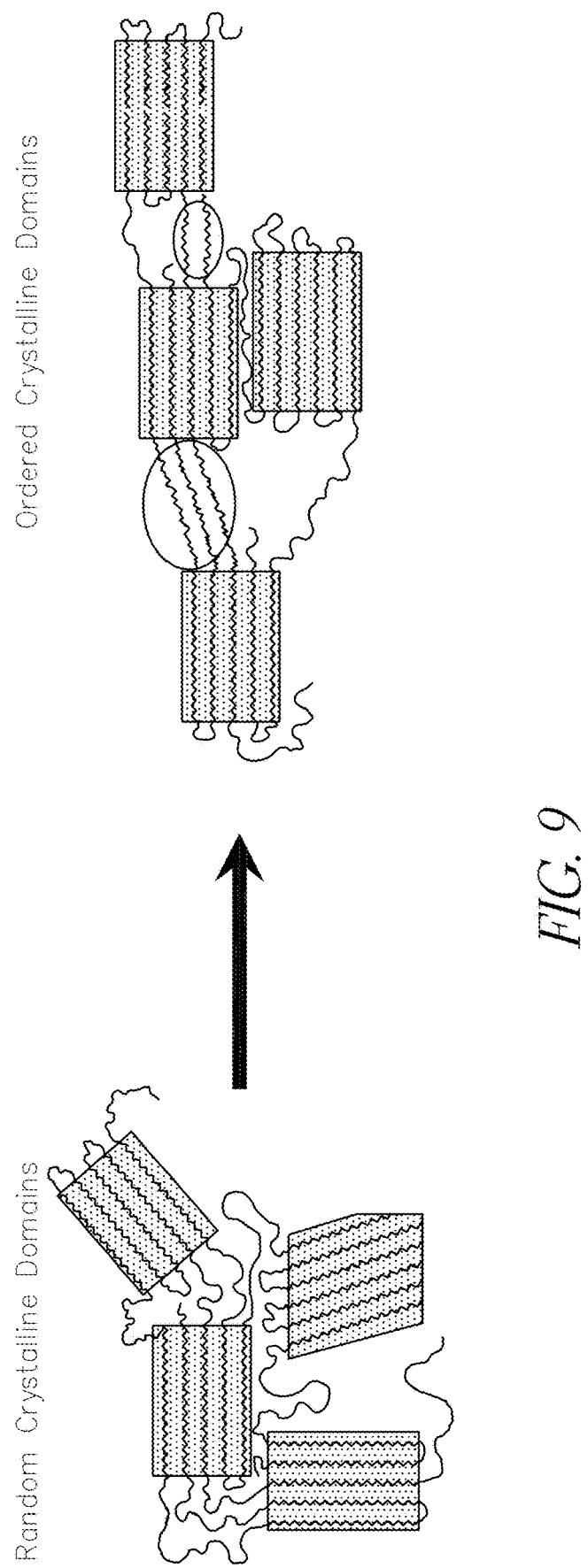
FIG. 9 is a schematic showing the stretching of polymers to align their molecular chains through a blow molding process.
Figure 10:
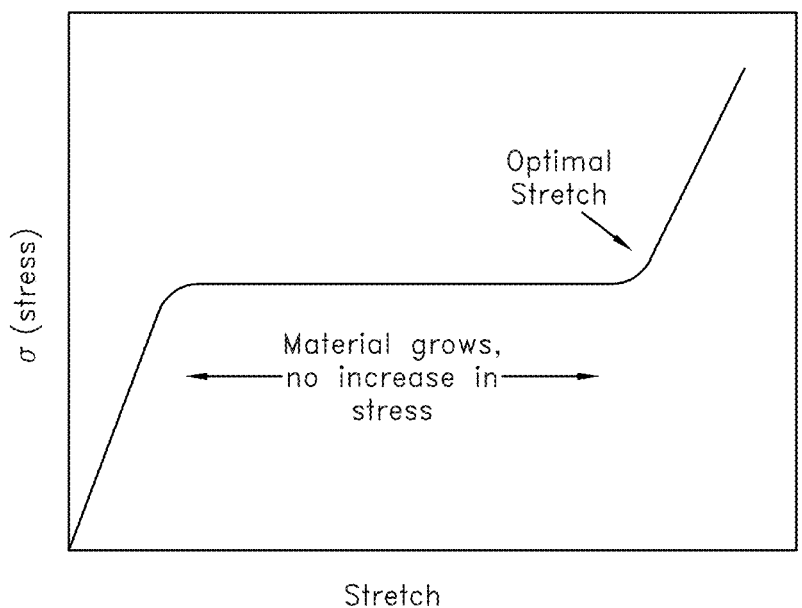
FIG. 10 is a stress-strain curve with strain, or the amount that a balloon will stretch during formation, on the x-axis and stress, or the applied pressure, on the y-axis.

With reference to FIGS. 9 and 10, an objective of blow molding in balloon formation is to stretch the polymer material in order to achieve maximum strength and semi-compliance. In blowing molding balloons used in high pressure PTA and PTCA catheters, the intent is to stretch the tubing polymer in biaxial fashion so as to align the polymer molecules along the length and circumference of the balloon. This alignment of the molecular chains is shown in FIG. 9. During the stretching process, the material will grow until the polymer chains are aligned. Once the polymer chains are aligned, the material resists further growth and provides maximum strength. Such orientation provides the greatest strength for the material and resistance to further stretching. The extreme strength of thin polymer films that form balloons comes from biaxial molecular orientation. The ultimate tensile strength of fully oriented material increases by a factor of four to five as compared to as-extruded tubing. The extent of molecular orientation is proportional to amount of stretch (e.g., deformation, strain) imparted to the walls of the balloon.

Theoretically there is an optimal stretch for each material. This is shown on the idealized stress-strain curve in FIG. 10. In response to the strain caused by stretching, the material exhibits relatively even stress, shown by the flat region in FIG. 10. Once the polymer chains are aligned at the optimal stretch point, the material resists further growth as shown by an increase in stress. In the ideal cases, all polymer chains will be uniformly stretched at the optimal stretch point. Various polymer materials will have different ideal stretch ratios in order to achieve uniform molecular alignment. For instance, if the tube is under-stretched, such as any point along the flat region shown in FIG. 10, then the polymers do not achieve the optimal alignment and strength. Pressurizing such a balloon will result further growth and stretch of the polymer chains in an uncontrolled fashion, especially in absence of proper temperature and dimensional control. The expected result is reduced burst pressure, reduced fatigue (ability to inflate to maximum pressure repeatedly) and lack of recovery in compliance. For instance, if the tube is over-stretched, such as any point above the optimal stretch point, the polymers become strained, resulting in bursting at lower pressures and reduced fatigue.

Optimum stretch for a balloon is dependent upon a number of variables. For a given material, there is a calculated optimum stretch that provides optimum strength of the balloon. The calculated optimum stretch is dependent upon, for example, the diameter of the balloon and the thickness of the layers which comprise the balloon. Practically, it can be very difficult to stretch a balloon to its exact optimum stretch. Thus, for most applications, stretching a material to within 15% of its optimum stretch, such as to within less than 10%, will provide optimum balloon strength.

During the balloon forming process, the polymer material is stretched both radially and longitudinally in order to achieve biaxial orientation of the polymer chains. As balloons are typically cylindrical, there are two key areas of stress that come into play. The first key area of stress is hoop or radial stress, resulting from pressure aligned along the circumference of the cylinder. Hoop stress of the inflated balloon equals the pressure multiplied by the radius of the inflated balloon divided by the thickness of the inflated balloon. The polymer stretch around the circumference of the balloon provides strength against bursting from hoop stress. The polymers act much like the bands around a barrel to prevent bursting. The second key area of stress is axial or longitudinal stress, which is aligned along the central axis. Axial stress of the inflated balloon equals the pressure multiplied by the radius of the inflated balloon divided by twice the thickness of the inflated balloon. Therefore, hoop or radial stress is twice that of axial or longitudinal stress. As a result, optimizing the radial stretch is more important to burst resistance than longitudinal stretch. For medical balloons, the critical attribute is often the maximum hoop strength.

Figure 11:
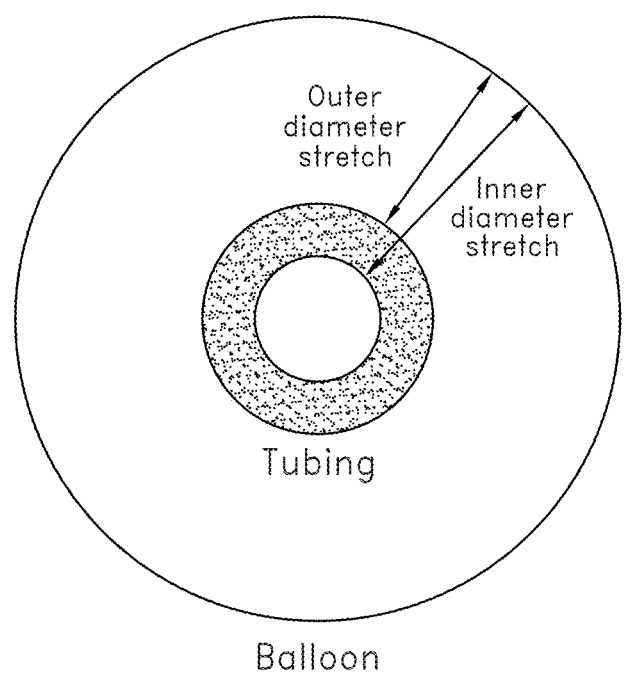
FIG. 11 is a diagram illustrating the inner diameter stretch and the outer diameter stretch of single balloon tubing when expanded and showing that the outer diameter stretch is less than the inner diameter stretch.
Figure 12:
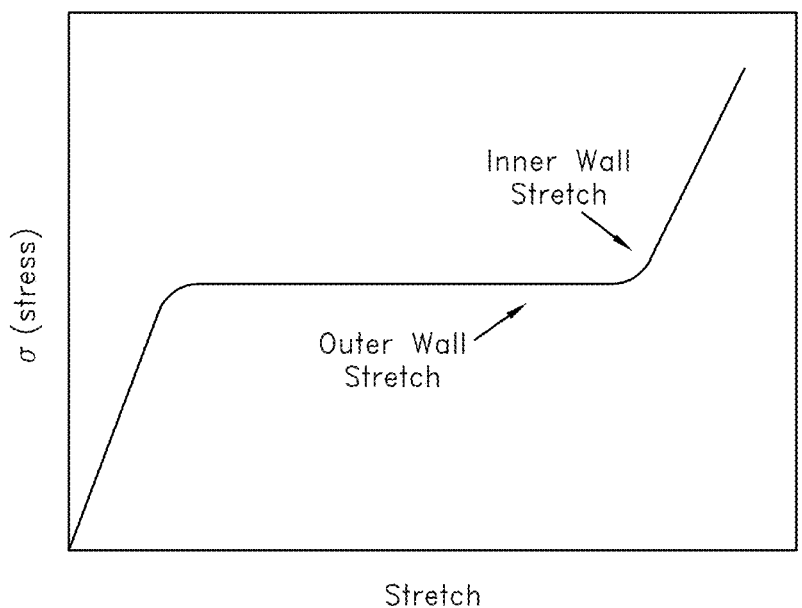
FIG. 12 is a stress-strain curve showing that when the inner wall stretch of single balloon tubing is optimized, the outer wall stretch is sub-optimal and will continue to expand when applied pressure is increased.

With reference to FIGS. 11 and 12, radial stretch confounds the goal to achieve a uniform stretch of the polymer material. The reason for this is that balloons are blow molded from tubing having thicker walls. As shown in FIG. 11, a confounding factor in balloon forming is that the stretch of the circumference of the inner wall of the tubing to the inner wall of the inflated balloon will always be greater than that of the outer wall of the tubing to the outer wall of the inflated balloon. The difference in wall thickness between the tubing and the inflated balloon will cause the stretch of the inner wall of the initial tubing to be greater than that of the respective outer wall. This disparity between the stretch of the inner wall and the outer wall increases with the increase in the thickness of the initial tubing.

In some embodiments, the outer wall of the balloon will have a lower level of molecular orientation than the inner wall of the same balloon. The lower level of molecular orientation of the outer wall is related to the shorter distance from outer diameter of the tube to the balloon mold wall as compared to distance from inner diameter of the tube to balloon mold wall (assuming thickness of the balloon is negligible). For example, a balloon is produced from nylon tubing having an outer diameter of 0.031 and an inner diameter of 0.019. The mold has an inner diameter of 0.118 and the thickness of the balloon is negligible when inflated for ease of calculation. The expansion ratio for the outer wall is 3.8 (0.118/0.031) and the expansion ratio of the inner wall is 6.2 (0.118/0.019).

The mold can be designed such that the inner wall reaches full molecular orientation. In the example above, let us assume that full molecular orientation occurs at an expansion ratio of 6.2. The outer wall which only expanded by a ratio of 3.8, not the optimal 6.2, has not reached full molecular orientation. A thicker tubing causes a greater disparity in the level of molecular orientation between the outer wall and the inner wall. A thinner tubing causes, in some cases, less disparity in the level of molecular orientation between the outer wall and the inner wall. The smaller the difference between the outer diameter and the inner diameter of the tubing, the greater the expansion ratio for the outer wall. The smaller the difference between the outer diameter and the inner diameter of the tubing, the outer wall experiences greater molecular orientation.

A problem encountered in the art is optimizing the radial stretch of the balloon tubing. In view of the non-uniform stretch between the inner wall and the outer wall of the tubing, some embodiments aim to optimize the molecular orientation of the inner wall. The highest hoop stress is on the inner wall of the balloon where the molecules are at the maximum orientation level. On the inner wall, there is very little radial stretchability. While moving through the balloon towards the outer wall, the molecules are not at the maximum orientation level. On the outer wall, there is more radial stretchability since the outer wall was expanded radially by a lesser amount (e.g., expansion ration of 3.8 compared to the optimal expansion ratio of 6.2 in the previous example).

The differences in molecular orientation relate to balloon failure. In some instances, balloon rupture starts from the inner wall. The inner wall experiences the highest radial stresses (e.g., maximum expansion). Before final burst failure, micro tears or stress cracks will start forming on the inner wall of the balloon. Any additional forces, shear stresses or uneven force transfer from inner wall will accelerate the micro tear forming. The outer wall is not at the maximum orientation level (e.g., expansion ration of 3.8 compared to the optimal expansion ratio of 6.2 in the previous example). Therefore, any additional forces, shear stresses or uneven force transfer will cause the outer wall to stretch thus providing no additional strength to the balloon. Balloon burst strength can be substantially improved by modifying the inner wall. In some embodiments, the balloon is formed from layers having different material properties. The inner wall can be a surface of an inner layer of softer, more stretchable material to act as stress crack mitigating layer. The inner layer can also be radially stretched to optimize the strength and orientation of the inner layer. For instance, the balloon mold can be designed such that the inner wall reaches full or substantially full molecular orientation. By delaying or mitigating stress crack formation, the balloon burst strength can be substantially increased. Magnitude of the increase can be as much as 25% or more depending on the thickness of the tubing, diameter of the balloon, and the material selected, among other characteristics of the balloon.

As shown in the stress-strain curve in FIG. 12, the outer wall is under-stretched when optimizing radial stretch based upon the inner wall of the balloon. When the inner wall achieves optimal alignment of its polymer chains, as shown on the stress-strain curve, the outer wall has not yet reached optimal alignment of its polymer chains, as shown by being further down the stress-strain curve of FIG. 12. If the inner wall of the balloon fails, the outer wall will continue to stretch thus providing no additional strength to the balloon. In contrast, if the outer wall stretch is optimized, then the inner wall is over-stretched. Consequently, the inner wall will develop micro-tears which can lead to premature failure of the balloon. Therefore, in some embodiments, the design of the balloon optimizes the radial stretch based on the inner wall rather than the outer wall.

Figure 13:
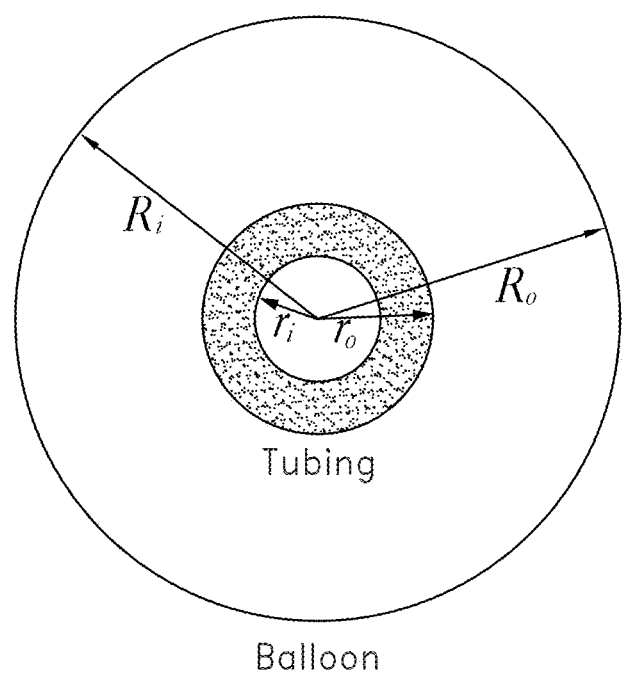
FIG. 13 is a diagram illustrating the inner and outer radii of single balloon tubing in an unexpanded and an expanded state.

The relative under-stretching of the outer wall can be substantial. This can be shown using a mathematical model relating the radial expansion of a smaller-diameter hollow cylinder with a given wall thickness (the initial extruded tube) to a hollow cylinder with a larger diameter and thinner walls (the blow molded balloon body). FIG. 13 shows the various radii to be taken into account from a cross section of the tube and balloon. Of particular interest will be the inner wall stretch ($S_i=R_i/r_i$) and the outer wall stretch ($S_o=R_o/r_o$). As $S_i$ is given as being the optimized radial stretch, the relative ratio of $S_o/S_i$ will used to demonstrate the confounding effect of radial stretch on uniform wall strength. The stretch of the circumference can also be described as radial stretch. The inner wall stretch can be denoted as ($S_i=2\pi R_i/2\pi r_i=R_i/r_i$) and the outer wall stretch ($S_o=2\pi R_o/2\pi r_o=R_o/r_o$). As the best approach to balloon design is to optimize the inner wall stretch, $S_i$ is considered to be a given. We must now determine $r_o$ and $S_o$ for the balloon.

To fully understand the effect of biaxial stretching on the cross section, both the tubing and the balloon are considered cylindrical. Formula I, set forth below, shows the equation for the mass (M) of a hollow cylinder based on outer radius of the tube ($r_o$), inner radius of the tube ($r_i$), length (L) and density ($\rho$).

In expanding the hollow cylinder represented by the tube to a balloon, the mass remains the same, as shown in Formula II set forth below. The parameters with the sub scripted t refer to the tubing and the subscripted B refers to the balloon. The length, outer radius, inner radius and possibly the density may change. Since the mass remains the same, there is a fixed relationship between the radii of tube to that of the balloon as shown in Formula III.

$$M=\pi(r_o^2-r_i^2)L\rho \qquad \text{I.}$$

$$M_t=M_B \qquad \text{II.}$$

$$\pi(r_o^2-r_i^2)L_t\rho_t=\pi(R_o^2-R_i^2)L_B\rho_B \qquad \text{III.}$$

Thus, for a balloon of a given diameter ($2R_o$) and wall thickness ($W_b$) with an optimized inner wall stretch ($S_b$), there is a specific tube size that must be used as a starting condition. For a given balloon, the required inner radius for the tubing is simply the balloon outer radius less the wall thickness divided by the optimal stretch for the polymer used: $r_i=(R_o-W_b)/S_i$. Determining the outer tubing radius, $r_o$, is more complicated but can be derived from the equation in Formula III.

As set forth below, Formula IV shows such a derivation with $S_L$ being used to express the longitudinal stretch ($S_L=L_B/L_t$). The relative longitudinal stretch, $S_L$, can be expressed as the ratio of balloon body length to tube length. The variable $\rho$ represents the relative change in density ($\rho=\rho_B/\rho_t$). With these two equations, $S_o$ and $S_i$ can be calculated and the confounding effect of radial stretch shown. Formula IV can determine the outer diameter of the tubing based on the outer diameter of the balloon and the wall thickness.

$$r_o=\sqrt{S_L\rho(2R_oW_B-W_B^2)+(R_o-W_B)^2/S_i^2} \qquad \text{IV.}$$

Formula V can determine the degree of outer wall stretch, $S_o$, as a function of wall thickness for a given balloon with specific outer radius ($R_o$), longitudinal stretch ($S_L$), density ($\rho$), wall thickness ($W_b$), and inner wall stretch ($S_i$).

$$S_0 = \frac{R_o}{\sqrt{S_L\rho(2R_oW_B-W_B^2)+(R_o-W_B)^2/S_i^2}} \qquad \text{V.}$$

Figure 14:
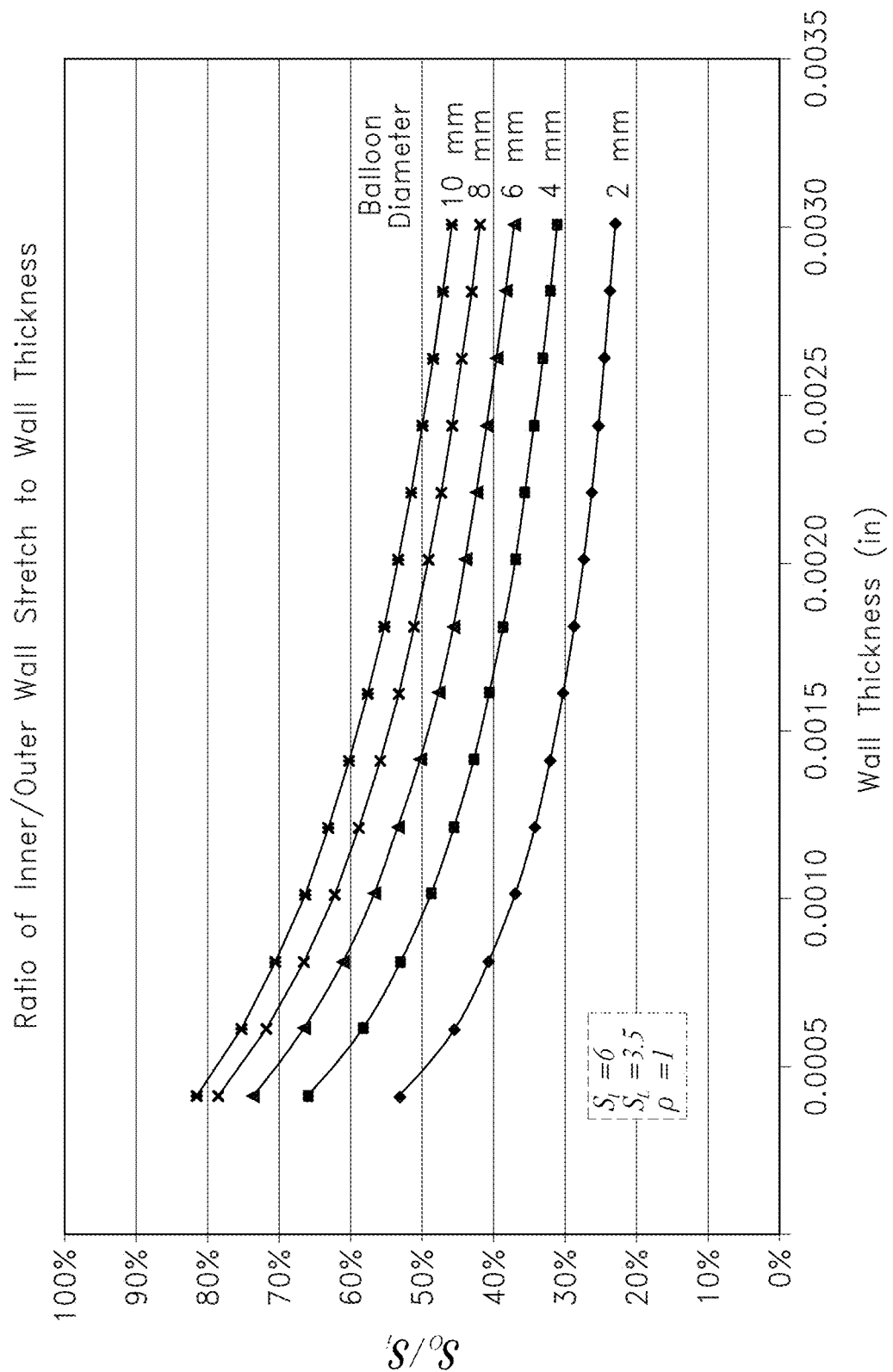
FIG. 14 is a graph showing single balloon catheters having diameters of 2 mm, 4 mm, 6 mm, 8 mm, and 10 mm with wall thickness on the x-axis and the ratio of outer wall stretch to inner wall stretch on the y-axis.

Formula V can be used to evaluate the ratio of the outer wall stretch to the inner wall relative to increasing wall thickness for a variety of balloons. FIG. 14 shows the ratio of $S_o/S_i$ as a function of wall thickness for different diameters of balloons. As can be seen, the relative under-stretching of the outer wall can be substantial. For example, the outer wall for a 2 mm balloon with a wall thickness of 0.001 inches has been stretched less than 40% relative to the inner wall. Any increase in wall thickness to try to strengthen the wall shows a further decrease in relative stretching. The same 2 mm balloon with a 0.002 inch wall thickness shows an outer wall stretch of less than 30%. The net result is that trying to increase wall thickness to increase bursting pressure gives diminishing returns in relation to outer wall stretch. Further, a thicker balloon wall causes a greater disparity in the level of molecular orientation between the outer wall and the inside wall, as described herein. Therefore, increasing the wall thickness for a specific balloon diameter causes a decrease in the ratio of outer wall stretch to inner wall stretch ($S_o/S_i$). This suggests a diminishing return for increasing wall thickness to achieve a higher burst pressure.

FIG. 14 also shows that thin walled balloons (e.g., with thicknesses approximately 0.005) have a greater ratio of $S_o/S_i$ for larger diameter balloons. For instance, 2 mm balloon has a relative outer wall stretch of greater than 50%. The 10 mm balloon has a relative outer wall stretch of greater than 80%. The larger diameter balloons (e.g., 10 mm or more) have a better distribution of stretch ratios between the inner and outer walls. This distribution may help to counter-balance the increasing hoop stress that comes with increasing diameter.

The formulas can also be used to view the relative stretch within the balloon wall itself. Turning now to FIGS. 15 and 16, the confounding effect of radial stretch can be shown in more detail by examining the distribution of relative stretch within the wall. This can be done by "mapping" the respective wall slice in the tube to that of the balloon. FIG. 15 shows such a map in which the inner wall has a position of 0% and the outer wall has a position of 100%. By calculating the stretch of a slice for the tube wall, for example the 20% line, to the equivalent slice in the balloon, the distribution of relative radial stretch can be shown. FIG. 16 shows a graph of a representative balloon with the relative stretch ratio as a function of wall slice. As can be seen, the falloff in relative stretch is not linear. The relative stretch in fact decreases more quickly from the inner wall.

The following model evaluates the effect of decreasing the ratio outer wall stretch to inner wall stretch ($S_o/S_i$) with increasing wall thickness on wall strength, $W_s$. Formula VI shows the relationship.

$$W_s=W_b*S_o/S_i \qquad \text{VI.}$$

Figure 17:
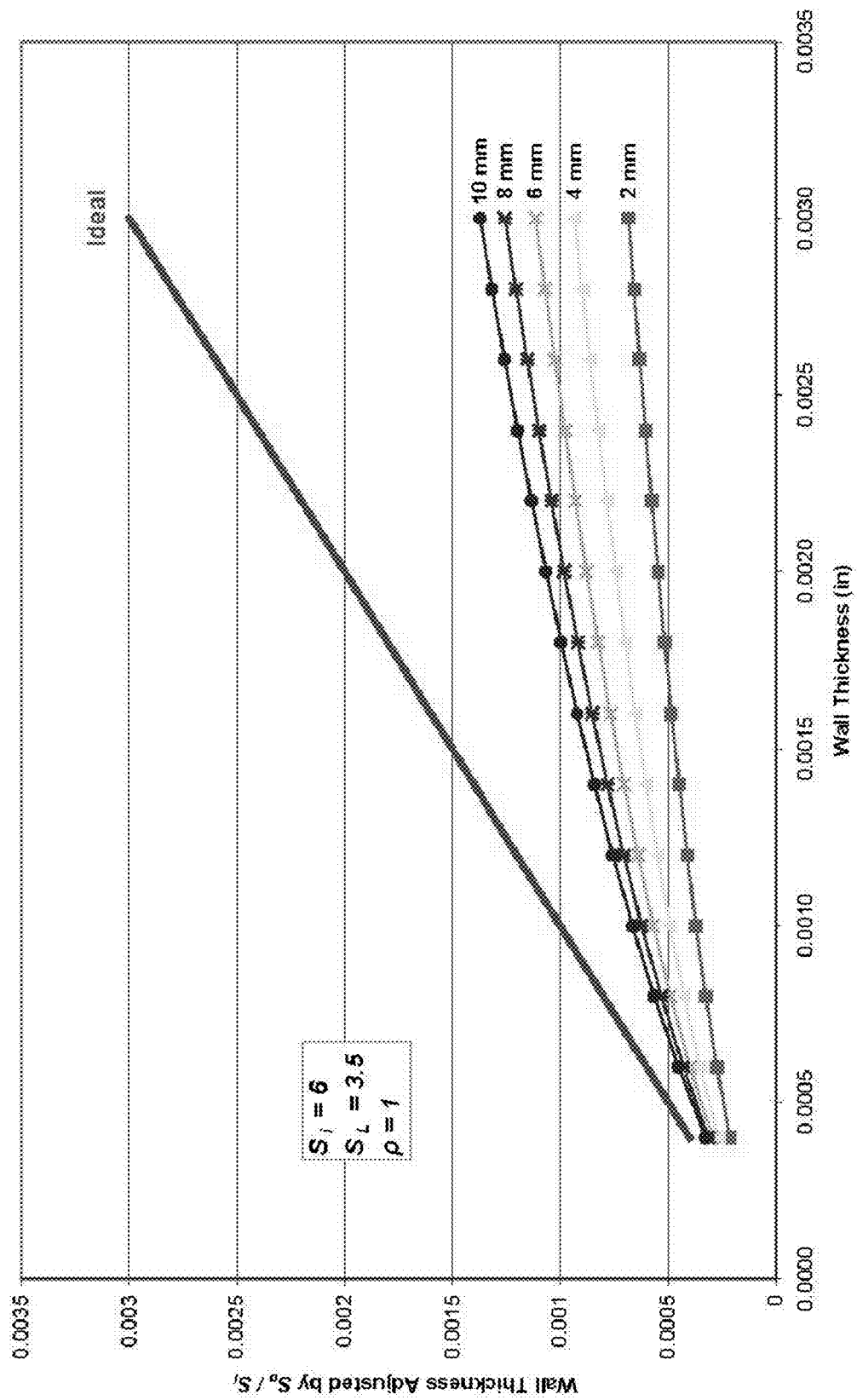
FIG. 17 is a graph of a single balloon catheter showing the relative wall strength with wall thickness on the x-axis and wall thickness adjusted by the relative ratio of outer wall stretch to inner wall stretch on the y-axis.

FIG. 17 shows an ideal wall, where wall strength increases proportionally with increasing thickness. However, the stretch ratio of the balloons decreases with the increase of thickness, as shown in FIG. 14. Therefore, due to the influence of the stretch ratio, the wall strength is substantially reduced relative to the ideal wall. For smaller diameter balloons, (e.g., 2 mm balloons), wall strength is reduced relative to the ideal wall even at the smallest wall thickness (e.g., below 0.0005 in). For all balloon diameters, wall strength is reduced relative to the ideal wall strength at larger wall thicknesses. This is due in part to the under-optimization of the stretch of the outer wall for larger wall thicknesses. This suggests a diminishing return for increasing wall thickness to increase wall strength.

Figure 18:
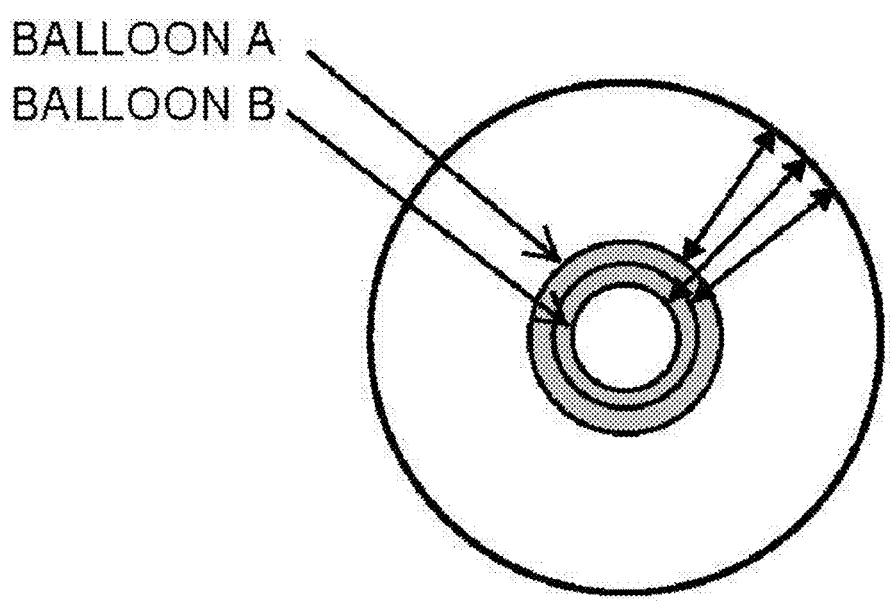
FIG. 18 is a schematic showing the inner/outer stretches for nested tubing of the same material in forming a dual layer balloon.

Some embodiments of nested balloons described herein emphasize the use of tubes of the same material, stretch properties and/or size. FIG. 18 shows one example of a nested balloon 2. The nested balloon comprises outer balloon A and inner balloon B. The balloons can be produced from nested tubing of the same material or different material.

As such, the tubes initially can have the same or a different inner radius ($r_i$) and outer radius ($r_o$). In some embodiments, the tubes initially can have the same inner radius ($r_i$). In some embodiments, the tubes initially can have different inner radii ($r_i$). In some embodiments, the tubes initially can have the same outer radius ($r_o$). In some embodiments, the tubes initially can have different outer radii ($r_o$). In some embodiments, nesting could in some cases produce significantly a weaker outer balloon based on the confounding effect of radial stretch.

In the manufacturing of the balloon, an outer diameter D of the balloon is selected based on the mold. The diameter can be selected to optimize the stretch of the inner wall of the inner balloon B, as described herein.

The inner wall of the inner balloon B reaches the point of optimal stretch. The inner balloon B cannot be further stretched without causing the inner balloon B to burst. Therefore the outer walls of the inner balloon B can be under-stretched. Additionally, the balloons A, B can be identical. Therefore, the inner walls and the outer walls of the outer balloon A can be under-stretched.

Figure 19:
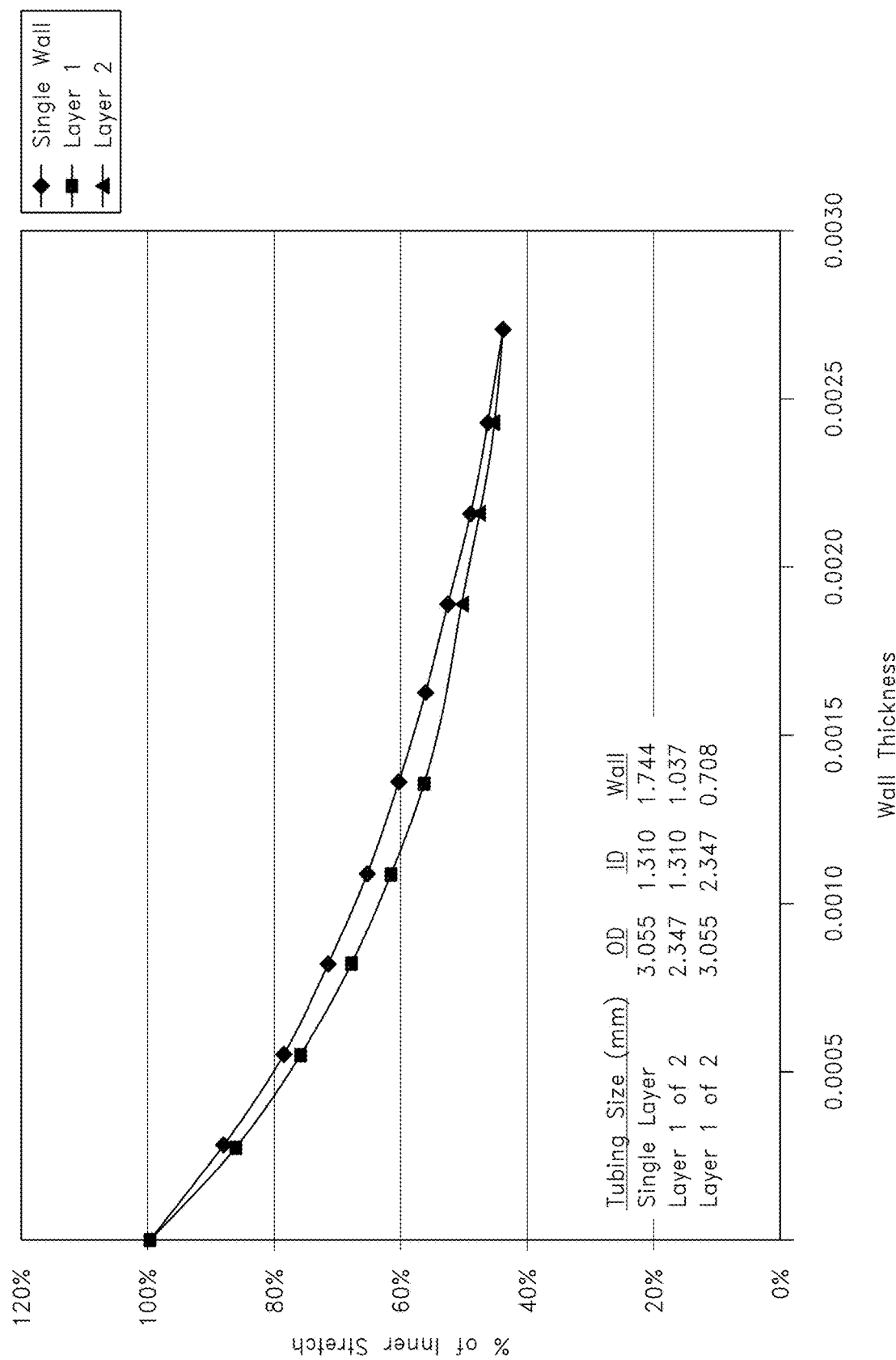
FIG. 19 is a graph of the inner stretch of wall slices of the nested balloon having two non-identical balloons formed from the nested tubing from FIG. 18 in which inner wall stretch is not optimized on the outer extrusion relative to the inner stretch of corresponding wall slices of the single balloon.

This problem may not be solved in some cases by co-extruding the balloon such that balloons A, B are integrally formed. The problem of inner balloon bursting can sometimes occur with co-extruded multi-layer balloons because the inner layer necessarily has a more optimized inner wall stretch compared to that of outer layer. This is shown in detail on FIG. 19, in which the relative stretch of the wall slices of a dual layer balloon made from co-extruded tubing is shown relative to a single wall balloon having the same overall wall thickness. As shown in FIG. 19, the outer layer shown with triangular markers is significantly less stretched than that of the inner layer, as shown by the square markers. Some methods of creating multi-layer balloons primarily focus on co-extruding balloon elements in order to create a multi-layer balloon. The confounding effect of radial stretch may not be considered when co-extruding a multi-layer balloon.

Figure 20:
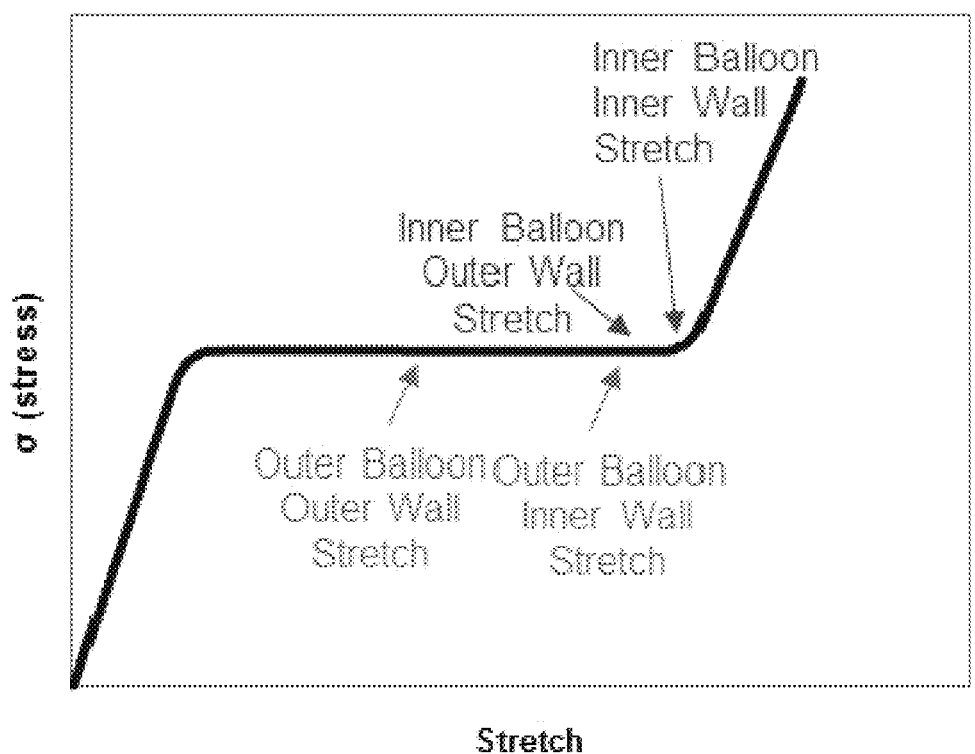
FIG. 20 is a stress-strain curve with strain, or the amount that a balloon will stretch during formation for the nested tubing of FIG. 18, on the x-axis and stress, or the applied pressure, on the y-axis.

FIG. 20 shows the stress-strain curve for the nested balloon 2 having two balloons A, B similar to FIG. 18 above. The inner balloon, inner wall is at the point of optimal stretch. The inner balloon, outer wall is under stretched. The inner wall of the outer balloon is under stretched and the outer wall of the outer balloon is under stretched. Only the inner wall of the inner balloon has polymer chains that are aligned at the optimal stretch point. Pressurizing such a balloon will result further growth and stretch of the polymer chains in an uncontrolled fashion, especially in absence of proper temperature and dimensional control.

Figure 21:
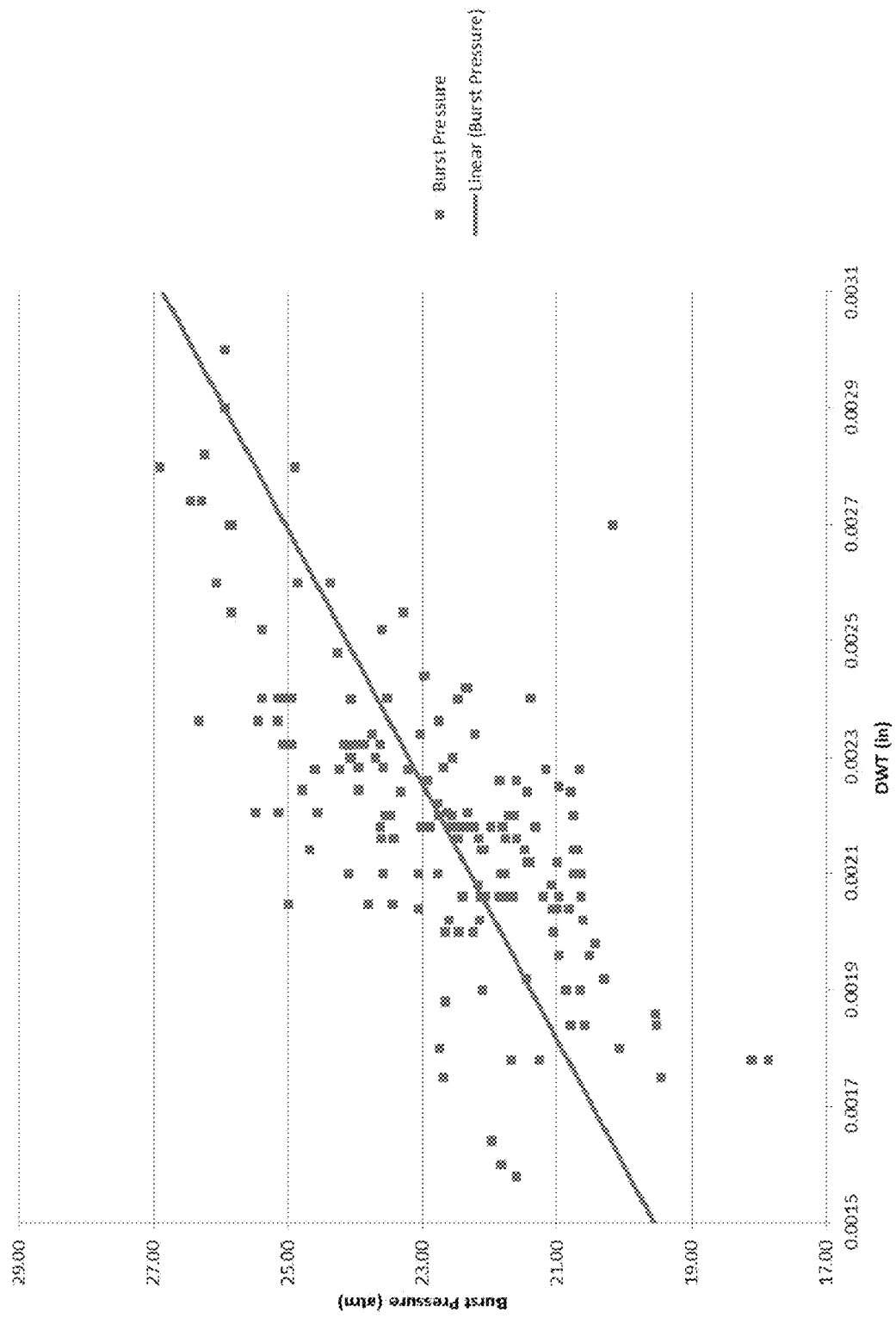
FIG. 21 is a graph of numerous balloon lots showing average burst pressure increasing with thickness with double wall thickness on the x-axis and average burst pressure on the y-axis.
Figure 22:
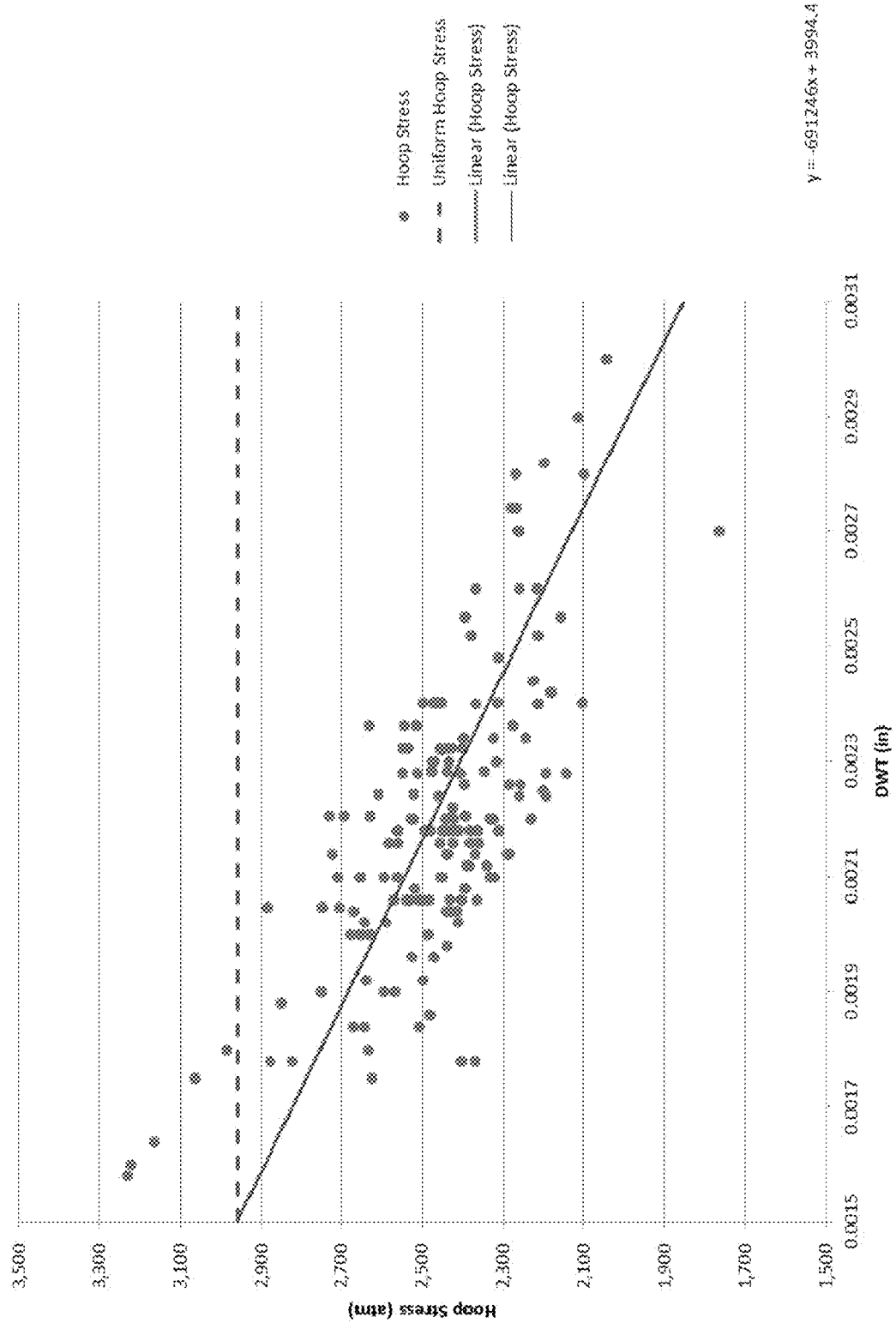
FIG. 22 is a graph showing maximum hoop stress of the balloon lots shown in FIG. 21 deviating from the maximum hoop stress of a uniform material with double wall thickness on the x-axis and hoop stress on the y-axis.
Figure 23:
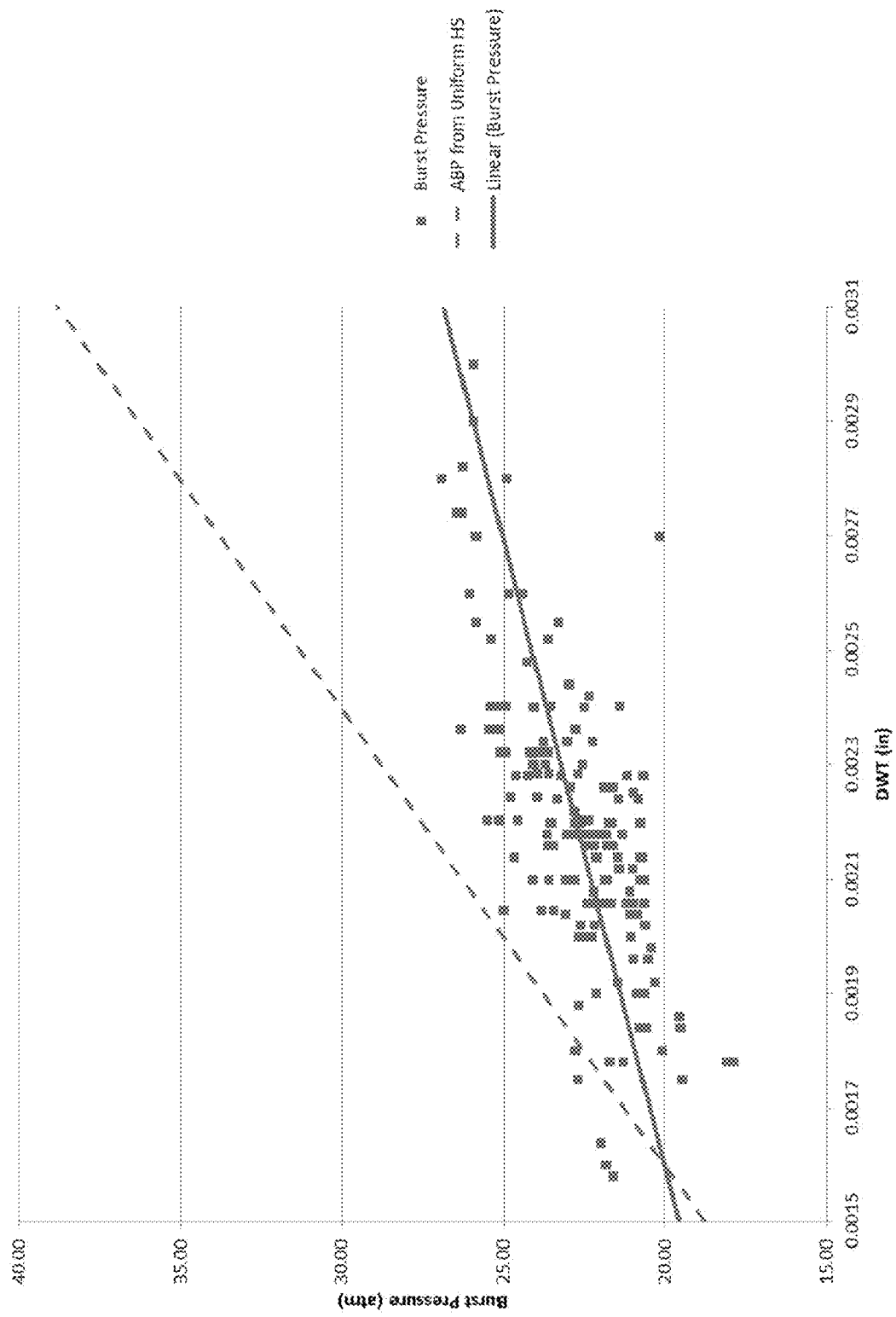
FIG. 23 is the graph of FIG. 21 showing average burst pressure deviating from the average burst pressure of a uniform material with double wall thickness on the x-axis and average burst pressure on the y-axis.

The effect of the differential of inner wall stretch and outer wall stretch on burst strength can be demonstrated from internal production data, shown in FIGS. 21-23. Data including the average double wall thickness (DWT), hoop stress and burst pressure is produced for every lot. The graphs shown in FIGS. 21-23 are produced from production data. To simplify the following analysis, balloon lots are restricted to 6×40 balloons, each made from nylon 12 but with varying wall thickness. Each data point is the average value for a production lot.

FIG. 21 shows that the average burst pressure relative to the double wall thickness for 6 mm Nylon 12 balloons. The average burst pressure increases with wall thickness in approximately a linear manner as shown by the best fit line. The average burst pressure (ABP) represents a specific property of the material.

FIG. 22 shows the maximum hoop stress relative to the double wall thickness for 6 mm Nylon 12 balloons. Formula VII represents the maximum hoop stress, which normalizes the average burst pressure to the balloon diameter and the double wall thickness.

$$Max\sigma_\theta = \frac{ABP * D}{DWT} \qquad \text{VII.}$$

For a material with uniform properties, the maximum hoop stress ($Max\sigma_\theta$) is a constant. However, as shown in FIG. 22, there is a significant decrease in maximum hoop stress due to the confounding effect of radial stretch with respect to orientation as compared with a material with uniform properties. The dashed line shows the expected uniform hoop stress. Each data point represents average value of the hoop stress for a production lot. The maximum hoop stress decreases with wall thickness in approximately a linear manner as shown by the best fit line.

FIG. 23 shows the average burst pressure relative to the double wall thickness for 6 mm Nylon 12 balloons. The dashed line shows the expected average burst pressure given uniform hoop stress. Each data point represents average value of the burst pressure for a production lot. The average burst pressure decreases with wall thickness in approximately a linear manner as shown by the best fit line.

As shown in FIG. 23, there is a significant decrease in average burst pressure as compared with a material with uniform properties shown in the dashed lines. The molecules in the outermost layers of the balloon wall can be only partially oriented and thus contribute less and less to the load bearing capacity of the material. This can have a significant impact on balloon design. The decreasing maximum hoop stress and average burst pressure confirms a diminishing return on increasing the wall thickness to achieve higher burst pressures, as described herein. Additionally, thicker walls increase the catheter profile as well as decrease the flexibility of the balloon, as described herein.

The nested balloons 2 described herein, in some embodiments, can overcome these deficiencies in a variety of ways. In some embodiments, the outer balloon A and the inner balloon B shown in FIG. 18 comprise different materials. In some embodiments, the outer balloon A and inner balloon B shown in FIG. 18 have different inner radii. In some embodiments, the outer balloon A and inner balloon B shown in FIG. 18 have different outer radii. In some embodiments, the inner wall of the outer balloon A and the inner wall of the inner balloon B are both optimized. In FIG. 20, the inner wall of the outer balloon A and the inner wall of the inner balloon B both reach the point of optimization near the bend in the stress-strain curve shown in FIG. 20. In some embodiments, the outer balloon A and the inner balloon B have a small thickness (e.g., double wall thickness less than 0.0005", less than 0.0010", less than 0.0015", less than 0.0020", etc.). The wall thickness can be selected to minimize the difference in optimization between the inner wall and the outer wall of each balloon A, B. For smaller thicknesses, the outer wall stretch can be closer to the bend in the stress-strain curve shown in FIG. 20.

Figure 24:
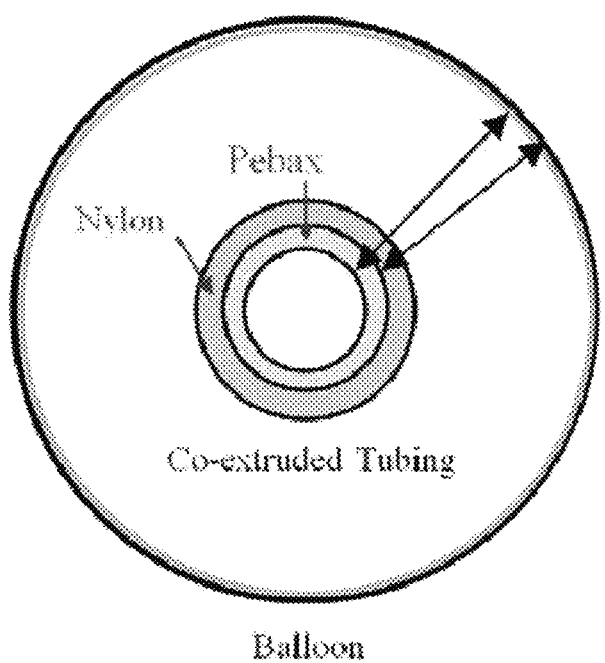
FIG. 24 is a diagram illustrating the inner diameter stretch and the outer diameter stretch of coextruded tubing from materials possessing different maximum stretch properties to form a dual layer balloon.

In some embodiments, each balloon A, B of a nested balloon 2 is formed from a co-extruded tubing. FIG. 24 shows an embodiment of a co-extruded tube with each layer made from different materials. The co-extruded tube can comprises a plurality of layers, such as an inner layer and an outer layer, or an inner, middle, and outer layer in some embodiments with a tri-layer balloon. In some embodiments, the co-extruded tube can include at least 3, 4, 5, or more layers. The layers can have different materials or the same material. In some embodiments, the outer layer is formed from nylon. In some embodiments, the inner layer is formed from Pebax (polyether block amide). Other combinations are contemplated.

Each layer can be selected to optimize the inner wall stretch. For instance, the material, inner radius, and outer radius of each layer can be selected to optimize the inner wall stretch of each layer. The inner wall of the nylon layer can be optimized as shown in the double arrow line. The inner wall of the pebax layer can be optimized as shown in the double arrow line. The outer wall of each layer can be closer to the optimized stretch. This is due in part to each layer having a smaller thickness than an equivalent single layer balloon.

In some embodiments, each balloon A, B is formed from a co-extruded tubing and the balloons A, B can be nested. In some embodiments, the inner wall of the inner layer (e.g., Pebax layer) of the inner balloon B is optimized. The inner wall of outer layer (e.g., Nylon layer) of the inner balloon B is optimized. In some embodiments, the inner wall of the inner layer (e.g., Pebax layer) of the outer balloon A is optimized. The inner wall of outer layer (e.g., Nylon layer) of the outer balloon B is optimized. In some embodiments, only one balloon is formed from co-extruded tubing. In some embodiments, both the outer balloon A and the inner balloon B are formed from co-extruded tubing. In some embodiments, a third balloon is provided, see FIG. 7A. Each balloon 20, 22, 24 can be formed from co-extruded tubing. Each balloon 20, 22, 24 can have one or more layers. The inner wall of each layer can be optimized. The material, inner radius, or outer radius of each layer can be selected to optimize the inner wall of each layer. Each co-extruded balloon can be produced using techniques known in the art. In some embodiments, one or more balloons can be made of a plurality of layers, e.g., produced using co-extrusion techniques. In some embodiments, both layers can be made of the same material, such as both Nylon layers or both Pebax layers.

In the example above, discussing optimizing the radial stretch, a single balloon can be produced from nylon tubing having an outer diameter of 0.031" and an inner diameter of 0.019", with a wall thickness of 0.006". The mold has an inner diameter of 0.118" and the thickness of the balloon is negligible when inflated for ease of calculation. The expansion ratio for the outer wall is 3.8 and the expansion ratio of the inner wall is 6.2.

For a nested balloon 2 having an outer balloon A and an inner balloon B, the expansion ratios could be altered. In this example, the outer balloon A and the inner B have a wall thickness of approximate half of a single balloon. The two balloons A, B could be produced from nylon tubing having an outer diameter of 0.025" and an inner diameter of 0.019", for a wall thickness of 0.003". The wall thickness is half because two balloons are used. In the case of three balloons 20, 22, 24 shown in FIG. 7A, the wall thickness could be cut by a third.

As in the previous examples, the expansion ratio of the inner wall is optimized at 6.2. In the example of two balloons A, B, the expansion ratio for the outer wall is 4.2, which is higher than the expansion ratio for the outer wall of the single balloon (e.g., 3.8).

The nested balloon 2 has many potential synergistic advantages, in some embodiments. The nested balloon 2 has two balloons A, B, each having an optimized inner wall. The nested design produces highly oriented material on the two inner walls. The nested balloon 2 has two balloons A, B, each having outer walls with a higher expansion ratio than a single balloon having the same overall thickness. The nested design produces a higher level of molecular orientation of the two outer walls. The higher expansion ratio relates to the increased stretching which aligns molecular chains. Further, each tube which forms the balloon A, B has a smaller thickness (e.g., half of the overall thickness as compared to a single balloon). A thinner tube causes less disparity in the level of molecular orientation between the outer wall and the inner wall of the balloon. Thus multiple thin balloons nested together will unexpectedly and advantageously provide greater strength due in part to the higher level of molecular orientation of the outer wall, than a single balloon of equal thickness.

The properties of each balloon A, B within a nested balloon 2 are selected to optimize the stretch of the inner wall. In some embodiments, three balloons are provided, balloons 20, 22, 24 as shown in FIG. 7A. In some embodiments, each balloon comprises two or more layers as shown in FIG. 24. The properties of each layer are selected to optimize the stretch of the inner wall of each layer. For instance, the balloons A, B, 20, 22, 24 or balloon layers may be sized differently. In some embodiments, the balloons A, B, 20, 22, 24 or balloon layers have different diameters. In some embodiments, the balloons A, B, 20, 22, 24 or balloon layers have different lengths. In some embodiments, the balloons A, B, 20, 22, 24 or balloon layers have different tube thicknesses. In some embodiments, the balloons A, B, 20, 22, 24 or balloon layers have different inner radii of the tube. In some embodiments, the balloons A, B, 20, 22, 24 or balloon layers have different outer radii of the tube. In some embodiments, the balloons A, B, 20, 22, 24 or balloon layers have different inner radius of the inflated balloon. In some embodiments, the balloons A, B, 20, 22, 24 or balloon layers have different outer radius of the inflated balloon.

Therefore, the inner wall of each balloon or the inner wall of each balloon layer can reach a point of optimal stretch. The outer walls of each balloon are more optimal than a single balloon having the same thickness as the nested balloon 2. The outer walls of each layer are more optimal than a single balloon having the same thickness as the nested balloon 2.

The balloons A, B, 20, 22, 24 or balloon layers may have different material properties. In some embodiments, the balloons A, B, 20, 22, 24 or balloon layers have different materials. In some embodiments, the balloons A, B, 20, 22, 24 or balloon layers have different densities. The present application, in some embodiments, contemplates selecting different stretch properties for the balloons A, B, 20, 22, 24 or balloon layers, one greater than the other, to allow one balloon to be nested in another balloon. Utilizing different balloons allows the stretch of the inner wall of each balloon or balloon layer to be optimized, while making the stretch of the outer wall as optimal as possible. Therefore, the nested balloon 2 will have at least a first balloon A, 20 and a second balloon B, 22. Nesting one balloon within the other balloon produces two optimized inner walls and two highly-oriented outer walls.

If the first balloon and the second balloon comprise co-extruded balloons having two layers each, then the number of optimized walls can increase. The first balloon A, 20 can have an inner layer with an optimized inner wall and an outer layer with an optimized inner wall. The second balloon B, 22 can have an inner layer with an optimized inner wall and an outer layer with an optimized inner wall. The first balloon A, 20 can have two optimized inner walls. The second balloon B, 22 can have two optimized inner walls. Each balloon layer of the balloons A, B, 20, 22 can have an optimized inner wall.

If the first balloon and the second balloon comprise co-extruded balloons having two layers each, then the number of highly orientated walls can increase. The first balloon A, 20 can have two highly-oriented outer walls. The second balloon B, 22 can have two highly oriented outer walls. Each balloon layer of the balloons A, B, 20, 22 can have an highly oriented outer wall. Nesting one co-extruded balloon within the other co-extruded balloon can produce four optimized inner walls and four highly-oriented outer walls. This, in some cases, greatly increases the strength of the nested balloon 2. In some embodiments, the stretch and/or orientation of inner layers can be optimized. In some embodiments, the stretch and/or orientation of outer layers can be highly-oriented. However, in some embodiments, only the stretch and/or orientation of one of the inner and/or outer layers are optimized.

Figure 25:
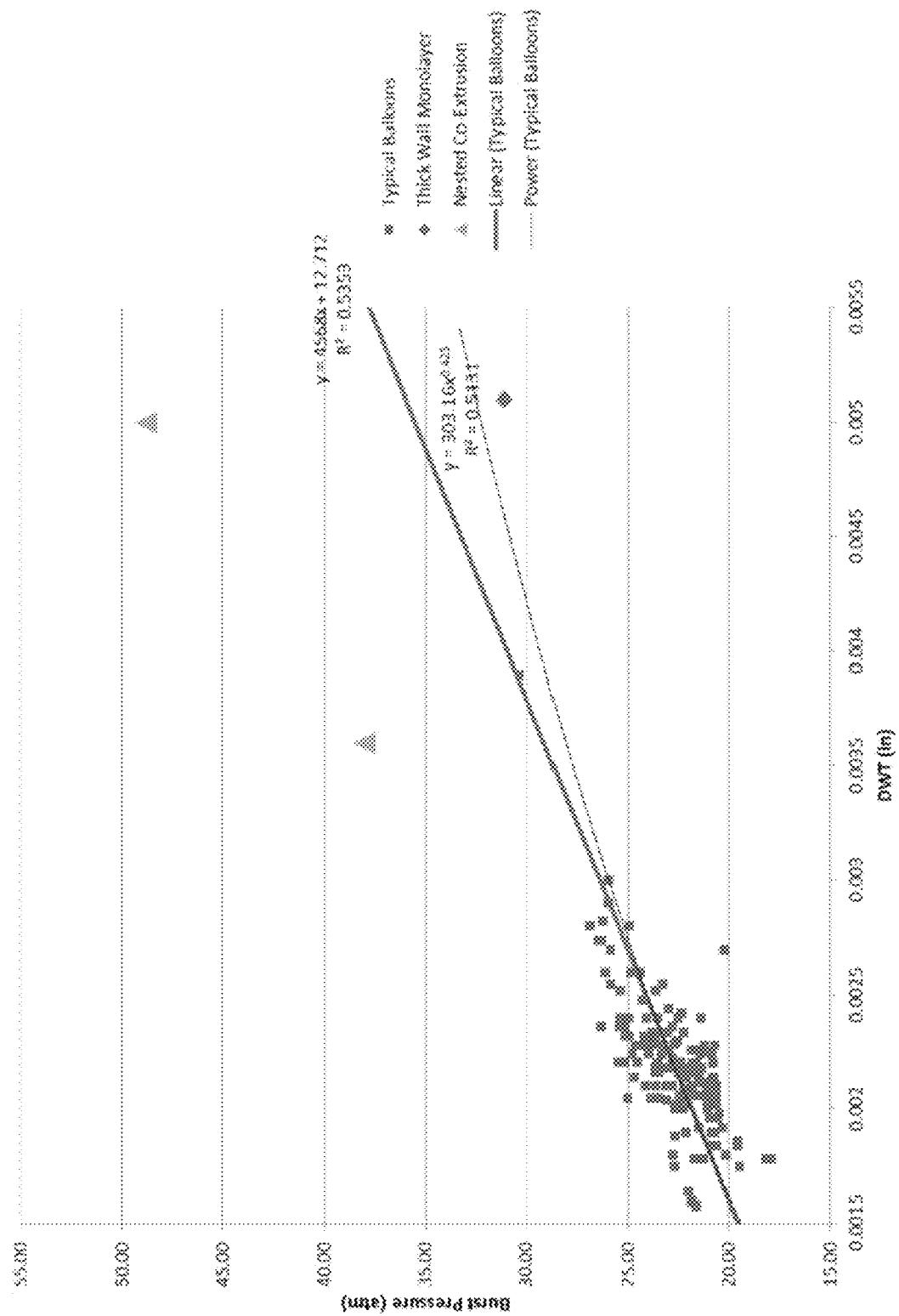
FIG. 25 is the graph from FIG. 21 with the addition of a nested balloon with double wall thickness on the x-axis and average burst pressure on the y-axis.

FIG. 25 shows data related to a nested co-extruded balloon 2. FIG. 25 shows that the average burst pressure relative to the double wall thickness for 6 mm Nylon 12 balloons. The average burst pressure increases with wall thickness in approximately a linear manner as shown by the bolded best fit line. FIG. 25 includes the data presented in FIG. 21. FIG. 25 includes additional data points. One data point represents the average burst pressure of a 6 mm Nylon 12 single balloon with a double wall thickness of approximately 0.005", shown as a diamond symbol. The reference single balloon had a burst pressure of 31 atm. The other data points represents the average burst pressure of the nested co-extruded balloon 2, shown as triangles. One data point corresponds with a nested co-extruded balloon with a double wall thickness approximately 0.005", similar to the reference single balloon. The nested balloon resulted in burst pressure of 49 atm—almost 60% greater than the reference single balloon. FIG. 25 includes another data point for a nested co-extruded balloon with a thinner double wall thickness of approximately 0.0036". The 38 atm average burst pressure is approximately 40% higher than the extrapolated burst pressure from the single layer balloons at a similar double wall thickness. FIG. 25 suggests that nested co-extruded balloons have higher burst pressure than single layer balloons having the same wall thickness. In some embodiments, the increase in burst pressure is at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, greater than that of a single balloon having the double wall thickness equal to combined thickness of the nested co-extruded balloon.

Figure 26:
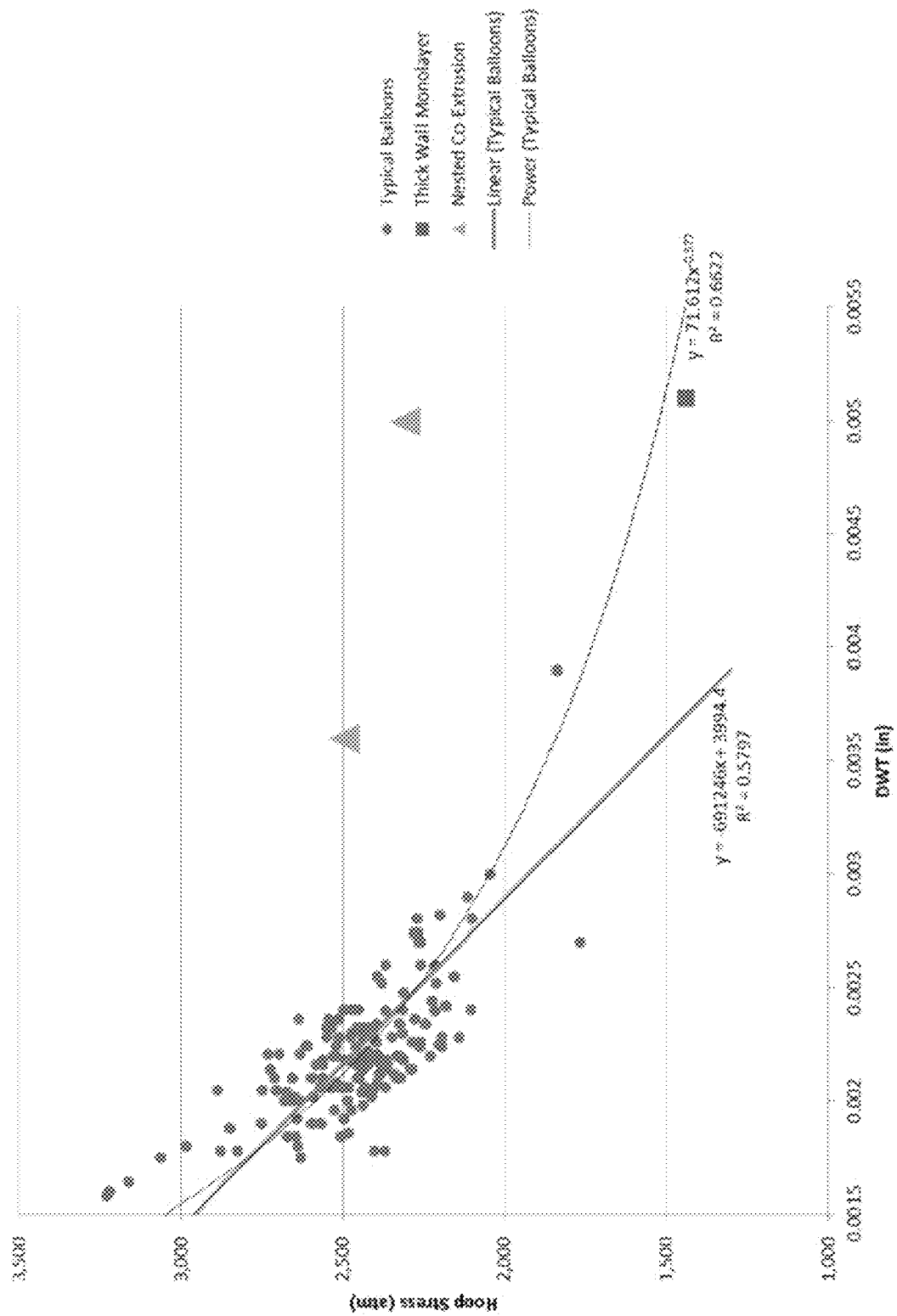
FIG. 26 is the graph of FIG. 22 with the addition of a nested balloon with double wall thickness on the x-axis and hoop stress on the y-axis.

FIG. 26 shows data related to a nested co-extruded balloon 2. FIG. 26 shows the maximum hoop stress relative to the double wall thickness for 6 mm Nylon 12 balloons. The maximum hoop stress decreases with wall thickness in approximately a linear manner as shown by the best fit line. FIG. 26 includes the data presented in FIG. 22. FIG. 26 includes additional data points. One data point represents the maximum hoop stress of a 6 mm Nylon 12 single balloon with a double wall thickness approximately 0.005", shown as a square symbol. The reference single balloon had a maximum hoop stress around 1,450 atm. The other data points represents the maximum hoop stress of the nested co-extruded balloon 2, shown as triangles. One data point corresponds with a nested co-extruded balloon with a double wall thickness equal to the reference single balloon. The nested balloon resulted in a maximum hoop stress of 2,350 atm—almost 40% greater than the reference single balloon. FIG. 26 includes an additional data point for a nested balloon with a thinner wall thickness of approximately 0.0036". The ≈2,500 atm maximum hoop stress is approximately 40% higher than the extrapolated maximum hoop stress from the single layer balloons at a similar double wall thickness. FIG. 26 indicates that nested co-extruded balloons, in some cases, can have higher maximum hoop stress than single layer balloons having the same wall thickness. In some embodiments, the increase in maximum hoop stress is between about, or at least about, 25%-55%, 30%-50%, 35%-45%, or more greater than that of a single balloon having the double wall thickness equal to combined thickness of the nested co-extruded balloon. In some embodiments, the increase in maximum hoop stress is at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, or more greater than that of a single balloon having the double wall thickness equal to combined thickness of the nested co-extruded balloon.

As shown in FIGS. 25 and 26, the majority of 6 mm Nylon 12 balloons have a double wall thickness in the range of 0.0015" to 0.0030". Balloons having a double wall thickness greater than 0.0030" are in some cases not desirable as they can be difficult to flute and wrap due to the stiffness of the wall. The individual balloons of the nested balloon 2 can in some embodiments have a double wall thickness of 0.0025. In some embodiments, the first balloon 20, A of the nested balloon 2 has a thickness that is approximately one-half the thickness of the single balloon. In some embodiments, the second balloon 22, B has a thickness that is approximately one-half the thickness of the single balloon. Other configurations are contemplated.

Figure 27:
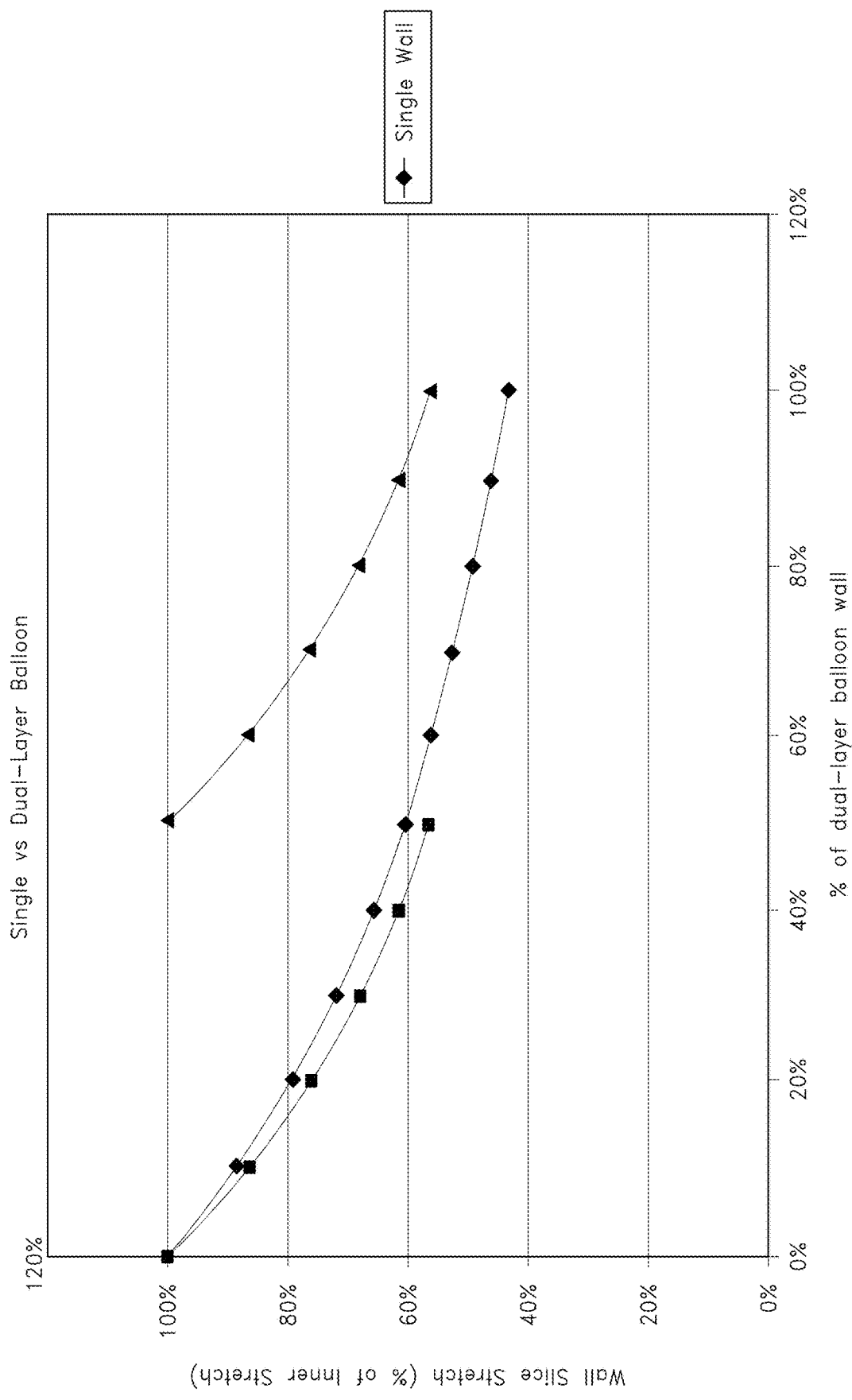
FIG. 27 is a graph of a single balloon catheter and dual-layer balloon catheter manufactured from tubing in which the inner wall stretch has been optimized for maximum strength. Both the single balloon and dual-layer balloon have the same overall wall thickness. The dual-layer balloon can be a nested balloon or a balloon which is blown from extruded tubing as shown in FIG. 24.

In accordance with some embodiments, in order to substantially increase the overall wall strength of a nested balloon, each balloon or balloon layer is molded from tubing in which in the inner wall stretch has been optimized for maximum strength. FIG. 27 shows the relative stretch of wall slices for a single wall balloon compared to a co-extruded balloon having two layers. The first layer of the co-extruded balloon has an inner wall that has been optimized, shown with square symbols. The second layer of the co-extruded balloon has an inner wall that has been optimized, shown with triangle symbols. Each layer has been designed to optimize the stretch of the inner wall. This is in contrast to FIG. 19. In FIG. 19, the second layer of the co-extruded balloon was not designed to optimize the inner wall of the second layer. As can been seen, the relative amount of optimally stretched material is greater than shown in FIG. 19.

The graph would be similar for two balloons molded from tubing in which in the inner wall stretch has been optimized for maximum strength (not shown). The first balloon of the nested balloon would have an inner wall that has been optimized, similar to the square symbols. The second balloon of the nested balloon would have an inner wall that has been optimized, similar to the triangle symbols. Each balloon can be selected to optimize the stretch of the inner wall.

Each balloon or balloon layer is made such that the inner wall has been stretched for maximum strength, with the stretch ratio specific for that particular material. As described above, the inner wall can be stretched to within about 15% of its optimal stretch and, in some applications, such as to within less than 10% of its optimal stretch. As the wall strengths are additive, the burst pressure will be higher than that for any individual balloon.

A drawback of increasing balloon wall thickness to reach higher burst strength is reduced flexibility. The flexibility of the balloon can be drastically reduced with increasing wall thickness. Nested balloons can have several times better flexibility then a single wall balloon of equivalent thickness, as shown in FIGS. 7A, 7B, 8A, and 8B. An ideal nested balloon would have an infinite number of infinitely thin balloons. This would provide maximum achievable strength and maximum achievable flexibility. For practical purposes, such as complexity of assembly and manufacturing cost, the number of balloons is typically limited to a few balloons (e.g., less than five, between two and five, less than four, between two and four, less than three, two or three). Substantial performance improvement over prior art balloons can be achieved with a nested balloon being made of two or more balloons. In some embodiment, each balloon to be nested can be made of one, two, or more layers. If a balloon to be nested is made of two or more layers, it can be formed via a co-extrusion process.

FIGS. 28A and 28B illustrate a balloon wall element 14 of a nested balloon catheter 2. To maintain flexibility, friction between each balloon 20, 22, 24 should be minimized. To illustrate this point we consider a balloon wall element 14. This element 14 has a thickness t, and a small width b and a length 1. The element 14 can be configured either axially or radially. Taking one end of the element 14 as fixed, the element 14 can be viewed as a cantilevered beam for analytical purposes, as described below in FIGS. 29A through 29D.

Figure 29A:
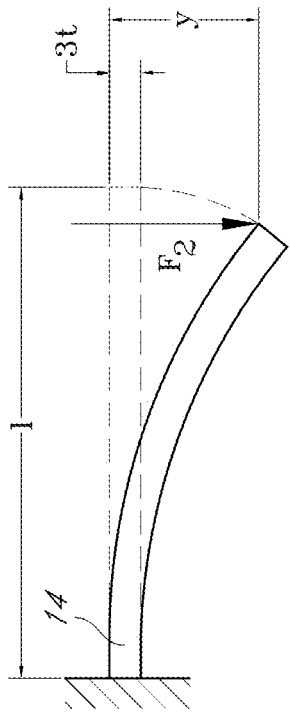
FIG. 29A is a diagram of an element with a small thickness bending like a cantilevered beam shown with an applied force and a maximum deflection.
Figure 29B:
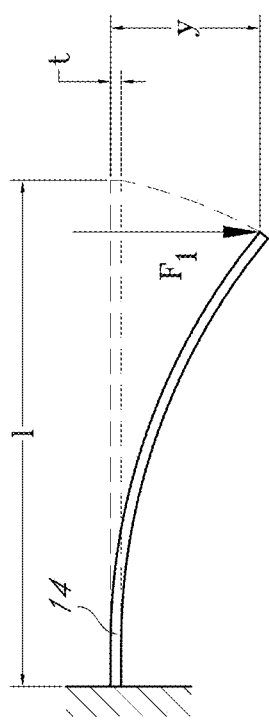
FIG. 29B is a diagram of an element with a large thickness bending like a cantilevered beam shown with an applied force and a maximum deflection.

FIG. 29A shows the balloon element 14 with thickness t. A balloon element 14 with thickness t requires a force $F_1$ to bend the element 14 a set distance y. FIG. 29B shows the balloon wall element 14' with thickness 3t. This thicker element 14' requires a force $F_2$, which is twenty-seven times larger than $F_1$, to bend the element 14' the same distance y as the element 14 in FIG. 29A (that is, because the force required varies as a cube of the element thickness).

Figure 29C:
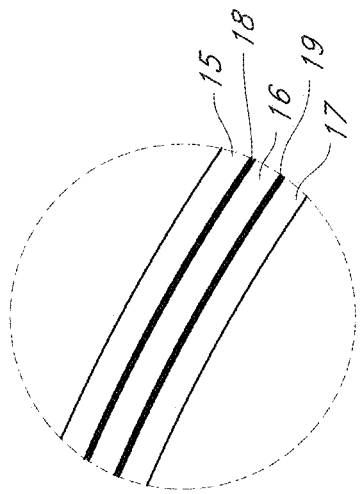
FIG. 29C is a diagram of an element comprising three balloons each having small thicknesses bending like a cantilevered beam shown with an applied force and a maximum deflection.

FIG. 29C shows a nested element 14" comprised of a first element 15 corresponding to the first balloon 20, a second element 16 corresponding to the second balloon 22, and a third element 17 corresponding to the third balloon 24. Each of the elements 15, 16, and 17 has an individual thickness t. As a result, the nested balloon element 14" has a cumulative thickness 3t. Each sub-element 15, 16, and 17 is individually as thick as the balloon element 14 in FIG. 29A, but collectively as thick as the balloon element 14' in FIG. 29B. Each individual element in FIG. 29C requires a force $F_1$ to bend a single balloon element a given distance y. Collectively, the balloon element 14" requires a force $F_3$ to bend the element 14" a given distance y, which is three times as large as the force $F_1$ in FIG. 29A, but only one third as large as the force $F_2$ in FIG. 29B. As shown in FIG. 29C, each element 15, 16, and 17 preferably slides relative to the other elements a distance Δ1. If the balloon element 15, 16, and 17 are not permitted to slide, then the nested balloon 14 will likely require the equivalent force $F_3$ shown in FIG. 29B.

Figure 29D:
FIG. 29D is an enlarged side elevational view of the element shown in FIG. 29C.

Referring now to FIG. 29D, because the elements 15, 16, and 17 are in close contact with each other and there is a potentially strong force pushing them together, frictional effects can be very significant and prevent sliding between the balloons. To minimize friction between adjacent balloons and to allow sliding, layers 12, 13, 14 can be added to elements 15, 16, and 17. In some embodiments, the layers are formed in a co-extrusion process such that the balloons 20, 22, 24 are co-extruded balloons. In some embodiments, the inner layer of the first balloon 20 includes a sliding layer. In some embodiments, the inner layer of the second balloon 22 includes a sliding layer. In some embodiments, the outer layer of the second balloon 22 includes a sliding layer. In some embodiments, the outer layer of the third balloon 24 includes a sliding layer. Other configurations are contemplated. The layers 12, 13, 14 can be made of any suitable substance, nonexclusively including biocompatible material. In some embodiments, the material is Pebax (Arkema polyether block amide). It should be noted that layers are not necessary when friction between balloons is allowable and, in some applications, desirable.

To produce the layers, one or more of the balloons 20, 22, 24 may be formed from co-extrusion. The primary goal of the tubing coextruded from different types of material is to provide different surface properties either on the outside or the inside of the balloon. For example, the tubing can be coextruded in a combination of materials. In some embodiments, a coextruded balloon comprises an outer layer of Pebax for strength. In some embodiments, a coextruded balloon comprises an middle bonding layer of Plexar. In some embodiments, a coextruded balloon comprises an inner layer of HDPE for low coefficient of friction. FIG. 24 shows another embodiment. In some embodiments, a coextruded balloon comprises an outer layer of nylon. In some embodiments, a coextruded balloon comprises an inner layer of Pebax. Other configurations are contemplated. Additionally, the application of the balloon may dictate the material. For instance, dilation balloons for heavily calcified lesions or areas where fine bone fragments may be encountered, such as rhinoplasty, may require balloons with a tough outer layer that has high abrasion, scratch and cut resistance. This can be accomplished by co-extruding an outer layer made of polyurethane. Stent delivery balloons may require balloons with a softer outer layer with a high coefficient of friction to improve the stent retention.

One goal is to provide the highest achievable burst strength with balloon compliance below about 10, 9, 8, 7, 6, 5, 4, 3%, or less and balloon wall thickness that is compatible with the smallest size of introducer for that specific balloon size. To achieve this goal, each individual balloon can have a high burst pressure to wall thickness ratio. This can be accomplished via material selection. In some embodiments, a coextruded balloon comprises Nylon 12 tubing with the stress crack mitigation layer of Pebax on the inside. The Pebax layer also provides a secondary benefit of reduced friction at a boundary where the inner balloon touches the outer balloon. There can be alignment between the inner balloon and outer balloons both radially and axially with no twisting of balloons with respect to each other. The low balloon compliance is related to the level of material orientation. Two or more thin walled balloons can have much higher average orientation than one thick walled balloon, as described herein.

The balloons 20, 22, 24, A, B that form the nested balloon can be formed from parisons or from coextruded tubing. The outer layer of the balloon can be made of high strength and hardness polyamide (nylon) that serves as the main load bearing layer. The inner layer can be made of lower strength and lower hardness material that also has a low coefficient of friction. One suitable material is Pebax (Arkema polyether block amide). In some embodiments, the material selected for the outer layer of the balloon and the inner layer of the balloon have the same or substantially the same melt temperature. The outer layer and inner layer of a single balloon can have a strong fused bond. The materials polyamide and Pebax are closely related, and therefore coextrude well and fuse together at the boundary layer. In some embodiments, the Pebax layer is radially stretched and optimally oriented. This type of tubing provides advantageous properties for forming individual balloons to be used in the nested balloon design.

During extensive testing, individual balloon formed from coextruded tubing with outer main layer of Nylon 12 and inner layer of Pebax showed superior and unexpected results. The relative thickness can include, for example, Nylon 12 70%, Pebax 30% (e.g., Nylon 12 50%, Nylon 12 greater than 50%, Nylon 12 60%, Nylon 12 greater than 60%, Nylon 12 70%, Nylon 12 greater than 70%, Nylon 12 80%, Nylon 12 greater than 80%, Nylon 12 90%, Nylon 12 greater than 90%, Nylon 12 between 60% and 80%, Nylon 12 between 50% and 90%). The inner layer of Pebax functions as a stress crack mitigation layer that delays the onset of micro tear formation. The inner layer of Pebax also functions as a lubricious layer due to its lower hardness and lower coefficient of friction as compared to Nylon 12. Other suitable materials are contemplated.

Figure 30A:
FIG. 30A is a side elevational view of an inner balloon used in a method for nesting balloons to form a nested balloon.
Figure 30B:
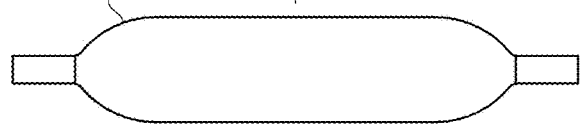
FIG. 30B is a side elevational view of the inner balloon after heating and stretching (shown exaggerated) of the method for nesting balloons of FIG. 30A.
Figure 30C:
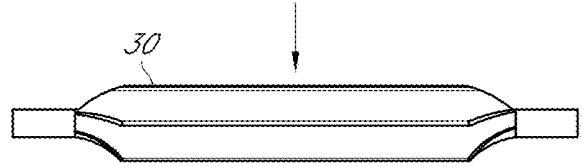
FIG. 30C is a side elevational view of the inner balloon after fluting of the method for nesting balloons of FIG. 30A.

FIGS. 30A through 30D generally depict a method for nesting balloons to form a nested balloon. Each balloon can be made, in some embodiments, of one material, a blend, or co-extruded to comprise two or more layers as described herein. As shown in FIG. 30A, an inner balloon 30 is provided having a proximal neck 50A and a distal neck 51A. The inner balloon 30 can be heated and stretched so that the diameter and cross-sectional area of the inner balloon 30 is decreased, while the length of the inner balloon 30 is at least partially increased, as shown in FIG. 30B. Heating and stretching the inner balloon 30 in this manner typically alters the alignment of the polymer molecules comprising the body of the balloon 30. In some methods, the inner balloon 30 can be then fluted using known fluting methods so that the balloon 30 comprises a plurality of flutes. In some methods, the inner balloon 30 can be then wrapped about a catheter shaft. The fluted and wrapped inner balloon 30 is illustrated in FIG. 30C. The balloon 30 can be fluted and wrapped, for example, using known fluting and wrapping machines. Embodiments of such machines can be found in U.S. Pat. No. 7,762,804 entitled "Balloon Catheter Folding and Wrapping Devices and Methods," the contents of which are hereby incorporated by reference in their entirety. Other suitable balloon fluting and wrapping devices, however, can also be used.

Figure 30D:
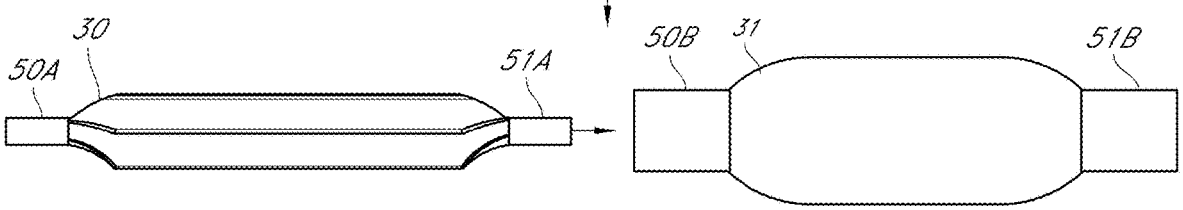
FIG. 30D is a side elevational view of a nested balloon wherein the inner balloon is inserted into the outer balloon used in the method for nesting balloons of FIG. 30A.

With reference to FIG. 30D, the fluted and wrapped inner balloon 30 can be inserted into an outer balloon 31. The outer balloon 31 may have the same or different properties of the inner balloon 30. For instance, the outer balloon 31 may comprise different materials or reach the point of optimal stretch at a larger diameter. In some embodiment, the balloons 30, 31 are comprised of tube stock that optimizes the inner wall stretch of the balloons 30, 31. In some embodiment, the balloons 30, 31 are comprised of co-extruded tubing that optimizes the inner wall stretch of inner layers of the balloons 30, 31 and the inner wall stretch of the outer layers of the balloons 30, 31.

The outer balloon 31 has a proximal neck 50B and a distal neck 51B. In some embodiments, the proximal neck 50B and the distal neck 51B of the outer balloon 31 have larger diameters than the proximal neck 50A and distal neck 51A of the inner balloon 30. In some embodiments, the inner balloon 30 can be inserted into the outer balloon 31 by drawing it through the outer balloon 31 such that the inner balloon 30 is substantially contained within the outer balloon 31. Other suitable methods can also be used to insert the inner balloon 30 into the outer balloon 31.

The nested balloons 30, 31 are next heated, stretched, and inflated to bring the respective body portions of the inner balloon 30 and the outer balloon 31 into the same, or a substantially similar, molecular and geometric alignment. Embodiments of devices capable of inflating and heating a balloon can be found in U.S. Pat. No. 7,578,165 entitled "Measurement Apparatus and Methods for Balloon Catheters," the contents of which are hereby incorporated by reference in its entirety. The embodiments presented can be modified to stretch the balloon as well, and also can be used to verify that the balloons have been stretched to an optimal size and shape. Other embodiments can be used to heat, stretch, and inflate the nested balloons disclosed herein.

In some embodiments of the nesting method, one can heat and stretch the balloon and then begin inflating the balloon while continuing to heat and stretch the balloon. Inflation of the balloon can commence, for example, when approximately thirty percent of the stretching remains to be completed. The balloons are preferably stretched to 3-6×, 4-5×, about 4×, about 4.5×, or about 5× their initial length in some cases. This amount of stretching is meant to optimize biaxial molecular alignment, and it will be apparent that a different method will be suitable for different applications.

The nested balloon comprising the inner balloon 30 and the outer balloon 31 can be fluted and wrapped in preparation for attachment to a catheter shaft. In some embodiments, the nested balloon is fluted and wrapped in preparation for insertion into another balloon. In another embodiment, the nested balloon is fluted and wrapped in preparation for having another balloon inserted into a cavity defined by the nested balloon.

The above-disclosed nesting method is particularly suitable for ultra-high pressure balloons having large neck diameters relative to their body size. In some embodiments, one or more of the balloons to be nested can have a neck diameter that is between about 10-80%, 20-70%, 30-60%, 40-50%, 20-50% with respect to its balloon diameter at its midpoint, or at least about 10%, 15%, 20%, 25%, 30%, 35%, 40%, 45%, 50%, 55%, 60%, 65%, 70%, 75%, 80% of the balloon diameter at its midpoint while still being less than the balloon diameter at its midpoint. Further variations to the nesting method are possible such as, for example, repetition of this process to produce nested balloons having multiple balloons (e.g., exactly or at least three, four, five, six, etc.).

In some embodiments of the present nesting method, the inner balloon 30 and the outer balloon 31 are blow-molded on different molds. The balloons 30, 31 can have substantially similar shapes along a body portion of the balloons 30, 31. In some embodiments, the balloons 30, 31 can have proximal necks having different sizes or configurations. In some embodiments, the balloons 30, 31 can have distal necks having different sizes or configurations. That is, the proximal and distal necks 50A, 51A of the inner balloon 30 can have a different diameter than the proximal and distal necks 50B, 51B of the outer balloon 31, as described herein.

The above-disclosed method comprising independent formation of an inner balloon and an outer balloon and then nesting the balloons allows for a variety of balloon sizes and shapes. Therefore, this method can advantageously allow for ideal balloon parameters for each individual balloon. However, in some instances, independent formation of balloons could be a slower and more costly process, particularly for balloons with small necks relative to their bodies. Typically, the body of the balloon is wider than its neck. However, the body of the inner balloon should still be capable of fitting through the neck of the outer balloon. The body of a balloon can be narrowed by heating, stretching, fluting, and wrapping. The neck of a balloon can possibly be widened by heating and inflating or stretching the balloon radially, but these methods are limited. As a result, it is often practical to form balloons independently and then nest them to create nested balloons with a balloon body diameter to neck diameter ratio of about 7:1, 6:1, 5:1, 4:1, 3:1, or less.

Figure 31:
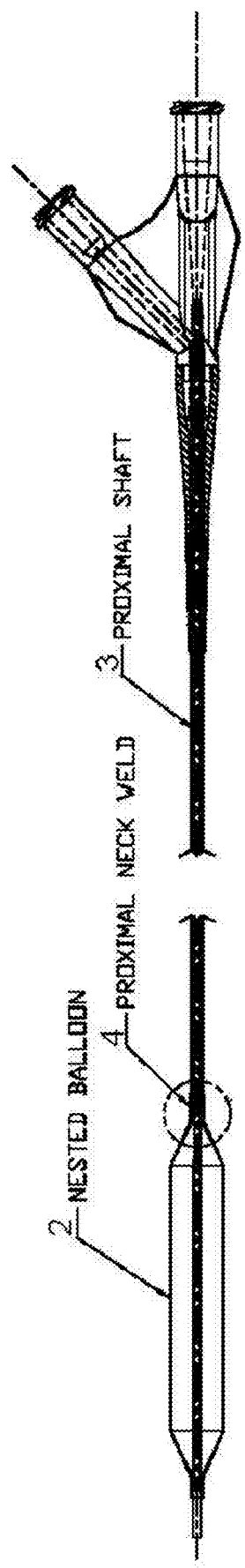
FIG. 31 is a side elevational view of a catheter with a nested balloon.

FIG. 31 shows a typical catheter for a nested balloon 2. The catheter size is affected by the cross section area of the folded balloon and/or the size of the proximal balloon neck weld. The introducer size can be minimized by minimizing the overall size of the catheter. Thus, to minimize the introducer and/or access greater regions of the human anatomy, the designer may try to minimize the balloon thickness and/or the neck weld. The neck of the balloon may be specifically designed to ensure optimal welding and/or attachment to the catheter. The location of the proximal neck weld 4 relative to the nested balloon 2 and the catheter 3 is shown in FIG. 31.

Figure 32A:
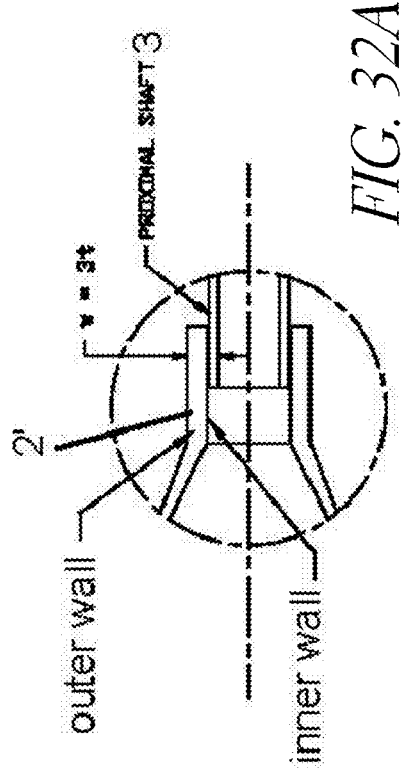
FIG. 32A is a side elevational view of a balloon weld configured for a single balloon with equivalent strength.
Figure 32C:
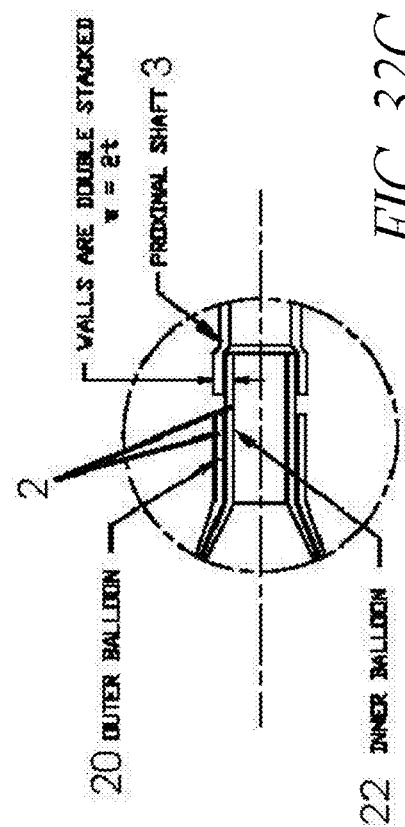
FIG. 32C is a side elevational view of a balloon weld configured for nested balloons.
Figure 32B:
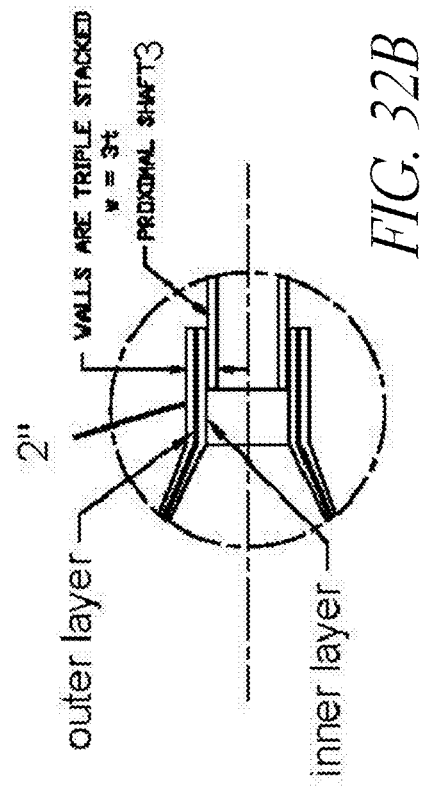
FIG. 32B is a side elevational view of a balloon weld configured for multi-layer balloons.

FIGS. 32A-32C show embodiments of the weld between the balloon and the catheter. FIG. 32A shows a single balloon 2' having an inner wall and an outer wall. In some embodiments, the thickness of the balloon 2' neck is 2t, and the thickness of the weld for the balloon neck and the proximal shaft is 3t, as shown. The thickness of the weld increases the size of the introducer needed for the balloon catheter. FIG. 32B shows a nested balloons 2" having two balloons. Each balloon can have an outer layer and an inner layer as shown. In some embodiments, the thickness of the balloon 2" neck is 2t, and the thickness of the weld for the balloon neck and the proximal shaft is 3t, as shown. The thickness of the weld increases the size of the introducer needed for the balloon catheter. The nested balloons 2" can have multiple balloons and/or multiple layers, providing benefits over the single layer balloon 2' shown in FIG. 32A and described herein. However, the balloons 2' and 2" shown in FIG. 32A and FIG. 32B would require the same size of introducer.

FIG. 32C shows the weld of an embodiment of the nested balloon 2. The nested balloon 2 comprises the first balloon 20 and the second balloon 22, each with thickness t. Each balloon can have an outer layer and an inner layer, as described herein. The neck of the second balloon 22 can have a smaller diameter and/or longer length than the neck of the first balloon 20. The neck of the first balloon 20 can have a larger diameter and/or shorter length than the neck of the second balloon 22. The neck of the second balloon 22 can be welded to the catheter 3. The first balloon 20 can be welded to the second balloon 22 at a location along the neck of the second balloon 22. The necks are partially or completely staggered (e.g., offset). Therefore, the thickness of the balloon and the catheter is 2t, not 3t as shown in FIGS. 32A-32B. The balloon catheter shown in FIG. 32C would require a smaller introducer. The configuration of the necks of the balloons 20, 22 produces a smaller, in some cases about 33% smaller bulge than the previous examples. Other configurations of staggering the neck welds of the nested balloons are contemplated.

Figure 33A:
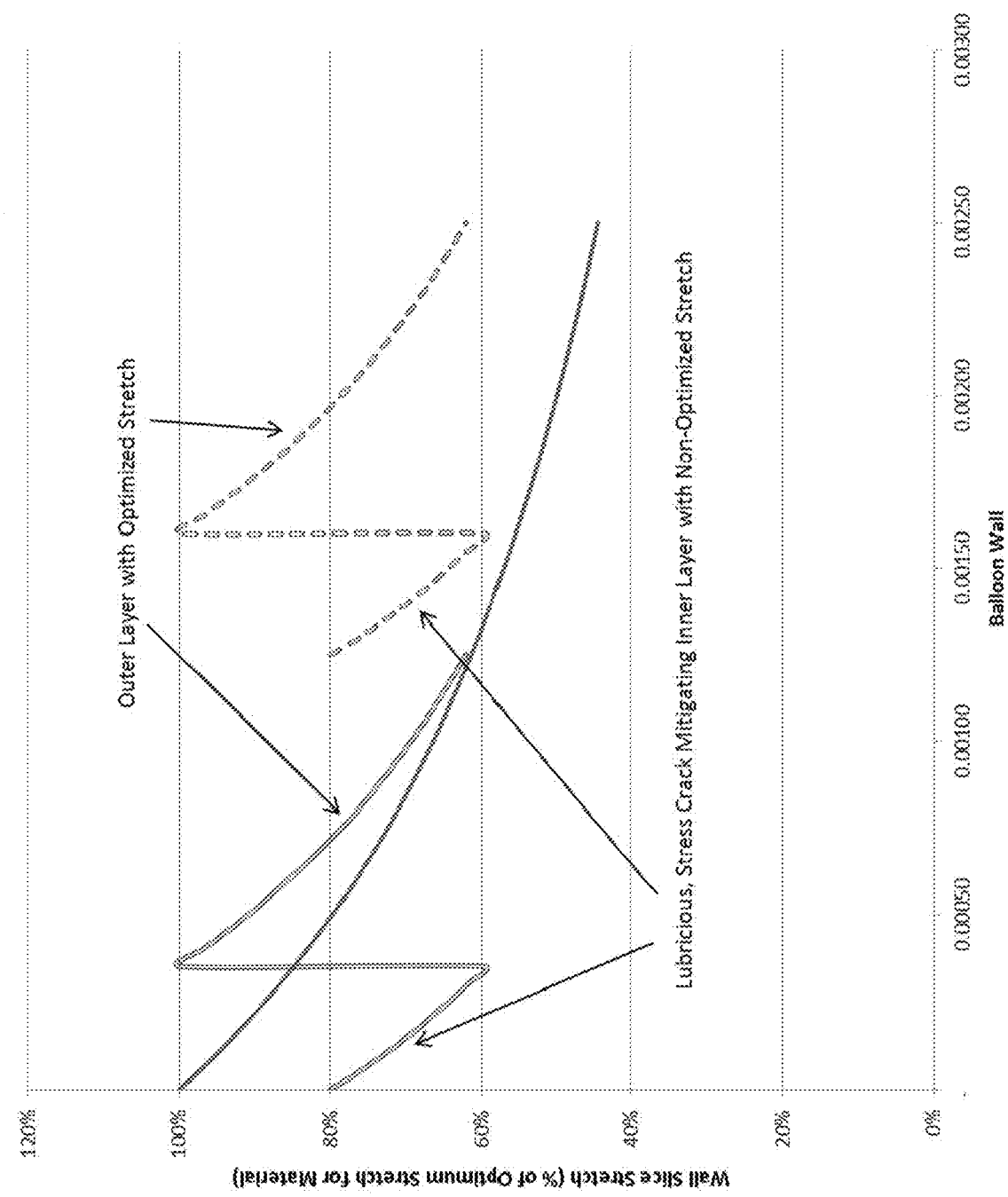

FIGS. 33A-33B are graphs illustrating concepts described herein. The graphs compare a single balloon and a nested balloon. The nested balloon comprises two balloons. Each balloon can be formed from co-extruded tubing, having a first layer and a second layer. The graphs illustrate the superior and unexpected wall stretch properties of a nested balloon comprising a co-extruded inner layer and a co-extruded outer layer at a given wall thickness with respect to a single layer balloon having the same wall thickness. As noted, each balloon in the nested balloon is dual-layer balloon manufactured from co-extruded tubing. Both the single balloon and nested balloon have the same overall wall thickness.

FIG. 33A shows an embodiment where the inner layer of the first balloon and the inner layer of the second balloon are not optimized. As shown, the inner wall of the inner layer of the first balloon is only 80% of the optimized stretch. The inner wall of the inner layer of the second balloon is only 80% of the optimized stretch. The inner layer can comprise a stress crack mitigating layer, as described herein. The inner walls of the inner layers are not optimized. The inner wall of the outer layer of the first balloon is optimized. The inner wall of the outer layer of the second balloon is optimized. The inner walls of the outer layers are 100% of the optimized stretch.

FIG. 33A shows an embodiment where the inner wall of the outer layer of each balloon is optimized. The inner wall of the inner layer of each balloon, which may be a stress crack mitigating inner layer, is not optimized. In some embodiments, the inner wall of the inner layer of one or more of the balloons forming a nested balloon need not necessarily have its wall stretch optimized. In such cases, the co-extruded nested balloon can still retain the advantageous stress crack mitigating and/or lubricious properties of the inner layer.

In some embodiments, each inner wall of each inner layer of the nested balloon is optimized. In some embodiments, each inner wall of each outer layer of the nested balloon is optimized. In some embodiments, some inner walls of the inner layers of the nested balloon are optimized. In some embodiments, some inner walls of the outer layers of the nested balloon are optimized.

FIG. 33B shows an embodiment where the inner layer of the first balloon and the inner layer of the second balloon are optimized. As shown, the inner wall of the inner layer of the first balloon is close to, or at 100% of the optimized stretch. The inner wall of the inner layer of the second balloon is close to, or at 100% of the optimized stretch. The inner walls of the inner layers are optimized. The inner wall of the outer layer of the first balloon and the inner wall of the outer layer of the second balloon are also optimized. Each of the four inner walls is close to, or at 100% of the optimized stretch. FIG. 33B shows an embodiment where both the outer layer and the inner layer of each balloon is optimized.

Nested balloons can have several times better flexibility then a single wall balloon of equivalent thickness. As shown in FIG. 29C, each element 15, 16, and 17 preferably slides relative to the other elements a distance Δ1. If the balloon element 15, 16, and 17 are permitted to slide, then the nested balloon will likely require less force to bend. For three elements of equal thickness, the force needed can approach the limit of three times the force needed to bend a single element. For three elements of equal thickness, the force can approach the limit of a third less force than needed to bend a balloon with a single layer of equivalent thickness to the three elements.

Nested balloons can be formed from co-extruded tubing. The tubing outer layer can be made of high strength and hardness material. In some embodiments, the material is polyamide (nylon). In some embodiments, the structural layers comprise a polyamide such as Nylon 12. The tubing inner layer can be made of lower strength and lower hardness material. The tubing inner layer can have a low coefficient of friction. In some embodiment, the lubricating layers comprise 0.0001 to 0.00015 inch high-density polyethylene. To maintain flexibility in the nested balloon, friction between these balloons 20, 22, 24, A, B can be minimized.

Nested balloon can provide an additive strength of individual balloons. FIGS. 7A and 8A show an enlarged cross-section of an embodiment of the nested balloon 2 having the first balloon 20, the second balloon 22, and the third balloon 24. In some embodiments, one or more of the balloon 20, 22, 24 can comprise multiple layers. For instance, the first balloon can comprise two or more layers, the second balloon can comprise two or more layers and/or the third balloon can comprise two or more layers. In some embodiment, in which the nested balloon 2 comprises a balloon having three structural layers, the balloon comprises an outer layer, a middle layer, and an inner layer.

Because each balloon 20, 22, 24 is thinner than the single-layer balloon of FIGS. 7B and 8B, the bend radius 10 is smaller for an equal cumulative thickness 3t. Because the cumulative thickness of the nested balloon 2 of FIG. 7A is substantially the same as the thickness of the single-layer balloon 2', the burst pressure P would be anticipated to be the substantially the same as long as adjacent balloon layers of the nested balloon can slide relative to each other. However, as shown in FIG. 25, the burst pressure is greater than the burst pressure of a single-layer balloon having an equivalent thickness. FIG. 25 suggests that nested co-extruded balloons have higher burst pressure than single layer balloons having the same wall thickness. In some embodiments, the increase in burst pressure is between about 25%-75%, 30%-70%, 35%-65%, 40%-60% greater than that of a single balloon having the double wall thickness equal to combined thickness of the first balloon and the second balloon.

The nested balloon can comprise two or more balloons, each blown from a co-extrusion. Disclosed herein is a method for creating nested balloons with low friction interfaces by nesting multiple balloons or by nesting co-extruded tubing. It will be apparent that these methods can be combined with each other and other balloon forming methods to produce larger multi-layer balloons. Similarly, the balloons need not be formed and processed identically to obtain equivalent burst strengths, sizes, and/or molecular orientations. This is especially true for balloons of different materials. In accordance with embodiments, each balloon is molded from tubing in which in the inner wall stretch of each layer has been optimized for maximum strength.

In some embodiment, each co-extruded tube can have at least two inner walls of optimized stretch. Each co-extruded tube can have at least two outer walls of highly oriented stretch. In some embodiments, materials are selected with different stretch properties for the co-extrusion, one greater than the other. In some embodiments, the co-extruded tubing is sized based on optimizing that stretch. It will be apparent that balloons of different material may require different sizes and shapes to optimize the inner wall stretch. It will also be apparent that, because the balloons still do not stretch to exactly equal diameters upon inflation, it may be practical to make the inner balloons slightly smaller such that each layer stretches to substantially near its optimal stretch. Using this design, it is not necessary that the layers be made from the same material or have the same wall thickness. Each layer is made such that the inner wall has been stretched for maximum strength, with the stretch ratio specific for that particular material. The method of nesting contemplates use of non-identically sized or shaped balloons.

In accordance with some embodiments, in order to substantially increase the overall wall strength of a nested balloon, each balloon or balloon layer is molded from tubing in which in the inner wall stretch has been optimized for maximum strength. FIGS. 33A-33B show the relative stretch of wall slices for such a nested balloon having two balloons formed from co-extruded tubing.

Each balloon in the nested balloon can be manufactured from co-extruded tubing. Each balloon in the nested balloon catheter has an outer layer and an inner layer, as described herein. In some embodiments, the inner layer can be a lubricious, stress crack mitigating inner layer as described herein. Other configurations are contemplated.

Embodiments of the nested balloon disclosed herein can provide a significant and unexpected performance improvement over current high pressure balloons. The disclosed embodiments allow for balloon catheters to be used in new applications. For example, nested balloons can be used in ultra-high pressure applications such as 50 atmospheres or more for up to 10 mm diameter balloons, and for high pressure applications for very large balloons such as 12 atmospheres or more for up to 30 mm diameter balloons. The advantages provided by the nested balloons disclosed herein can be attributed, at least in part, to forming each balloon from tubing where the inner wall stretch has been optimized for maximum strength, as well as the particular material choice for each balloon making up the nested balloon.

As noted herein, there is a distinction between balloons produced from nested tubing of the same material and nested balloons comprising a plurality of individual balloons. There can be a difference in performance between the two as well as targeted applications.

Coextruded balloon tubing does not address the differences in material molecular orientation between the inner wall and the outer wall of the balloon. Some embodiments as disclosed herein improve the strength of the coextruded balloon by achieving more uniform orientation through the balloon wall. Multilayer balloons produced from coextruded tubing, in some embodiments, suffer from the same drawbacks as any single layer balloon in terms of disparities in orientation and lack of flexibility. In some embodiments, each layer of a co-extruded balloon is selected to optimize the inner wall of each layer.

A nested balloon comprises two or more balloons formed independently and subsequently inserted within each other. For nested balloon design, careful consideration must be given to the individual balloon dimensions, including balloon cones and necks. The design enables efficient and uniform load transfer from the inner balloon to the outer balloon with a minimum friction between balloon walls. Some important elements include balloon sizing, alignment of the balloons, reduced friction between balloon walls, and a stress crack mitigation layer. The issue of stress crack (micro tear) formation is magnified by the interaction of the inner and outer balloons during the force transfer.

Nested balloons can advantageously provide the additive strength of individual balloons. For example, if you have two balloons each with burst strength of 25 atm, then these balloons nested within each other shall provide theoretical strength of 50 atm. In reality this number can be lower by 10% to 30% due to small inefficiencies in load transfer or load sharing by the individual balloons. In order to maximize the results the balloons can be very precisely sized and aligned during the nesting process. In some embodiments, it is preferred to have a uniform contact between the complete surfaces of inner and outer balloon without any voids or air pockets. Furthermore, it can be desirable to have certain amount of lubricity between the layers so the balloons can self-align and compensate for small irregularities without creating additional stresses in the wall. The material selection of layers of the balloons can reduce friction. For example, the inner layer made of, for example, Pebax as described herein can provide lubricity.

Nested balloons can provide benefit with respect to burst strength and flexibility. However they present unique challenges compared to single layer balloons. Two such challenges are Rated Burst Pressure (RBP) and compliance.

The challenge with respect to RBP is that increased deviation in average burst that can occur with nested balloons will result in a lower value for RBP. RBP is defined as the pressure at which 99.9% of balloons can survive with 95% statistical confidence. Failure of a balloon to maintain integrity at the RBP could result, in device failure or luminal damage. Typically a Minimum Burst Strength (MBS) is used which is greater than the RBP to provide some cushion. MBS is calculated from the Average Burst Pressure (ABP) less the Standard Deviation (SD) for the ABP multiplied by the K factor. The K factor is based on one-sided tolerance limits for normal distribution and is a function of confidence level, probability and sample size. For 95% confidence with 99.9% probability and a sample size of 30 the K factor is 4.022. As a result small increases in SD can significantly impact the resulting MBS even if the ABP is the same:

$$MBS = ABP - (K * SD)$$

Figure 34:
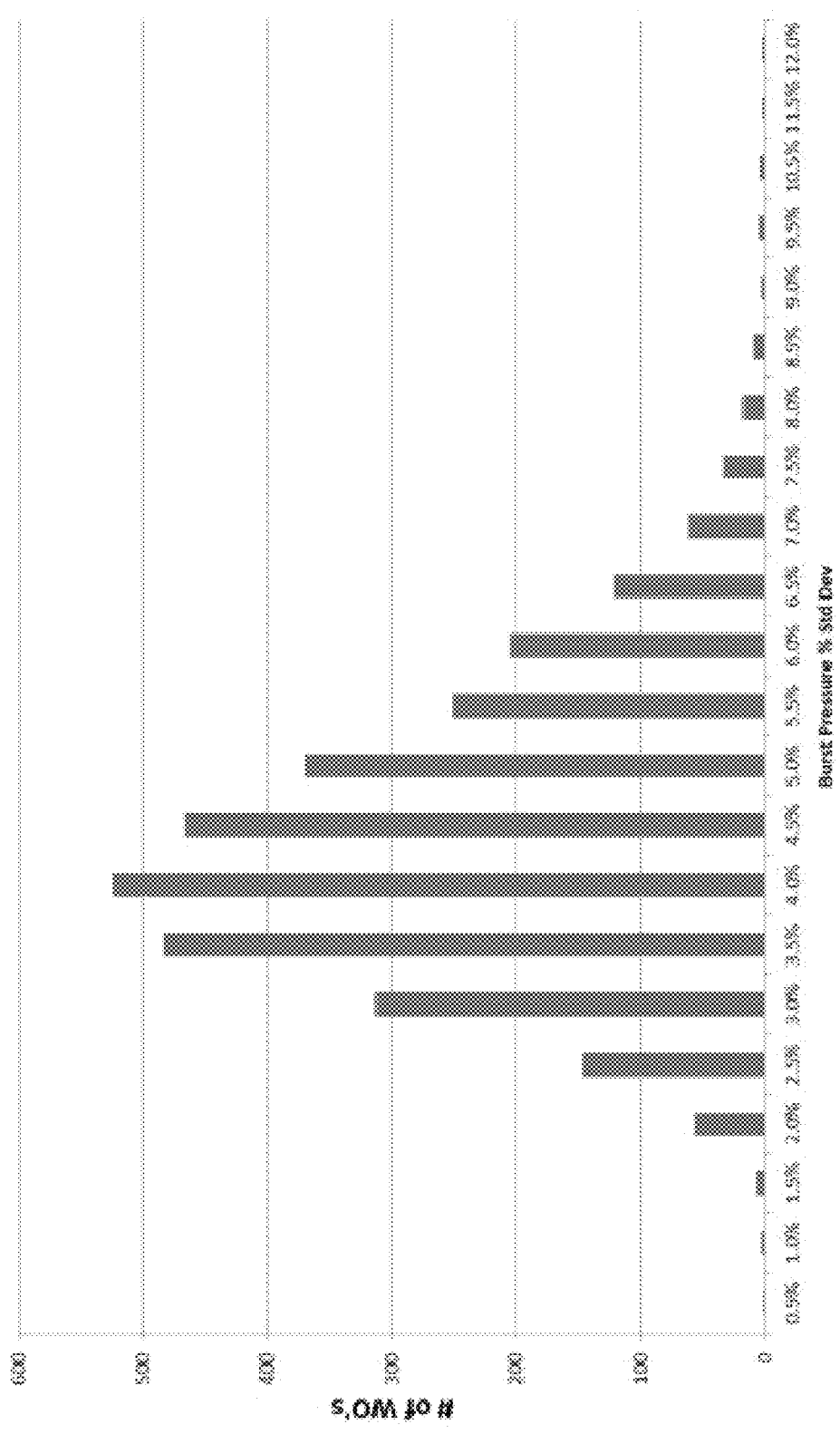
FIG. 34 is a graph of standard deviation for the average burst pressure of nylon balloons, according to some embodiments.

Historically, the SD for nylon balloons is approximately 4.5% and can range from approximately 2% to 7% according to some embodiments, as shown in FIG. 34.

From a design point of view it can be desirable in some cases to design for the top end to ensure lot to lot success.

$$\% SD = SD/ABP.$$

$$ABP = MBS/(1 - K * \% SD)$$

One consequence is that SD increases with ABP, which can be significant for high burst pressure requirements. Another is that nesting balloons can increase the % SD.

Nested balloons increase the complexity over monolayer balloons. Each layer will have an ABP along with a SD. In addition the nesting itself contributes to the overall SD.

Nesting Effectiveness (NE) is a way of expressing the degree to which nesting is effective. In the ideal case the ABP for the nested balloons will be the sum of the ABP of two individual layers. Assuming both layers have the same ABP, the NE would be 2. If the NE is less than about 2, this indicates loss of burst strength. For example if the individual balloon layers have an ABP of 25 atm and the nested balloon ABP is 50 atm, this would be an NE of 2. If in the same case the ABP of the nested balloon is 40 atm, the NE is 1.6. Such loss in balloon strength might result from a combination misalignment, micro-welds between layers acting as stress risers or small differences in size, for example.

The NE will not be a constant and will have its own standard deviation if measured across a population. This deviation will contribute to the overall standard deviation of the nested balloon ABP. Compensating for a higher % SD to achieve a specific MBS will require increasing the ABP. This is done by increasing the balloon wall thickness, which will offset the value of the nested balloons.

As noted, another challenge is that nested balloons can increase the compliance of the balloon, which on the surface appears counter-intuitive as increased layers is expected to decrease the compliance due to increased level of highly oriented polymers. This decreased compliance is a result of how compliance is stated for balloon catheters and the typical compliance curve for a balloon.

Compliance is specifically the percent change in balloon diameter from the nominal pressure (NP) to RBP. By changing the NP and RBP for a given balloon it's possible to increase or reduce the compliance without changing the balloon itself. The values of NP and RBP are often manipulated so as to achieve specific requirements for compliance. This can be seen in the graph below where for a given RBP of 18 atm, the compliance is 8.4% for an 8 atm nominal pressure while it is 6.6% for a 10 atm nominal pressure. The $$\% SD = \frac{SD}{ABP}$$

graph below also sets the stage for explaining why the compliance can decrease for a nested balloon.

Figure 35:
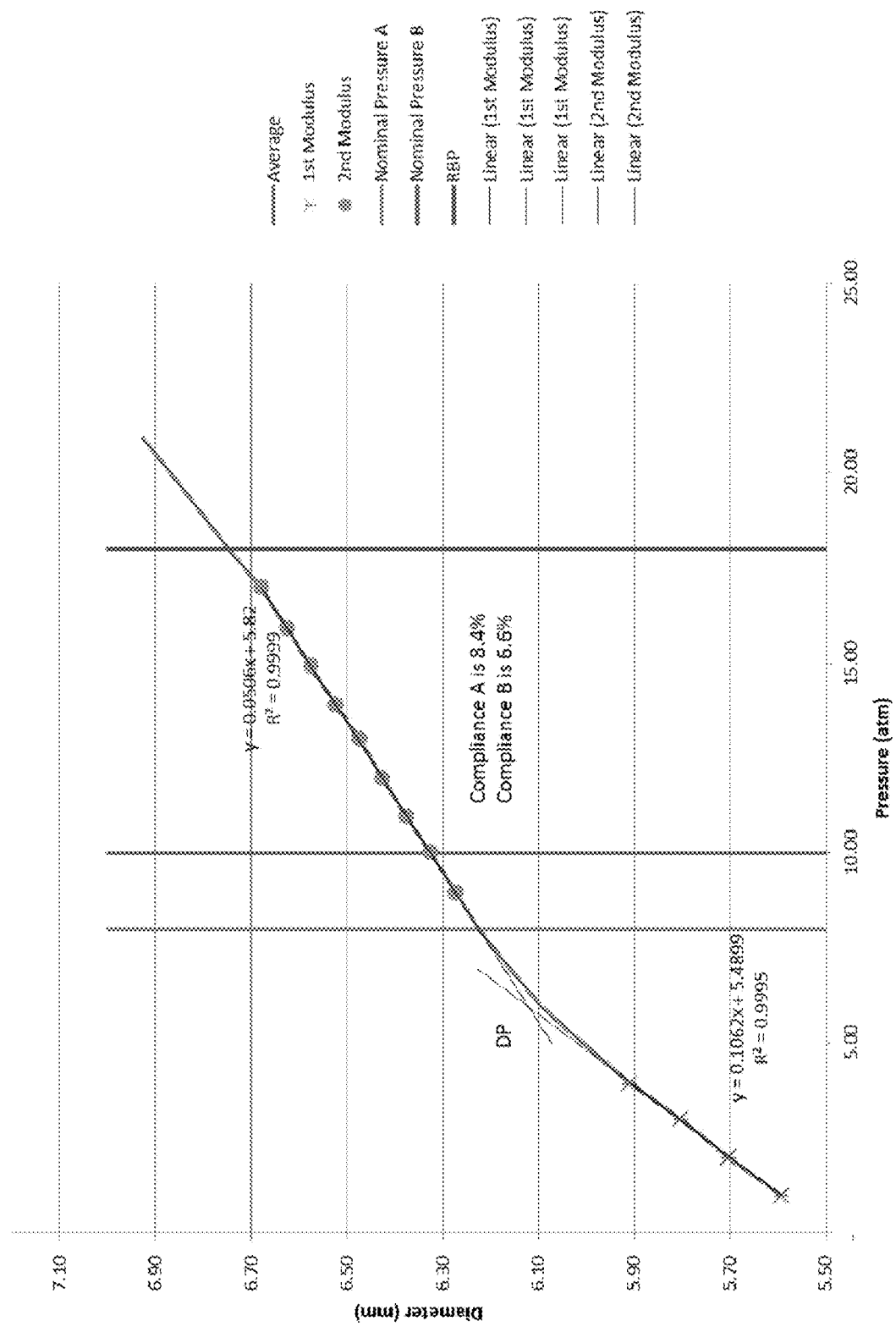
FIG. 35 is a graph of compliance of nylon balloons, wherein compliance is the percent change in balloon diameter from the nominal pressure to the Rated Burst Pressure, according to some embodiments.

The compliance curve shown in FIG. 35 is typical for nylon balloons, according to some embodiments. The compliance is bimodal in that the initial compliance at lower pressures is higher than the primary compliance curve at the higher pressures. The point at which these points meet can be referred to as the Deflection Point (DP). Note that the DP is approximately 6 atm. Typically nominal pressures are in the range of 6 to 10 atm, so the higher initial compliance is not a factor with respect to standard balloon compliance. However this is not the case with respect to nested balloons.

Figure 36:
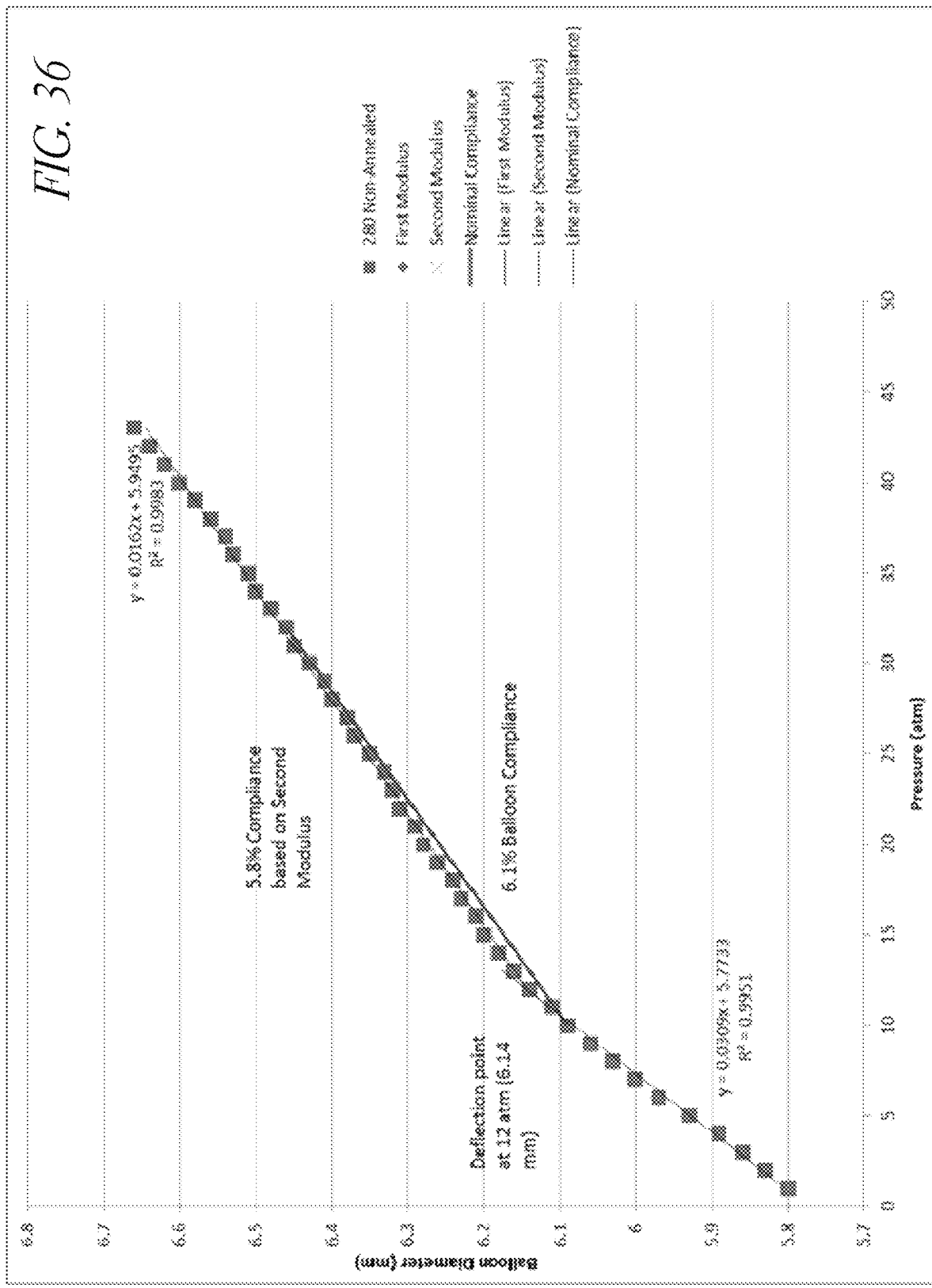
FIG. 36 is a graph of compliance of a nested balloon showing that the initial diameter for calculating the standard balloon compliance is lower, resulting in a greater compliance value, according to some embodiments.

FIG. 36 shows the compliance curve for nested balloons, according to some embodiments. Since the pressure seen by the individual layers is effectively halved, the initial compliance curve is spread over twice the pressure range. In FIG. 36 the DP is at 12 atm, higher than the targeted 10 atm nominal pressure. As a consequence the initial diameter for calculating the standard balloon compliance is lower, resulting in a greater compliance value.

In some embodiments, both the balloon burst deviation and compliance issues have been mitigated to a substantial extent by a process herein described, which can involve annealing a nested balloon under relatively high pressures and/or temperatures, which advantageously and unexpectedly can allow for two, three, or more balloon layers nested together, which can increase strength and improve (increase or decrease) compliance of the nested balloon, in some cases relative to a non-nested balloon having the same properties (e.g., materials, diameter, etc.)

The process can include, in some embodiments, any number of the following steps:

(a) Balloons blown and nested within a relatively short time period, such as within the same day (FN Fast Nesting), such as within about 48, 36, 24, 20, 18, 16, 14, 12, 10, 8, 7, 6, 5, 4, 3, 2, 1, or less hours of each other.

(b) Nested balloons annealed in a mold can be annealed involving one, two, or more of the following parameters in some embodiments: temperature of: about 235° F., (or from about 100° F. to about 300° F., from about 200° F. to about 300° F., from about 120° F. to about 270° F., from about 215° F. to about 255° F., or from about 215° F. to about 255° F. in some embodiments, or ranges includes any two of the foregoing values), or below the upper end of the glass transition temperature of the balloon materials; pressure: about or at least about 2 atm, 5 atm, 10 atm, 15 atm, or 20 atm (or about 2 to about 40 atm, about 5 to about 30 atm, or about 15 to about 25 atm in some embodiments, at a minimum above the nominal pressure of the balloon, or ranges including any two of the foregoing values); 1-2 lbs stretch (about 0.5 to about 10 lbs, about 1 to about 5 lbs, or about 1 to about 3 lbs in some embodiments, or ranges including any two of the foregoing values); for about or at least about 30 minutes (about 5 to about 180 minutes, about 5 to about 90 minutes, about 10 to about 60 minutes, about 15 to about 45 minutes, or ranges including any two of the foregoing values). Such techniques such as described in some embodiments herein can be hereby referred to herein as PCA or Pressurized Constrained Annealing. In some embodiments, the annealing can occur in an enclosed, high pressure, balloon heating chamber configured with a controller to allow for any number of the parameters described herein. A variety of balloon materials, diameters, and other characteristics can be utilized such as described elsewhere herein in some embodiments.

(c) Nested balloons can be welded to the inner and/or outer shaft of a catheter.

(d) "Sterilization" annealing at an appropriate temperature at an appropriate time, such as about 50° C. (for example, about 40° C. to about 60° C.) for about 2 hours (for example, about 1 hour to about 3 hours) in some embodiments.

Figure 37:
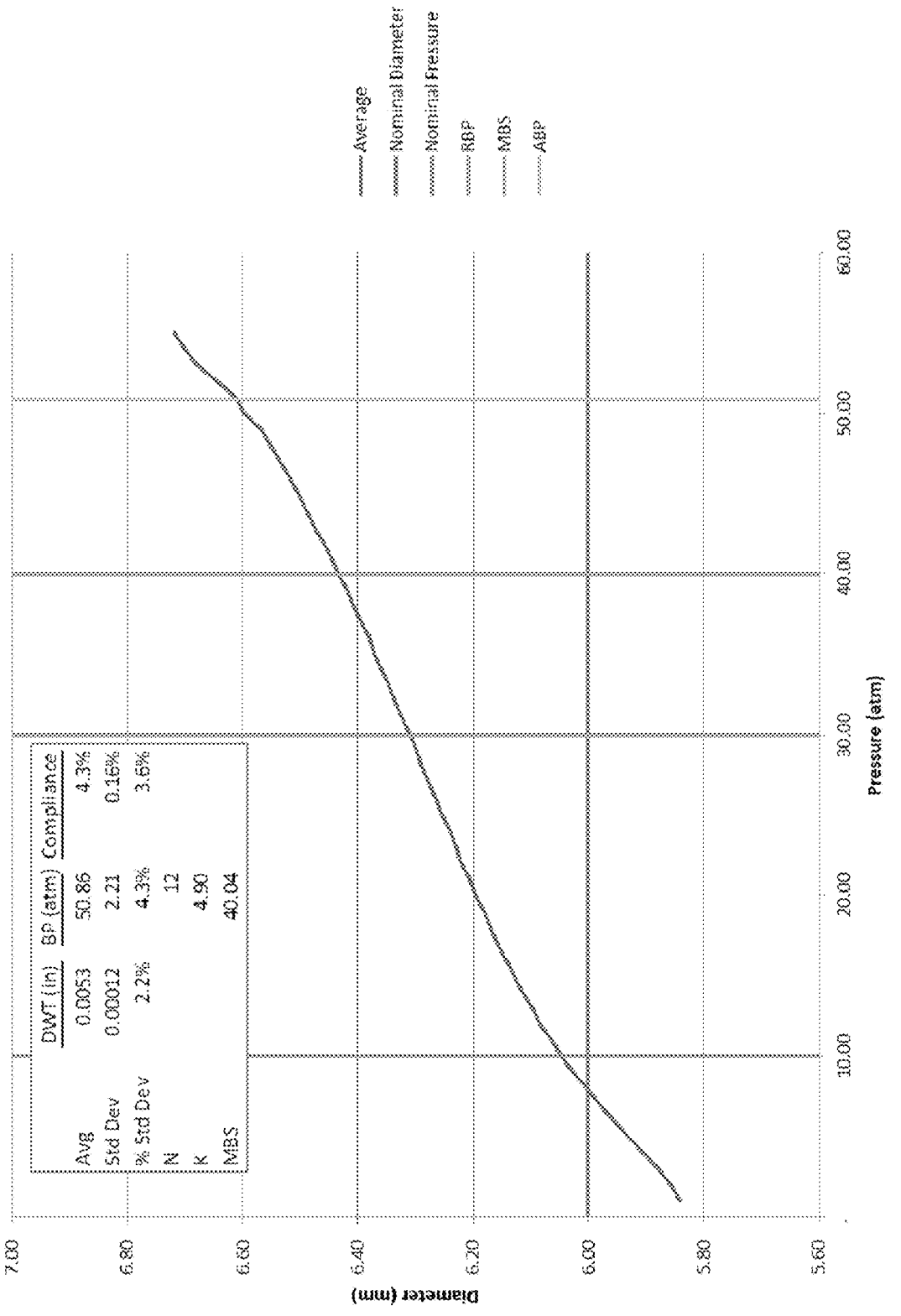
FIG. 37 is a graph of the change in diameter due to a change in pressure for non-annealed nested balloons, according to some embodiments.

The unexpectedly advantageous result can be a nested balloon that with a lower compliance, both before and/or after annealing, and higher MBS as a result of lower % SD. FIG. 37 shows the change in diameter due to a change in pressure for non-annealed nested balloons, and FIG. 38 shows the change the in diameter due to a change in pressure for annealed nested balloons. The difference in the curve indicates that the balloon burst deviation and compliance issues can be mitigated to a substantial extent by annealing under relatively high pressures as disclosed herein.

In comparison, balloons without constrained pressurized annealing have lower burst pressure and higher compliance, as listed in the table below:

| Nested balloons not employing Fast Nesting, Constrained Pressurized Annealing | | |
|---|---|---|
| Annealed | Yes | No |
| Nominal ø | 10 | 10 |
| RBP | 32 | 32 |
| DWT | 0.0062 | 0.0054 |
| Avg BP | 36.7 | 45.0 |
| Compliance | 12.7% | 6.1% |
| DP | 19.26 | 16.89 |

It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

What is claimed is:

1. A nested balloon formed by the method comprising:
providing a first balloon layer;
providing a second balloon layer;
inserting the first balloon layer into the second balloon layer to form a nested balloon;
constrained pressurized annealing the first balloon layer and the second balloon layer at a temperature of between about 200° F. and about 300° F. for a time period of between about 10 minutes and about 90 minutes;
wherein constrained pressurized annealing comprises pressurizing the nested balloon at a pressure of between about 2 atm and about 30 atm,
wherein a lot of nested balloons after constrained pressurized annealing comprises a higher minimum burst strength as a result of a lower percentage standard deviation compared with a lot of nested balloons not employing constrained pressurized annealing, and
wherein the first balloon layer is configured to slide relative to the second ballon layer.

2. The nested balloon of claim 1, wherein the nested balloon comprises a lower compliance relative to the nested balloon not employing constrained pressurized annealing.

3. The nested balloon of claim 1, wherein the first balloon layer comprises nylon.

4. The nested balloon of claim 1, wherein the second balloon layer comprises nylon.

5. The nested balloon of claim 1, wherein the first balloon layer is a co-extruded balloon layer.

6. The nested balloon of claim 1, wherein the second balloon layer is a co-extruded balloon layer.

7. The nested balloon of claim 1, further comprising a third balloon layer, wherein the first balloon layer, the second balloon layer, and the third balloon layer are nested together.

8. The nested balloon of claim 1, wherein the first balloon layer and the second balloon layer are blown and nested within the same day.

9. The nested balloon of claim 1, wherein the constrained pressurized annealing temperature is between about 215° F. and about 255° F.

10. The nested balloon of claim 1, wherein the pressure is between about 10 atm and about 25 atm.

11. The nested balloon of claim 1, wherein the method further comprises stretching the balloon with a stretch force of between about 1 pound and about 5 pounds.

12. The nested balloon of claim 1, wherein the time period is between about 15 minutes and about 45 minutes.

13. The nested balloon of claim 1, wherein the time period is at least 30 minutes.

14. The nested balloon of claim 1, wherein the constrained pressurized annealing occurs in an enclosed balloon heating chamber configured with a controller.

15. The nested balloon of claim 1, wherein the nested balloon is welded to an inner and/or outer shaft of a catheter.

16. The nested balloon of claim 1, wherein the method further comprises sterilizing the nested balloon after constrained pressurized annealing at a temperature of between about 40° C. and about 60° C. for a time period of between about 1 hour and about 3 hours.

17. The nested balloon of claim 1, wherein the method further comprises blow molding the first balloon layer and the second balloon layer prior to constrained pressurized annealing.

18. The nested balloon of claim 17, wherein the blow molding occurs no more than about 48 hours prior to constrained pressurized annealing.

\* \* \* \* \*